US007816422B2

(12) United States Patent
Watanabe

(10) Patent No.: US 7,816,422 B2
(45) Date of Patent: Oct. 19, 2010

(54) CURABLE COMPOSITION, INK COMPOSITION, INKJET RECORDING METHOD, PRINTED MATERIAL, METHOD OF PRODUCING PLANOGRAPHIC PRINTING PLATE, AND PLANOGRAPHIC PRINTING PLATE

(75) Inventor: Kotaro Watanabe, Shizuoka-ken (JP)

(73) Assignee: FUJIFILM Corporation, Tokyo (JP)

( * ) Notice: Subject to any disclaimer, the term of this patent is extended or adjusted under 35 U.S.C. 154(b) by 648 days.

(21) Appl. No.: 11/523,038

(22) Filed: Sep. 19, 2006

(65) Prior Publication Data

US 2007/0071952 A1 Mar. 29, 2007

(30) Foreign Application Priority Data

Sep. 21, 2005 (JP) ............................ 2005-274211

(51) Int. Cl.
*C08F 2/50* (2006.01)
*C08J 3/28* (2006.01)

(52) U.S. Cl. ......................... 522/170; 522/168; 522/31; 522/32; 522/74; 522/71; 522/35; 522/75; 522/81; 522/178; 522/181; 522/909; 428/411.1; 428/413; 106/31.13; 106/31.6

(58) Field of Classification Search ................. 522/100, 522/170, 31, 32, 30, 74, 71, 75, 81, 168, 522/178, 181, 909; 549/546; 106/31.13, 106/31.6; 428/413, 411.1
See application file for complete search history.

(56) References Cited

U.S. PATENT DOCUMENTS

| | | | |
|---|---|---|---|
| 2,794,029 A | 5/1957 | Phillips et al. | |
| 6,245,828 B1 | 6/2001 | Weinmann et al. | |
| 7,285,375 B2 * | 10/2007 | Matsumura et al. ...... | 430/280.1 |
| 2004/0024085 A1 * | 2/2004 | Ishizuka et al. ............. | 523/160 |
| 2005/0190252 A1 * | 9/2005 | Nishizeki et al. ............ | 347/105 |

FOREIGN PATENT DOCUMENTS

| | | | |
|---|---|---|---|
| EP | 0 879 257 | B1 | 4/2002 |
| JP | 63-235382 | A | 9/1988 |
| JP | 3-216379 | A | 9/1991 |
| JP | 5-214280 | A | 8/1993 |
| JP | 6-21256 | B2 | 3/1994 |
| JP | 6-62905 | B2 | 8/1994 |
| JP | 9-183928 | A | 7/1997 |
| JP | 11-43540 | A | 2/1999 |
| JP | 11-60702 | A | 3/1999 |
| JP | 2003-192943 | A | 7/2003 |
| JP | 2003-192944 | A | 7/2003 |
| JP | 2003-312121 | A | 11/2003 |
| JP | 2003-341217 | A | 12/2003 |
| JP | 2004-91558 | A | 3/2004 |
| JP | 2005-41892 | A | 2/2005 |
| WO | WO2004109402 | * | 12/2004 |

OTHER PUBLICATIONS

J. Crivello. The Discovery and Development of Onium Salt Cationic Photoinitiators. Journal of Polymer Science: Part A: Polymer Chemistry, vol. 37, pp. 4241-4254 (1999).*

* cited by examiner

*Primary Examiner*—Sanza L McClendon
(74) *Attorney, Agent, or Firm*—Sughrue Mion, PLLC

(57) ABSTRACT

The present invention provides a curable composition comprising a compound having a partial structure represented by the following formula (I) and a partial structure represented by the following formula (II):

Formula (I)

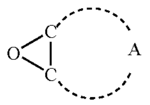

Formula (II)

$$-O-(R^1-O)_n-$$

wherein in formula (I), A represents a group capable of forming a four- or more-membered bivalent alicyclic alkyl group with neighboring carbon atoms; and in formula (II), $R^1$ represents an alkylene, a cycloalkylene, or an arylene group, and n represents an integer of 1 or more.

10 Claims, No Drawings

CURABLE COMPOSITION, INK COMPOSITION, INKJET RECORDING METHOD, PRINTED MATERIAL, METHOD OF PRODUCING PLANOGRAPHIC PRINTING PLATE, AND PLANOGRAPHIC PRINTING PLATE

CROSS-REFERENCE TO RELATED APPLICATION

This application claims priority under 35 USC 119 from Japanese Patent Application No. 2005-274211, the disclosure of which is incorporated by reference herein.

BACKGROUND OF THE INVENTION

1. Field of the Invention

The present invention relates to a curable composition favorably used in ink compositions, paints, adhesives, and the like, an ink composition containing the curable composition favorably used in inkjet recording, an inkjet recording method, a printed material prepared by using the inkjet recording method, a planographic printing plate obtained by using the ink composition, and a method of producing a planographic printing plate.

2. Description of the Related Art

Cyclic ether compounds for example of 3 -or 4-membered ring are known to exhibit high reactivity, and have been used as a polymerizable compound to be contained in curable (compositions to which thermal polymerization such as that using photocationic polymerization or acid anhydride is applied (see, for example, Japanese Unexamined Patent Publication (JP-A) Nos. 11-43540 and 11-60702).

In addition, active energy ray curing inkjet inks containing an epoxy compound having its oxirane rings connected to each other via a connecting chain having a branched structure have been proposed. However, the connecting chain in the epoxy compound, which is a hydrophobic connecting chain, caused a problem that the ink therefrom is lower in adhesiveness to the recording medium (see, for example, JP-A No. 2005-41892).

There are many image-recording methods of forming an image on a recording medium such as paper based on image data signals, including those in electrophotographic process, sublimation or fusion heat-transfer process, and inkjet process. Among them, the inkjet process is advantageous in that it allow printing in a cheaper device at a lower running cost, because it forms an image directly on a recording medium by ejecting ink only in desirable image region and thus uses the ink more efficiently. In addition, the inkjet process is also less noisy and thus advantageous as an image-recording method.

The inkjet process allows printing not only on plain paper but also on non-water-absorptive recording media such as plastic sheet and metal plate, but recently, there is an urgent need for acceleration of printing and improvement in image quality in the process. The period needed for drying and curing the ink droplet after ejection has a great influence on the printing efficiency and the quality of printed image.

In the inkjet recoding processes, there is a recording method by using an inkjet recording ink that cures by irradiation with radiation ray. In the method, it is possible to improve the printing efficiency and the quality of image, by curing the ink droplet by irradiating it with radiation ray immediately or after a particular period from ejection.

If it is possible to raise the sensitivity of such an inkjet recording ink that cures by irradiation with radiation ray such as ultraviolet light or to raise the efficiency of the ink curing by radiation ray, it is possible to obtain many benefits, such as improvement in inkjet recording efficiency, reduction of power consumption, elongation of the lifetime of radiation ray generator due to decrease in the load, and prevention of evaporation of low-molecular mass substances due to insufficient curing. In addition, the improvement in sensitivity is effective in increasing the strength of the image formed with inkjet recording ink, and in particular, when the ink composition is applied to preparation of planographic printing plates, it leads to increase in the hardness of the image part and thus to increase in printing durability.

Such an inkjet process by using an ink composition that cures by radiation ray such as ultraviolet light is attracting attention recently, as the ink composition is relatively odorless and fast-drying, and allows recording on a recording medium that absorbs a smaller amount of ink; and ultraviolet light-curing ink compositions that harden in radical polymerization for use in the inkjet process are disclosed (e.g., Japanese Patent Application Laid-Open (JP-A) Nos. 63-235382, 3-216379, and 5-214280, and Japanese Patent Application Publication (JP-B) Nos. 6-21256 and 6-62905).

In addition, for the purpose of providing an inkjet recording ink that gives an image higher in sensitive and adhesiveness to the recording medium without ink bleeding, even when printed on a support, on which it is normally difficult to record by the inkjet recording method, and that is higher in stability without smaller skin irritation or sensitization, compositions containing polymerizable compounds of particular radically polymerizable acrylates and a colorant were disclosed (e.g., JP-A Nos. 2003-192943 and 2003-192944).

These radically polymerizable inks are superior in curing speed and give an image without ink bleeding, but also had a disadvantage that the adhesiveness to recording medium deteriorates by the volume shrinkage during curing.

Accordingly, for the purpose of improving the adhesiveness to recording medium, cationically polymerizable ink compositions resistant to the shrinkage during ultraviolet light-curing were proposed (e.g., JP-A No. 9-183928). However, these cationically polymerizable inks had an insufficient stability during storage because of the reactions of the acids generated therein over time, which was the great obstacle for commercialization of these inks. For improvement in the storage stability, methods of adding a basic compound or a thermal base-generating agent were proposed (e.g., JP-A Nos. 2003-312121, 2003-341217 and 2004-91558). However, use of a basic compound resulted in emergence of a new problem that the curing efficiency of ink was lowered by the basic compound added, because it inhibited the function of the acid generated by light exposure.

In addition, conventional curable compositions such as the inks described above caused a problem of undesirable progress of curing reaction when stored under a high-temperature environment.

Currently as described above, there is still no curable composition that can be applied to UV curing ink composition, form a film highly sensitive to radiation ray irradiation and superior in strength and is also heat resistant.

SUMMARY OF THE INVENTION

The present invention has been made in consideration of the above situations.

The present invention provides a curable composition that cures highly sensitively to a radiation ray irradiation and gives a high-strength film and is also superior in heat resistance.

The invention also provides an ink composition that cures highly sensitively to a radiation ray irradiation and gives a high-strength film and is superior in adhesiveness to the recording medium, and an inkjet recording method using the ink composition.

The invention also provides a printed material, a planographic printing plate, and a method of producing a planographic printing plate by using the ink composition that cures highly sensitively to radiation ray irradiation.

A first aspect of the invention provides a curable composition comprising a compound having a partial structure represented by the following formula (I) and a partial structure represented by the following formula (II).

Formula (I)

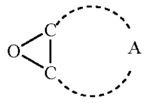

Formula (II)

$$-O-(R^1-O)_n-$$

In formula (I), A represents a group capable of forming a four- or more-membered bivalent alicyclic alkyl group with neighboring carbon atoms; and in formula (II), $R^1$ represents an alkylene, a cycloalkylene, or an arylene group, and n represents an integer of 1 or more.

A second aspect of the invention provides an ink composition comprising the curable composition according to the invention. The ink composition of the invention is suitable for inkjet recording.

A third aspect of the invention provides an inkjet recording method comprising ejecting the ink composition according to the invention onto a recording medium by an inkjet recording apparatus; and then curing the ejected ink composition by irradiation of an active radiation ray.

A fourth aspect of the invention provides a printed material which is recorded by the inkjet recording method according to the invention.

A fifth aspect of the invention provides a method of producing a planographic printing plate comprising ejecting the ink composition according to the invention onto a support; and then curing the ejected ink composition by irradiation of an active radiation ray so as to form a hydrophobic image.

A sixth aspect of the invention provides a planographic printing plate prepared by the method of producing a planographic printing plate according to the invention.

The curable composition according to the invention is useful as an ink composition such as UV-curing ink, paint, adhesive, and the like, as well as an optical molding material for resist, color filter, optical disk, and the like.

In particular, the curable composition is favorably used as an inkjet ink composition, and such an ink composition according to the invention cures highly sensitively to radiation ray such as ultraviolet ray, gives a high-quality image, and superior in adhesiveness to the recording medium. The composition can also exhibit storage stability.

In addition when the inkjet recording method is used, even if ejected on a non-absorptive recording medium the ink composition cures highly sensitively, forming a high-strength image region thereon directly based on digital data. Thus, the ink composition according to the invention can be used in production of a planographic printing plate, in particular having an area of A2 paper or more, and the planographic printing plate thus obtained is superior in printing durability.

DETAIL DESCRIPTION OF THE INVENTION

[Curable Composition]

The curable composition according to the present invention contains a compound having a partial structure represented by the following formula (I) and a partial structure represented by the following formula (II) (hereinafter, arbitrarily referred to as "specific polymerizable compound").

Formula (I)

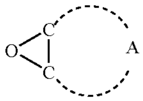

Formula (II)

$$-O-(R^1-O)_n-$$

In formula (I), A represents an group capable of forming a four- or more-membered bivalent alicyclic alkyl group with neighboring carbon atoms. In formula (II), $R^1$ represents an alkylene, a cycloalkylene, or an arylene group, and n represents an integer of 1 or more.

The curable composition according to the invention is a composition that cures by irradiation of a radiation ray.

The "radiation ray" in the invention is not particularly limited, if it provides the composition with an energy to generate an initiating species by irradiation, and examples thereof include wide range of rays such as α ray, γ ray, X ray, ultraviolet ray, visible light, and electron beam. Among them, ultraviolet ray and electron beam are preferable, and ultraviolet ray is particularly preferable, from the viewpoints of curing sensitivity and availability of the apparatus. Thus, the curable composition according to the invention is preferably a composition that cures by irradiation of an ultraviolet ray as the radiation ray.

A particularly favorable embodiment of the curable composition according to the invention is an ink composition containing the curable composition. Hereinafter, the curable composition according to the invention will be described, by taking the configuration of the ink composition (ink composition according to the invention) as an example, but is not limited thereto.

(Specific Polymerizable Compound)

The specific polymerizable compound according to the invention will be described.

The specific polymerizable compound is a compound having a partial structure represented by the following formula (I) (hereinafter, arbitrarily referred to as "partial structure (I)") and a partial structure represented by the formula (II) (hereinafter, arbitrarily referred to as "partial structure (II)") in its molecular structure.

The specific polymerizable compound according to the invention is preferably a compound that initiates polymerization reaction and cures by an acid generated from the compound that generates acid by irradiation of a radiation ray described below.

In the partial structure (I), A represents an group capable of forming a four- or more-membered bivalent alicyclic alkyl group with neighboring carbon atoms. The alicyclic alkyl group is preferably an alicyclic alkyl group having 4 to 12 carbon atoms, more preferably an alicyclic alkyl group having 4 to 9 carbon atoms, and particularly preferably an alicyclic alkyl group having 5 to 7 carbon atoms.

Specifically, the partial structure (I) is particularly preferably one of the partial structures shown below from the viewpoint of reactivity.

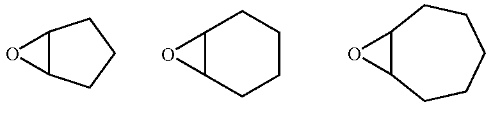

The partial structure (I) may have one or more substituent groups if possible, and examples of the substituent groups include halogen atoms, an alkoxy group, an aryloxy group, a nitro group, and an amino group.

The specific polymerizable compound may contain a single partial structure (I) or two or more of them, but the specific polymerizable compound preferably contains a single partial structure (I).

The partial structure (I) is present as it is bonded to the main chain of the specific polymerizable compound via the group A. The partial structure (I) may be present at the terminal or in the main chain of the specific polymerizable compound.

In partial structure (II), $R^1$ represents an alkylene, a cycloalkylene, or an arylene group.

The alkylene group represented by $R^1$ includes an alkylene group having 2 to 12 carbon atoms (preferably 2 to 8, and more preferably 2 to 6). Specific examples thereof include ethylene, propylene, isopropylene, butylene, pentylene, and hexylene groups, and the like.

The cycloalkylene group represented by $R^1$ includes a cycloalkylene group having 4 to 12 carbon atoms (preferably 4 to 8 and more preferably 5 to 7). Specific examples thereof include groups obtained by subtracting a hydrogen atom from cycloheptyl, cyclohexyl, cyclopentyl, and bicyclo ring groups, and the like.

The arylene group represented by $R^1$ includes an arylene group having 6 to 12 carbon atoms (preferably 6 to 12 and more preferably 6 to 8). Specifically, it is preferably a phenyl, a biphenyl, a naphthyl, or a benzyl group, more preferably a phenyl or a benzyl group, from which a hydrogen atom is subtracted.

If possible, $R^1$ may have one or more substituents. Examples of the substituent groups include halogen atoms, an alkoxy group, an aryloxy groups, a nitro group, an amino group, and the like. However, a unsubstituted alkylene, a cycloalkylene, or an arylene group is preferable.

n represents an integer of 1 or more, preferably an integer of 1 to 8, more preferably an integer of 1 to 6, and particularly preferably an integer of 2 to 4.

The partial structure (II) may be bonded to the carbon atom in the group A of partial structure (I) via a connecting group such as an alkylene, a cycloalkylene, or an arylene group.

The specific polymerizable compound may contain only one, or two or more of the partial structures (II).

In addition, the specific polymerizable compound may contain a partial structure other than the partial structures (I) and (II) in its molecular structure.

In a particularly preferable embodiment, the specific polymerizable compound includes a single partial structure (I) which has a cyclic structure having 6 carbon atoms, and in the partial structure (II), $R^1$ is an alkyl group having 1 to 4 carbon atoms, and n represents an integer of 2 to 4.

Hereinafter, examples of the specific polymerizable compounds according to the invention will be listed [exemplary compounds (1) to (19)], but the invention is not restricted by these examples.

(1)

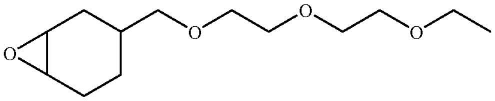

(2)

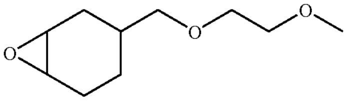

(3)

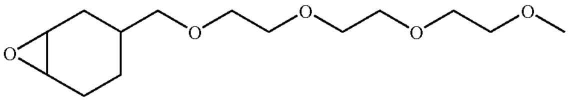

(4)

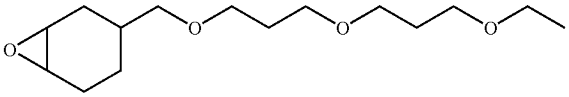

(5)

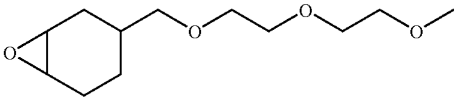

(6)

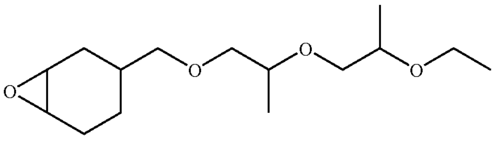

-continued
(7)
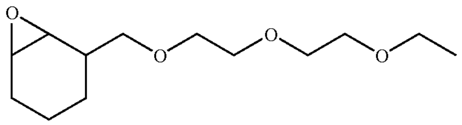
(8)
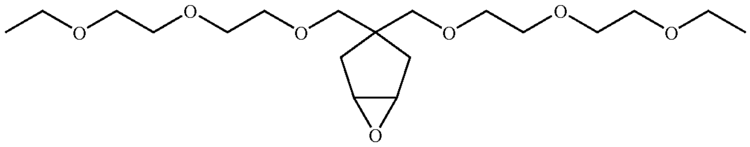
(9)
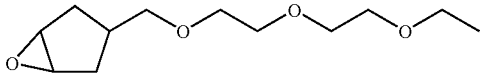
(10)
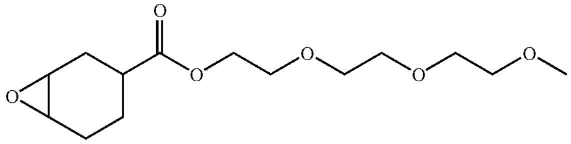
(11)
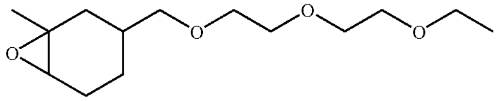
(12)
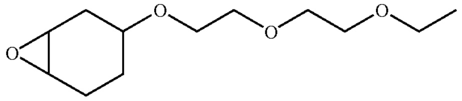
(13)
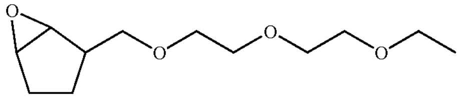
(14)
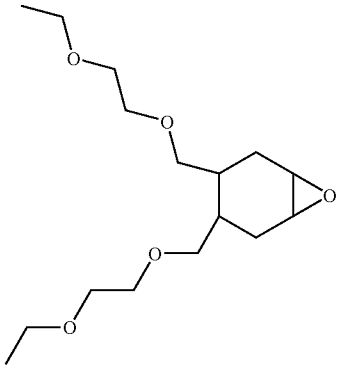
(15)
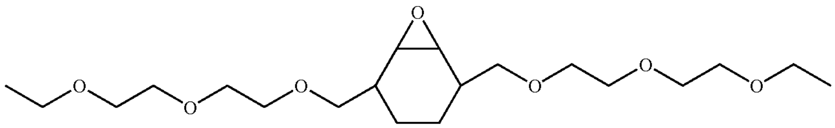
(16)
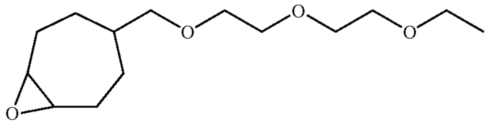

-continued (17)

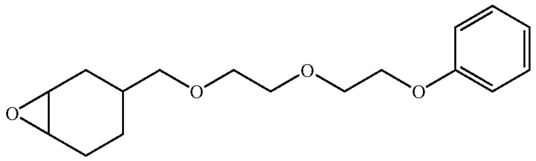

(18)

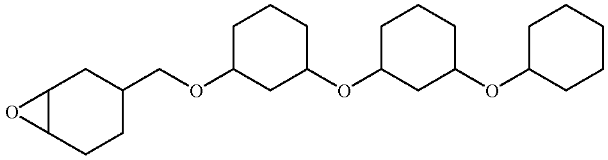

(19)

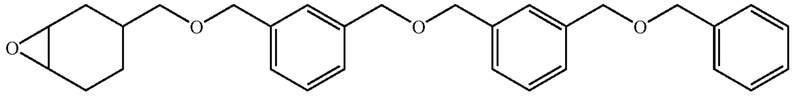

The method of producing the specific polymerizable compound will be specifically described below. However, the method of producing the specific polymerizable compound is not limited thereto.

The specific polymerizable compound can be produced, for example, by the following producing method.

(1) Raw Materials

The raw materials for the specific polymerizable compound will be described below.

Any raw materials may be used as the raw materials for the specific polymerizable compound, if they gives an oxetane compound in dehydrochlorination reaction according to the Motoi's method (Motoi et al., Bull. Chem. Soc. Jpn. 61, 1998). Specifically, the specific polymerizable compound can be produced in etherification reaction between a cyclic epoxy alcohol compound represented by the following formula (III) and an ether compound represented by the following formula (IV) containing a leaving group such as a halogen atom or a sulfonic ester group.

Formula (III)

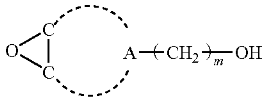

In formula (III), A represents an group capable of forming a four- or more-membered bivalent alicyclic alkyl group together with neighboring carbon atoms; and m is an integer of 1 or more.

$X—O—(R^3—O)_n—R^4$ Formula (IV)

In formula (IV), $R^4$ represents an alkyl, a cycloalkyl, or an ryl group. $R^3$ represents an alkylene, a cycloalkylene, or an arylene group. n represents an integer of 1 or more. X represents a leaving group such as a halogen atom or a sulfonic ester group.

Examples of the cyclic epoxy alcohol compounds represented by the formula (III) include 3,4-epoxycyclohexylmethanol, 3,4-epoxycyclohexylethanol, 3,4-epoxycyclohexylpropanol, 3-methyl-3,4-epoxycyclohexylmethanol, 4-methyl-3,4-epoxycyclohexylmethanol, 3,4-epoxycyclopentylmethanol, 3,4-dimethyl-3,4-epoxycyclohexylmethanol, 2,3-epoxy-1,4-bismethanol, 4,5-epoxycycloheptylmethanol, and the like, which may be used individually or in combination of two or more species.

Examples of the ether compounds represented by the formula (IV) having a leaving group such as a halogen atom or sulfonic ester group include 2-chloroethyl ethylether, 2-bromoethyl ethylether, 3-chloropropyl ethylether, 3-bromopropyl ethylether, 4-chlorobutyl ethylether, 4-bromobutyl ethylether, 2-bromoethyl methylether, ethylene glycol 2-bromoethyl ethylether, bis(2-chloroethyl)ether, bis(2-bromoethyl)ether, bis(3-chloropropyl)ether, bis(3-bromopropyl)ether, bis(4-chlorobutyl)ether, bis(4-bromobutyl)ether, bis(2-bromoethyl)ether, 1,2-bis(2-chloroethoxy)ethane, 1,2-dibromoethane, and the like, which may be used individually or in combination of two or more species.

The reaction ratio of the cyclic epoxy alcohol compound represented by the formula (III) to the ether compound represented by the formula (IV) having a leaving group such as a halogen atom or sulfonic ester group is not particularly limited, but, the ether compound represented by the formula (IV) having a leaving group such as a halogen atom or sulfonic ester group is used in an amount in the range of 0.1 to 10 mole with respect to 1 mole of the cyclic epoxy alcohol compound represented by the formula (III). The ether compound represented by the formula (IV) having a leaving group such as a halogen atom or sulfonic ester group is more preferably used in an amount in the range of 0.3 to 3.0 moles with respect 1 mole of the cyclic epoxy alcohol compound represented by the formula (III).

(2) Reaction Temperature

The reaction temperature in production of the specific polymerizable compound will be described below. The reaction temperature is determined, considering for example the yield of the specific polymerizable compound, but is preferably, for example, in the range of 0 to 100° C. A reaction temperature of lower than 0° C. leads to drastic decrease in reactivity of the reaction raw materials and possibly to drastic decrease in yield, while a reaction temperature of higher than 100° C. to restriction on the kind of usable organic solvent. Thus, the reaction temperature in production of the specific polymerizable compound is more preferably in the range of 10 to 90° C. and still more preferably in the range of 20 to 80° C.

(3) Reaction Period

The reaction period in producing the specific polymerizable compound will be described below. The reaction period is decided, considering the yield of the specific polymerizable compound and the reaction temperature, but preferably, for example, in the range of 10 minutes to 100 hours when the reaction temperature is 0 to 100° C. A reaction period of shorter than 10 minutes leads to increase in the amount of the residual unreacted raw materials, while a reaction period of longer than 100 hours to decrease in productivity. Thus, the reaction period in producing the specific polymerizable compound is more preferably in the range of 30 minutes to 50 hours and still more preferably in the range of 1 to 10 hours.

(4) Reaction Environment (pH)

The reaction environment (pH) in producing the specific polymerizable compound will be described below. The reaction environment (pH value) is decided, considering the yield of the specific polymerizable compound and others, but preferably, for example, in the range of 5 to 14. A pH value of less than 5 may lead to increase in the amount of by-products and decrease in yield, while a pH value of more than 14 to restriction on the kinds of raw materials used. Thus, the pH value in production of the specific polymerizable compound is more preferably in the range of 6 to 14 and still more preferably in the range of 7 to 14. It is preferable to add an alkali such as sodium hydroxide or potassium hydroxide, for adjustment of the pH value in the range above.

(5) Phase-Transfer Catalyst

The phase-transfer catalyst used in production of the specific polymerizable compound will be described next. The phase-transfer catalyst for improving the reactivity between the cyclic epoxy alcohol compound and the ether compound having a leaving group such as a halogen atom or sulfonic ester group is preferably added, for example, in an amount in the range of 0.1 to 30 parts by mass with respect to 100 parts by mass of the total amount of the raw materials. An added phase-transfer catalyst amount of less than 0.1 part by mass may lead to drastic decrease in reactivity among raw materials and drastic decrease in yield, while an addition amount of more than 30 parts by mass to difficulty of purification. Thus, the amount of the phase-transfer catalyst added during preparation of the specific polymerizable compound is more preferably in the range of 1.0 to 20.0 parts by mass, still more preferably in the range of 2.0 to 10.0 parts by mass, with respect to 100 parts by mass of the raw materials.

The phase-transfer catalyst is not particularly limited, but is preferably, for example, a quaternary ammonium salt, a quaternary phosphonium salt, or a mixture of them. Specific examples thereof include tetra-n-butylammonium bromide, tetramethyllammonium bromide, benzyltriethylammonium bromide, hexadecyltrimethylammonium bromide, triethylhexadecylammonium bromide, trioctylmethylammonium bromide, methyltriphenylphosphonium bromide, triethylhexadecylphosphonium bromide, tetraphenylphosphonium bromide, tetrabutylphosphonium bromide, and the like, and the mixtures of two or more thereof.

(6) Organic Solvent

The organic solvent for use in production of the specific polymerizable compound will be described next. The organic solvent is preferably a good solvent for the raw materials having a boiling point of 250° C. or lower under atmospheric pressure from the viewpoint of productivity. Examples of the organic solvents include hydrocarbons such as hexane, heptane, and octane; halogenated hydrocarbons such as dichloromethane and chloroform; ethers such as diethylether, dibutylether, ethylene glycol dimethylether, tetrahydrofuran, and dioxane; ketones such as acetone, methylethylketone, methylisobutylketone and cyclohexanone; esters such as ethyl acetate, butyl acetate, amyl acetate and γ-butylolactone; aromatic hydrocarbons such as benzene, toluene and xylene; and the mixtures of two or more thereof.

The structure of the specific polymerizable compound obtained by the production method above can be confirmed from $^1$H-NMR and IR spectra.

The content of the specific polymerizable compound is preferably 1 to 90 mass %, more preferably 1 to 70 mass %, and still more preferably 1 to 50 mass %, based on a total solid content constituting the curable composition according to the invention.

The curable composition according to the invention may contain other polymerizable compounds (cationic polymerizable compounds) described below in detail in addition to the specific polymerizable compound in the range that does not impair the advantageous effects of the invention.

In the invention, at least one compound selected from epoxy compounds and oxetane compounds not include in the specific polymerizable compounds described below and a vinylether compound are preferably used as other polymerizable compounds, in combination with the specific polymerizable compound, for effective reduction of the shrinkage of the composition during curing.

(Another Polymerizable Compounds)

Another cationic polymerizable compound used in the invention is not particularly limited, if it is a compound as described below that initiates polymerization reaction and cures by an acid generated from a compound that generates acid by irradiation of a radiation ray, and any one of various cationically polymerizable monomers known as photocationically polymerizable monomers may be used. Examples of the cation polymerizable monomers include epoxy compounds, vinyl ether compounds, and other oxetane compounds not included in the specific polymerizable compounds that are described in JP-A Nos. 6-9714, 2001-31892, 2001-40068, 2001-55507, 2001-310938, 2001-310937, and 2001-220526 and others, and the like.

The epoxy compounds include aromatic epoxides, alicyclic epoxides, aromatic epoxides, and the like.

The aromatic epoxides are, for example, di- or poly-glycidyl ethers prepared in reaction of a polyvalent phenol having at least one aromatic ring or the alkyleneoxide adduct thereof with epichlorohydrin, and example thereof include di- or poly-glycidyl ethers of bisphenol A or the alkyleneoxide adduct thereof, di- or poly-glycidyl ethers of a hydrogenated bisphenol A or the alkyleneoxide adduct thereof, novolak epoxy resins, and the like. The alkyleneoxide is ethyleneoxide, propyleneoxide, or the like.

The alicyclic epoxide is preferably, for example, a compound containing cylcohexeneoxide or cyclopenteneoxide obtained by epoxidizing a compound having at least one cycloalkane ring such as cyclohexene or cyclopentene with an oxidizing agent such as hydrogen peroxide or a peracid.

Examples of the aliphatic epoxides include di- or polyglycidyl ethers of an aliphatic polyvalent alcohol or the alkyleneoxide adduct thereof, and typical examples thereof include alkylene glycol diglycidyl ethers such as ethylene glycol diglycidyl ether, propylene glycol diglycidyl ether and 1,6-hexanediol diglycidyl ether; polyvalent alcohol polyglycidyl ethers such as di- or tri-glycidyl ethers of glycerol or the alkyleneoxides adduct thereof; polyalkylene glycol diglycidyl ethers such as diglycidyl ether of polyethylene glycol or the alkyleneoxide adduct thereof and diglycidyl ether of a polypropylene glycol or the alkyleneoxide adducts thereof, and the like. The alkyleneoxide is ethyleneoxide, propyleneoxide, or the like.

The monofunctional and polyfunctional epoxy compounds for use in the invention will be described in detail below.

Examples of the monofunctional epoxy compounds include phenyl glycidylether, p-tert-butylphenyl glycidylether, butyl glycidylether, 2-ethylhexyl glycidylether, allyl glycidylether, 1,2-butyleneoxide, 1,3-butadienemonooxide, 1,2-epoxydodecane, epichlorohydrin, 1,2-epoxydecane, styreneoxide, cylcohexeneoxide, 3-methacryloyloxymethylcylcohexeneoxide, 3-acryloyloxymethylcylcohexeneoxide, 3-vinylcylcohexeneoxide, and the like.

Examples of the multifunctional epoxy compounds include bisphenol A diglycidylether, bisphenol F diglycidylether, bisphenol S diglycidylether, brominated bisphenol A diglycidylether, brominated bisphenol F diglycidylethers, brominated bisphenol S diglycidylether, epoxy novolak resins, hydrogenated bisphenol A diglycidylethers, hydrogenated bisphenol F diglycidylethers, hydrogenated bisphenol S diglycidylethers, 3,4-epoxycyclohexylmethyl-3',4'-epoxycyclohexanecarboxylate, 2-(3,4-epoxycyclohexyl-5,5-spiro-3,4-epoxy)cyclohexane-meta-dioxane, bis(3,4-epoxycyclohexylmethyl) adipate, vinylcylcohexeneoxide, 4-vinylepoxycyclohexane, bis(3,4-epoxy-6-methylcyclohexylmethyl) adipate, 3,4-epoxy-6-methylcyclohexyl-3',4'-epoxy-6'-methylcyclohexanecarboxylate, methylene-bis(3,4-epoxycyclohexane), dicyclopentadiene diepoxide, ethylene glycol di(3,4-epoxycyclohexylmethyl)ether, ethylene bis(3,4-epoxycyclohexanecarboxylate), epoxyhexahydrodioctyl phthalate, epoxyhexahydrodi-2-ethylhexyl phthalate, 1,4-butanediol diglycidylether, 1,6-hexanediol diglycidylether, glycerol triglycidylether, trimethylolpropane triglycidylether, polyethylene glycol diglycidylether, polypropylene glycol diglycidylether, 1,1,3-tetradecadienedioxide, limonenedioxide, 1,2,7,8-diepoxyoctane, 1,2,5,6-diepoxycyclooctane, and the like.

Among these epoxy compounds, aromatic and alicyclic epoxides are preferable from the viewpoint of curing speed, and alicyclic epoxides are particularly preferable.

Examples of the vinyl ether compounds include di- or tri-vinyl ether compounds such as ethylene glycol divinylether, diethylene glycol divinylether, triethylene glycol divinylether, propylene glycol divinylether, dipropylene glycol divinylether, butanediol divinylether, hexanediol divinylether, cyclohexanedimethanol divinylether, and trimethylolpropane trivinylether; monovinylether compounds such as ethyl vinylether, n-butyl vinylether, isobutyl vinylether, octadecyl vinylether, cyclohexyl vinylether, hydroxybutyl vinylether, 2-ethylhexyl vinylether, cyclohexanedimethanol monovinylether, n-propyl vinylether, isopropyl vinylether, isopropenylether-O-propylene carbonate, dodecyl vinylether, diethylene glycol monovinylether, and octadecyl vinylether; and the like.

Hereinafter, the monofunctional and multifunctional vinyl ethers will be described in detail.

Examples of the monofunctional vinylethers include methyl vinylether, ethyl vinylether, propyl vinylether, n-butyl vinylether, t-butyl vinylether, 2-ethylhexyl vinylether, n-nonyl vinylether, lauryl vinylether, cyclohexyl vinylether, cyclohexylmethyl vinylether, 4-methylcyclohexylmethyl vinylether, benzyl vinylether, dicyclopentenyl vinylether, 2-dicyclopentenoxyethyl vinylether, methoxyethyl vinylether, ethoxyethyl vinylether, butoxyethyl vinylether, methoxyethoxyethyl vinylether, ethoxyethoxyethyl vinylether, methoxypolyethylene glycol vinylether, tetrahydrofurfuryl vinylether, 2-hydroxyethyl vinylether, 2-hydroxypropyl vinylether, 4-hydroxybutyl vinylether, 4-hydroxymethylcyclohexylmethyl vinylether, diethylene glycol monovinylether, polyethylene glycol vinylether, chloroethyl vinylether, chlorobutyl vinylether, chloroethoxyethyl vinylether, phenylethyl vinylether, phenoxypolyethylene glycol vinylether, and the like.

Examples of the multifunctional vinylethers include divinyl ethers such as ethylene glycol divinylether, diethylene glycol divinylether, polyethylene glycol divinylether, propylene glycol divinylether, butylene glycol divinylether, hexanediol divinylether, bisphenol A alkyleneoxide divinylethers, and bisphenol F alkyleneoxide divinylethers; multifunctional vinyl ethers such as trimethylolethane trivinylether, trimethylolpropane trivinylether, ditrimethyrollpropane tetravinylether, glycerol trivinylether, pentaerythritol tetravinylether, dipentaerythritol pentavinylether, dipentaerythritol hexavinylether, ethyleneoxide adducts of trimethylolpropane trivinylether, propyleneoxide adducts of trimethylolpropane trivinylether, ethyleneoxide adducts of ditrimethyrollpropane tetravinylether, propyleneoxide adducts of ditrimethyrollpropane tetravinylether, ethyleneoxide adducts of pentaerythritol tetravinylether, propyleneoxide adducts of pentaerythritol tetravinylether, ethyleneoxide adducts of dipentaerythritol hexavinylether, and propyleneoxide adducts of dipentaerythritol hexavinylether, and the like.

Di- or tri-vinylether compounds are preferable as the vinyl ether compounds, form the viewpoints of curing efficiency, adhesiveness to recording medium, and the surface hardness of formed image; and divinylether compounds are particularly preferable.

Any one of known other oxetane compounds, specifically compounds having no partial structure (II), such as those described in JP-A Nos. 2001-220526, 2001-310937, and 2003-341217 may be used as the other oxetane compound for use in combination in the invention, as it is selected properly. The oxetane ring-containing compound for use in combination in the curable composition according to the invention is preferably a compound having one to four oxetane rings in the structure. Use of such a compound allows easier control of the viscosity of ink composition in the range favorable in handling, and gives the ink after curing excellent adhesiveness to the recording medium, when it is applied, for example, to an ink composition.

Examples of the compounds having one or two oxetane rings in the molecule that are used additionally in the invention include the compounds represented by the following formulae (1) to (3), and the like.

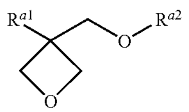

(1)

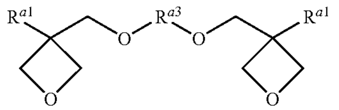

(2)

-continued (3)

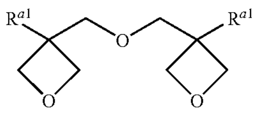

$R^{a1}$ represents a hydrogen atom, an alkyl group having 1 to 6 carbon atoms, a fluoroalkyl group having 1 to 6 carbon atoms, an allyl group, an aryl group, a furyl group or a thienyl group. If there are two $R^{a1}$ groups in a molecule, they may be the same as or different from each other. Examples of the alkyl groups include methyl, ethyl, propyl, and butyl group, and the like; and favorable examples of the fluoroalkyl groups include the alkyl groups above of which any one or more of the hydrogen atoms are substituted with fluorine atoms.

$R^{a2}$ represents a hydrogen atom, an alkyl group having 1 to 6 carbon atoms, an alkenyl group having 2 to 6 carbon atoms, a group having an aromatic ring, an alkylcarbonyl group having 2 to 6 carbon atoms, an alkoxycarbonyl group having 2 to 6 carbon atoms, or an N-alkylcarbamoyl group having 2 to 6 carbon atoms. Examples of the alkyl group include methyl, ethyl, propyl, and butyl group, and the like; and examples of the alkenyl groups include 1-propenyl, 2-propenyl, 2-methyl-1-propenyl, 2-methyl-2-propenyl, 1-butenyl, 2-butenyl, and 3-butenyl groups, and the like; and examples of the groups having an aromatic ring include phenyl, benzyl, fluorobenzyl, methoxybenzyl, and phenoxyethyl groups and the like. Examples of the alkylcarbonyl groups include ethylcarbonyl, propylcarbonyl, and butylcarbonyl groups and the like; examples of the alkoxycarbonyl groups include ethoxycarbonyl, propoxycarbonyl, and butoxycarbonyl groups and the like; and examples of the N-alkylcarbamoyl groups include ethylcarbamoyl, propylcarbamoyl, butylcarbamoyl, and pentylcarbamoyl groups and the like. In addition, $R^{a2}$ may have a substituent group; and examples of the substituent groups include alkyl groups having 1 to 6 carbon atoms and a fluorine atom.

$R^{a3}$ represents a linear or branched alkylene group, a linear or branched poly(alkyleneoxy) group, a linear or branched unsaturated hydrocarbon group, a carbonyl group or a carbonyl group-containing alkylene group, a carboxyl group-containing alkylene group, a carbamoyl group-containing alkylene group, or a group shown below. Examples of the alkylene groups include ethylene, propylene, and butylene groups and the like; and examples of the poly(alkyleneoxy) groups include poly(ethyleneoxy) and poly(propyleneoxy) groups and the like. Examples of the unsaturated hydrocarbon groups include propenylene, methylpropenylene, and butenylene groups, and the like.

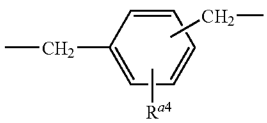

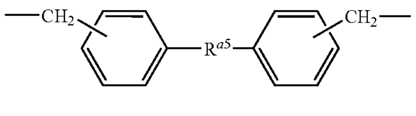

-continued

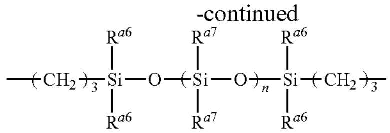

When $R^{a3}$ is one of the polyvalent group, $R^{a4}$ represents a hydrogen atom, an alkyl group having 1 to 4 carbons, an alkoxy group having 1 to 4 carbons, a halogen atom, a nitro group, a cyano group, a mercapto group, a lower alkylcarboxyl group, a carboxyl group, or a carbamoyl group.

$R^{a5}$ represents an oxygen or sulfur atom, a methylene group, NH, SO, $SO_2$, $C(CF_3)_2$, or $C(CH_3)_2$. $R^{a6}$ represents an alkyl group having 1 to 4 carbons or an aryl group; and n represents an integer of 0 to 2,000. $R^{a7}$ represents an alkyl group having 1 to 4 carbons, an aryl group, or a monovalent group having the following structure. In the formula below, $R^{a8}$ represents an alkyl group having 1 to 4 carbons or an aryl group; and m is an integer of 0 to 100.

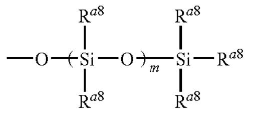

Examples of the compounds represented by the formula (1) include 3-ethyl-3-hydroxymethyloxetane (OXT-101: manufactured by Toagosei Co., Ltd.), 3-ethyl-3-(2-ethylhexyloxymethyl)oxetane (OXT-212: manufactured by Toagosei Co., Ltd.), and 3-ethyl-3-phenoxymethyloxetane (OXT-211: manufactured by Toagosei Co., Ltd.). Examples of the compounds represented by the formula (2) include 1,4-bis[(3-ethyl-3-oxetanylmethoxy)methyl)benzene (OXT-121: Toagosei Co., Ltd. In addition, examples of the compounds represented by the formula (3) include bis(3-ethyl-3-oxetanylmethyl)ether (OXT-221: Toagosei Co., Ltd.).

Examples of the compounds having 3 or 4 oxetane rings include the compounds represented by the following formula (4).

(4)

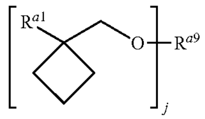

In formula (4), $R^{a1}$ is the same as that in formula (1) above. Examples of the polyvalent connecting group $R^{a9}$ include branched alkylene group having 1 to 12 carbon atoms such as the groups represented by the following groups A to C, branched poly(alkyleneoxy) groups such as the groups represented by the following group D, and branched polysiloxy groups such as the group represented by the following group E, and the like. j is 3 or 4.

A

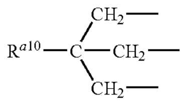

-continued

B

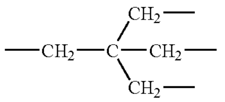

C

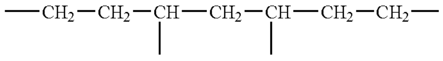

D

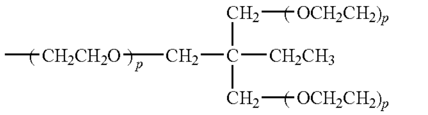

E

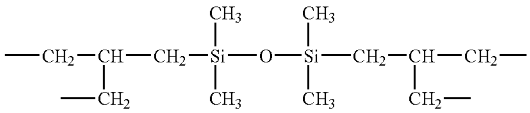

In the group A, $R^{a10}$ represents a methyl, ethyl or propyl group. In the group D, p is an integer of 1 to 10.

Other examples of the oxetane compounds favorably used in the invention include compounds represented by the following formula (5) having oxetane rings on the side chains.

(5)

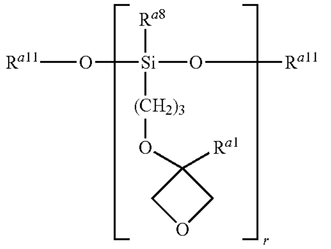

In formula (5), $R^{a8}$ is the same as that in the formula above. $R^{a11}$ represents an alkyl group having 1 to 4 carbon atoms such as methyl, ethyl, propyl or butyl, or a trialkylsilyl group; and r is 1 to 4.

Such compounds having oxetane rings are described in detail in JP-A No. 2003-341217, paragraph numbers [0021] to [0084] above; and the compounds described there can be used favorably in the invention.

The oxetane compounds described in JP-A No. 2004-91556 may also be used in the invention. The compounds are described in detail in paragraph numbers [0022] to [0058] thereof.

Among the oxetane compounds for use in the invention, use of a compound having one oxetane ring is preferable, from the viewpoints of the viscosity and the tackiness of ink composition.

When a specific polymerizable compound and another cationic polymerizable compound are used in combination in the invention, the content ratio of the specific polymerizable compound to the other cationic polymerizable compound is preferably 10:1 to 10:100, more preferably 10:3 to 10:80, and still more preferably 10:5 to 10:60.

(Compound that Generates Acid by Irradiation of a Radiation Ray)

The curable composition according to the invention preferably contains a compound that generates acid by irradiation with radiation ray (hereinafter, arbitrarily referred to as "photo acid generating agent").

In the invention, the polymerizable compound initiates polymerization reaction and cures by the acid generated by irradiation of a radiation ray.

A photocationically polymerizable photoinitiator, a photoradically polymerizable photoinitiator, a photodecolorant to colorants, a photoalterant, or a compound that generates acid by irradiation of light such as the light used for microresists (ultraviolet light at a wavelength of 400 to 200 nm, far ultraviolet ray, particularly preferably, g-ray, h-ray, i-ray, or KrF excimer laser beam), ArF excimer laser beam, electron beam, X-ray, molecular or ion beam, or the like, may be used, as properly selected, as the photo acid generating agent for use in the ink composition according to the invention.

Examples of the photo acid generating agents include onium salt compounds such as diazonium salts, phosphonium salts, sulfonium salts and iodonium salts and sulfonate compounds such as imidosulfonates, oxime sulfonates, diazodisulfones, disulfones, and o-nitrobenzyl sulfonates that decompose and generate acid by irradiation with radiation ray, and the lime.

Other examples of the compounds that generates an acid by irradiation with radiation ray or other activated light (photo acid generating agents) used in the invention include the diazonium salts described in S. I. Schlesinger, Photogr. Sci. Eng., 18, 387 (1974), T. S. Bal et al., Polymer, 21, 423 (1980), and others; the ammonium salts described in U.S. Pat. Nos. 4,069,055, 4,069,056, and Re 27,992, JP-A No. 3-140,140, and others; the phosphonium salts described in D. C. Necker et al., Macromolecules, 17, 2468 (1984), C. S. Wen et al, Teh. Proc. Conf. Rad. Curing ASIA, p. 478 Tokyo, October (1988), U.S. Pat. Nos. 4,069,055 and 4,069,056, and others; the iodonium salts described in J. V. Crivello et al., Macromolecules, 10(6), 1307 (1977), Chem. & Eng. News, Nov. 28, p. 31 (1988), EP Nos. 104,143, 339,049, and 410,201, JP-A Nos. 2-150,848 and 2-296,514, and others;

the sulfonium salts described in J. V: Crivello et al., Polymer J. 17, 73 (1985), J. V. Crivello et al., J. Org. Chem., 43, 3055 (1978), W. R. Watt et al., J. Polymer Sci., Polymer Chem. Ed., 22, 1789 (1984), J. V. Crivello et al., Polymer Bull., 14, 279 (1985), J. V. Crivello et al., Macromolecules, 14(5), 1141 (1981), J. V. Crivello et al., J. Polymer Sci., Polymer Chem. Ed., 17, 2877 (1979), EP Nos. 370,693, 161, 811, 410,201, 339,049, 233,567, 297,443, and 297,442, U.S. Pat. Nos. 3,902,114, 4,933,377, 4,760,013, 4,734,444, and 2,833,827, German Patent Nos. 2,904,626, 3,604,580, and 3,604,581, JP-A Nos. 7-28237 and 8-27102, and others;

the selenonium salts described in J. V. Crivello et al., Macromolecules, 10(6), 1307 (1977), J. V. Crivello et al., J. Polymersci., Polymer Chem. Ed., 17, 1047 (1979), and others; the onium salts such as arsonium salts described in C. S. Wen et al., Teh, Proc. Conf. Rad. Curing ASIA, p. 478 Tokyo, October (1988), and others; the organic halogen compounds described in U.S. Pat. No. 3,905,815, JP-B No. 46-4605, JP-A Nos. 48-36281, 55-32070, 60-239736, 61-169835, 61-169837, 62-58241, 62-212401, 63-70243, and 63-298339, and others; the organic metals/organic halides described in K. Meier et al., J. Rad. Curing, 13(4), 26 (1986), T. P. Gill et al., Inorg. Chem., 19, 3007 (1980), D. Astruc, Acc. Chem. Res., 19 (12), 377 (1896), JP-A No. 2-161445, and others;

the photo acid generating agents containing an O-nitrobenzyl protecting group described in S. Hayase et al., J. Polymer Sci., 25, 753 (1987), E. Reichmanis et al., J. Polymer Sci., Polymer Chem. Ed., 23, 1 (1985), Q. Q. Zhu et al., J. Photochem., 36, 85, 39, 317 (1987), B. Amit et al., Tetrahedron Lett., (24) 2205 (1973), D. H. R. Barton et al., J. Chem Soc., 3571 (1965), P. M. Collins et al., J. Chem. Soc., Perkin 1,1695 (1975), M. Rudinstein et al., Tetrahedron Lett., (17), 1445 (1975), J. W. Walker et al., J. Am. Chem. Soc., 110, 7170 (1988), S. C. Busman et al., J. Imaging Technol., 11(4), 191 (1985), H. M. Houlihan et al., Macromolecules, 21, 2001 (1988), P. M. Collins et al., J. Chem. Soc., Chem. Commun., 532 (1972), S. Hayase et al., Macromolecules, 18, 1799 (1985), E. Reichmanis et al., J. Electrochem. Soc., Solid State Sci. Technol., 130 (6), F. M. Houlihan et al., Macromolcules, 21, 2001 (1988), EP Nos. 0290,750, 046,083, 156,535, 271, 851, and 0,388,343, U.S. Pat. Nos. 3,901,710 and 4,181,531, JP-A Nos. 60-198538 and 53-133022, and others;

the sulfone compounds that photodecompose and generate acid such as iminosulfonates described in M. TUNOOKA et al., Polymer Preprints Japan, 35 (8), G Bemer et al., J. Rad. Curing, 13 (4), W. J. Mijs et al., Coating Technol., 55 (697), 45 (1983), Akzo, H. Adachi et al., Polymer Preprints Japan, 37 (3), EP Nos. 0199,672, 84515, 044,115, 618,564, and 0101, 122, U.S. Pat. Nos. 4,371,605 and 4,431,774, JP-A Nos. 64-18143, 2-245756, and 3-140109, and others; the disulfonated compounds described in JP-A Nos. 61-166544 and 2-71270, and others; and the diazoketosulfone and diazodisulfone compounds described in JP-A Nos. 3-103854, 3-103856, and 4-210960 and others.

In addition, compounds having a group generating acid by the light described above or polymers having such a compound in the main chain or on the side, including those described in M. E. Woodhouse et al., J. Am. Chem. Soc., 104, 5586 (1982), S. P. Pappas et al., J. Imaging Sci., 30 (5), 218 (1986), S. Kondo et al., Macromol. Chem., Rapid Commun., 9, 625 (1988), Y. Yamada et al., Makromol. Chem., 152, 153, 163 (1972), J. V. Crivello et al., J. Polymer Sci., Polymer Chem. Ed., 17, 3845 (1979), U.S. Pat. No. 3,849,137, German Patent No. 3,914,407, JP-A Nos. 63-26653, 55-164824, 62-69263, 63-146038, 63-163452, 62-153853, and 63-146029, and others, may also be used. Examples thereof include onium salts such as diazonium salts, ammonium salts, phosphonium salts, iodonium salts, sulfonium salts, selenonium salts, and arsonium salts; organic halogen compounds, organic metals/organic halides, o-nitrobenzyl protecting group-containing photo acid generating agents, sulfone compounds that generates acid by photochemical decomposition such as iminosulfonates, disulfonated compounds, diazoketosulfones, and diazodisulfone compounds.

The compounds that generate acid by light described in V. N. R. Pillai, Synthesis, (1), 1 (1980), A. Abad et al., Tetrahedron Lett., (47) 4555 (1971), D. H. R. Barton et al., J. Chem. Soc., (C), 329 (1970), U.S. Pat. No. 3,779,778, EP No. 126, 712, and others may also be used.

Favorable examples of the photo acid generating agents for use in the invention include the compounds represented by the following formulae (b1), (b2), and (b3).

(b1)

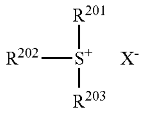

(b2)

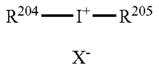

-continued (b3)

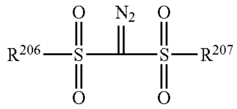

In formula (b1), $R^{201}$, $R^{202}$ and $R^{203}$ each independently represents an organic group.

$X^-$ represents a non-nucleophilic anion, and is preferably a sulfonate anion, carboxylate anion, bis(alkylsulfonyl)amide anion, tris(alkylsulfonyl)methide anion, $BF_4^-$, $PF_6^-$, $SbF_6^-$ or a group shown below, preferably an organic anion having one or more carbon atoms.

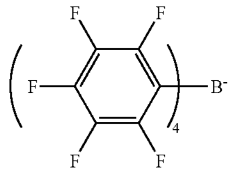

Favorable organic anions include the organic anions shown in the following formulae.

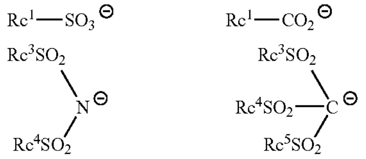

$Rc^1$ represents an organic group.

The organic group of $Rc^1$ is, for example, a group having 1 to 30 carbon atoms, and preferably an alkyl group, a cycloalkyl group, an aryl group, or a group wherein two or more of these groups are bound to each other via a connecting group such as single bond, —O—, —$CO_2$—, —S—, —$SO_3$—, or —$SO_2N(Rd^1)$—.

$Rd^1$ represents a hydrogen atom or an alkyl group. $Rc^3$, $Rc^4$, and $Rc^5$ each independently represent an organic group.

The organic group of $Rc^3$, $Rc^4$, or $Rc^5$ is preferably the same as the organic group favorable as $Rc^1$ and particularly preferably a perfluoroalkyl group having 1 to 4 carbon atoms.

$Rc^3$ and $Rc^4$ may bind to each other, forming a ring.

The group formed by binding between $Rc^3$ and $Rc^4$ is, for example, an alkylene group or an arylene group, but preferably a perfluoroalkylene group having 2 to 4 carbon atoms.

The organic group of $Rc^1$ or $Rc^3$ to $Rc^5$ is most preferably an alkyl group of which the hydrogen at 1 position is replaced with a fluorine atom or a fluoroalkyl group or a phenyl group substituted with a fluorine atom or a fluoroalkyl group. Presence of a fluorine atom or a fluoroalkyl group is effective in increasing the acidity of the acid generated by photoirradiation and improving the sensitivity.

The organic group of $R^{201}$, $R^{202}$ or $R^{203}$ is generally a group having 1 to 30 carbon atoms, preferably 1 to 20 carbon atoms, and two groups of $R^{201}$ to $R^{203}$ may bind to each other, forming a ring structure, which may contain an oxygen or sulfur atom or an ester, amide or carbonyl group. The group formed by binding between two groups of $R^{201}$ to $R^{203}$ is, for example, an alkylene group (e.g., butylene or pentylene).

Specific example of the organic groups of $R^{201}$, $R^{202}$ and $R^{203}$ include the groups corresponding to the compounds (b1-1), (b1-2), and (b1-3) described below.

The photo acid generating agent may be a compound having multiple groups in the structure represented by the formula (b1). For example, it may be a compound having a structure wherein at least one of $R^{201}$ to $R^{203}$ in the compound represented by the formula (b1) is bound, directly or via a connecting group, to at least one of $R^{201}$ to $R^{203}$ in the other compound represented by the formula (b1).

Still more preferable components (b 1) include the compounds (b 1-1), (b 1-2), and (b1-3) described below.

The compound (b1-1) is an arylsulfonium compound wherein at least one of $R^{201}$ to $R^{203}$ in formula (b1) is an aryl group, i.e., a compound having an arylsulfonium ion as its cation.

All of $R^{201}$ to $R^{203}$ in the arylsulfonium compound may be aryl groups; or alternatively, one or two of $R^{201}$ to $R^{203}$ may be aryl groups and the other is an alkyl or cycloalkyl group.

Examples of the arylsulfonium compounds include triarylsulfonium compounds, diarylalkylsulfonium compounds, aryldialkylsulfonium compounds, diarylcycloalkylsulfonium compounds, aryldicycloalkylsulfonium compounds, and the like.

The aryl group in the arylsulfonium compounds is preferably an aryl group such as phenyl or naphthyl, or a heteroaryl group such as indole or pyrrole, and more preferably a phenyl or indole residue. When the arylsulfonium compound has two or more aryl groups, the two or more aryl groups may be the same as or different from each other.

The alkyl group that the arylsulfonium compound may have as needed is preferably a linear or branched alkyl group having 1 to 15 carbons, and examples thereof include methyl, ethyl, propyl, n-butyl, sec-butyl, and t-butyl groups and the like.

The cycloalkyl group that the arylsulfonium compound may have as needed is preferably a cycloalkyl group having 3 to 15 carbons, and examples thereof include cyclopropyl, cyclobutyl, and cyclohexyl groups, and the like.

The aryl, alkyl, or cycloalkyl group of $R^{201}$ to $R^{213}$ may have an alkyl group (e.g., that having 1 to 15 carbon atoms), a cycloalkyl group (e.g., that having 3 to 15 carbon atoms), an aryl group (e.g., that having 6 to 14 carbon atoms), an alkoxy group (e.g., that having 1 to 15 carbon atoms), a halogen atom, a hydroxyl group, or a phenylthio group as the substituent group. Preferable examples of the substituent groups include linear or branched alkyl groups having 1 to 12 carbons, cycloalkyl groups having 3 to 12 carbons, and linear, branched or cyclic alkoxy groups having 1 to 12 carbons; and most preferable are alkyl groups having 1 to 4 carbons and alkoxy groups having 1 to 4 carbons. All or any one of the three $R^{201}$ to $R^{203}$ may have a substituent group. In addition, when any one of $R^{201}$ to $R^{203}$ is an aryl group, the substituent group is preferably substituted at the p-position in the aryl group.

Hereinafter, the compound (b1-2) will be described.

The compound (b1-2) is a compound represented by the formula (b1), wherein $R^{201}$ to $R^{203}$ each independently represent a non-aromatic ring-containing organic group. The aromatic rings include aromatic rings containing a heteroatom.

The non-aromatic ring-containing organic group of $R^{201}$ to $R^{203}$ generally has 1 to 30 carbon atoms and preferably 1 to 20 carbon atoms.

$R^{201}$ to $R^{203}$ each independently, preferably represent an alkyl, cycloalkyl, allyl, or vinyl group, more preferably a linear, branched, or cyclic 2-oxoalkyl group or an alkoxycarbonylmethyl group, and particularly preferably a linear or branched 2-oxoalkyl group.

The alkyl group of $R^{201}$ to $R^{203}$ may be a straight-chain or branched group, and is preferably, for example, a straight-chain or branched alkyl group having 1 to 10 carbon atoms (such as methyl, ethyl, propyl, butyl, or pentyl), and a straight-chain, branched 2-oxoalkyl group and an alkoxycarbonylmethyl group are more preferable.

The cycloalkyl group of $R^{201}$ to $R^{203}$ is preferably, for example, a cycloalkyl group having 3 to 10 carbons (e.g., cyclopentyl, cyclohexyl, or norbornyl); and a cyclic 2-oxoalkyl group is more preferable.

Preferable examples of the linear, branched, and cyclic 2-oxoalkyl groups of $R^{201}$ to $R^{203}$ include the alkyl and cycloalkyl groups described above having >C═O at the 2 position.

The alkoxy group in the alkoxycarbonylmethyl group of $R^{201}$ to $R^{203}$ is preferably, for example, an alkoxy group having 1 to 5 carbons (e.g., methoxy, ethoxy, propoxy, butoxy, or pentoxy).

$R^{201}$ to $R^{203}$ may be substituted with a halogen atom, an alkoxy group (e.g., that having 1 to 5 carbon atoms), a hydroxyl group, a cyano group, or a nitro group additionally.

The compound (b1-3) is a compound represented by the following formula (b1-3), i.e., a compound having a phenacyl sulfonium salt structure.

(b1-3)

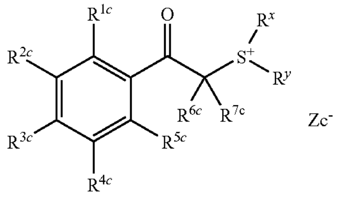

In formula (b1-3), $R^{1c}$ to $R^{5c}$ each independently represent a hydrogen or an alkyl, cycloalkyl, or alkoxy group.

$R^{6c}$ and $R^{7c}$ each independently represent a hydrogen atom or an alkyl or cycloalkyl group.

$R^x$ and $R^y$ each independently represent an alkyl, cycloalkyl, allyl, or vinyl group. Any two or more of $R^{1c}$ to $R^{5c}$, $R^{6c}$ and $R^{7c}$, or $R^x$ and $R^y$ may bind to each other, forming a ring structure.

$Zc^-$ represents a non-nucleophilic anion, and is the same as the non-nucleophilic anion $X^-$ in formula (b1).

The alkyl group of $R^{1c}$ to $R^{7c}$ may be a straight-chain or branching group, and examples thereof include linear or branched alkyl groups having 1 to 20 carbon atoms, preferably having 1 to 12 carbon atoms, (e.g., methyl, ethyl, linear or branched propyl, linear or branched butyl, and linear or branched pentyl).

The cycloalkyl group of $R^{1c}$ to $R^{7c}$ is preferably, for example, a cycloalkyl group having 3 to 8 carbon atoms (e.g., cyclopentyl or cyclohexyl).

The alkoxy group of $R^{1c}$ to $R^{5c}$ may be a straight-chain, branched, or cyclic group, and examples thereof include alkoxy groups having 1 to 10 carbons, preferably, straight-chain and branched alkoxy groups having 1 to 5 carbons (e.g., methoxy, ethoxy, straight-chain or branched propoxy, straight-chain or branched butoxy, and straight-chain or branched pentoxy groups), and cyclic alkoxy groups having 3 to 8 carbons (e.g., cyclopentyloxy and cyclohexyloxy groups).

Examples of the groups formed by binding of any two or more of $R^{1c}$ to $R^{5c}$, $R^{6c}$ and $^{7c}$, or $R^x$ and $R^y$ include butylene and pentylene groups and the like. The ring structure may contain an oxygen or sulfur atom or an ester or amide bond.

Preferably, part of the $R^{1c}$ to $R^{5c}$ are linear or branched alkyl groups, cycloalkyl groups, or linear, branched, or cyclic alkoxy groups; and more preferably, the total number of carbons in groups $R^{1c}$ to $R^{5c}$ is 2 to 15. Under such a condition, the acid generator is more soluble in solvent, suppressing generation of particles during storage.

The alkyl and cycloalkyl groups of $R^x$ and $R^y$ include the alkyl and cycloalkyl groups of $R^{1c}$ to $R^{7c}$.

Each of $R^x$ and $R^y$ is preferably a 2-oxoalkyl or alkoxycarbonylmethyl group.

The 2-oxoalkyl group is, for example, the alkyl or cycloalkyl group of $R^{1c}$ to $R^{5c}$ having >C═O group at the 2 position.

Examples of the alkoxy group in the alkoxycarbonylmethyl group are the same as those for the alkyl group of $R^{1c}$ to $R^{5c}$.

Each of $R^x$ and $R^y$ is preferably an alkyl or cycloalkyl group having 4 or more carbon atoms, more preferably the alkyl or cycloalkyl group having 6 or more carbon atoms and still more preferably 8 or more.

In formula (b2) and (b3), $R^{204}$ to $R^{207}$ each independently represent an aryl, alkyl or cycloalkyl group. $X^-$ represents a non-nucleophilic anion, and is the same as the non-nucleophilic anion $X^-$ in formula (b1).

The aryl group of $R^{204}$ to $R^{207}$ is preferably a phenyl or naphthyl group and more preferably a phenyl group.

The alkyl group of $R^{204}$ to $R^{207}$ may be a linear or branched group, and is preferably, for example, a linear or branched alkyl group having 1 to 10 carbons (e.g., methyl, ethyl, propyl, butyl, or pentyl). The cycloalkyl group of $R^{204}$ to $R^{207}$ is preferably, for example, a cycloalkyl group having 3 to 10 carbons (e.g., cyclopentyl, cyclohexyl, or norbornyl).

Examples of the substituent groups that $R^{204}$ to $R^{207}$ may have include alkyl groups (e.g., those having 1 to 15 carbon atoms), cycloalkyl groups (e.g., those having 3 to 15 carbon atoms), aryl groups (e.g., those having 6 to 15 carbon atoms), alkoxy groups (e.g., those having 1 to 15 carbon atoms), halogen atoms, a hydroxyl group, a phenylthio group, and the like.

Other usable examples of the compounds that generates acid by irradiation of activated light or radiation ray include the compounds represented by the following formulae (b4), (b5), and (b6).

(b4)

$$Ar^3—SO_2—SO_2—Ar^4$$

(b5)

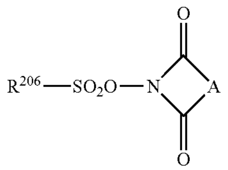

(b6)

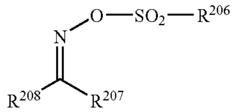

In formulae (b4) to (b6), $Ar^3$ and $Ar^4$ each independently represent an aryl group.

$R^{206}$, $R^{207}$ and $R^{208}$ each independently represent an alkyl, cycloalkyl or aryl group.

A represents an alkylene, alkenylene or arylene group.

Among the photo acid generating agents above, preferable are the compounds represented by the formulae (b1) to (b3) and the like.

Favorable examples of the photo acid generating agents for use in the invention (b), (b-1) to (b-96), will be listed below, but the invention is not restricted by these examples.

(b-1)

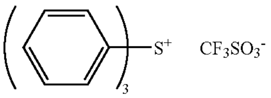

(b-2)

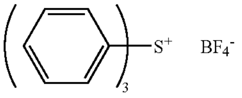

(b-3)

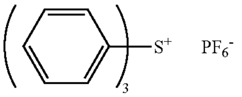

(b-4)

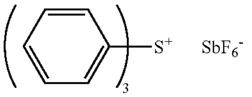

(b-5)

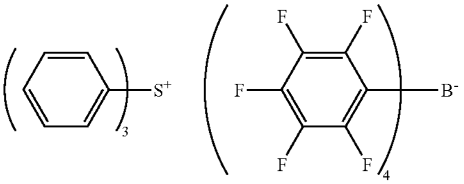

(b-6)

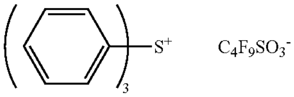

(b-7)

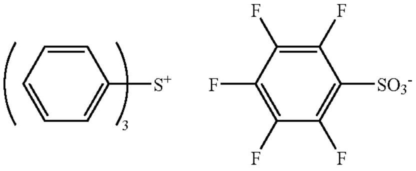

(b-8)

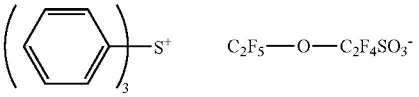

-continued
(b-9)
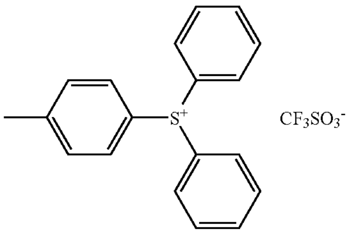
(b-10)
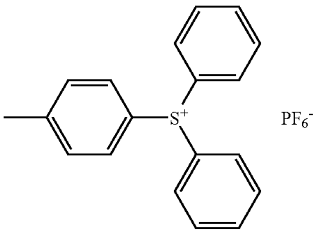
(b-11)
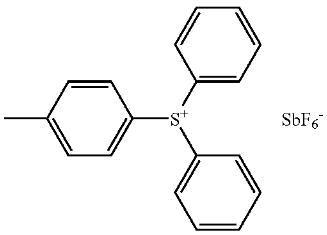
(b-12)
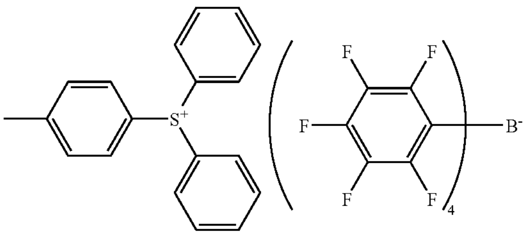
(b-13)
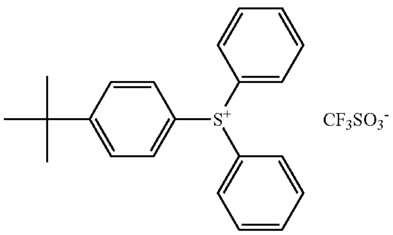
(b-14)
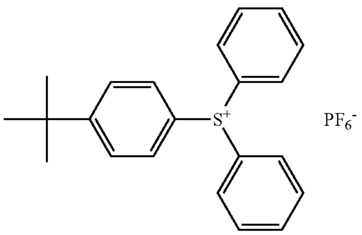
(b-15)
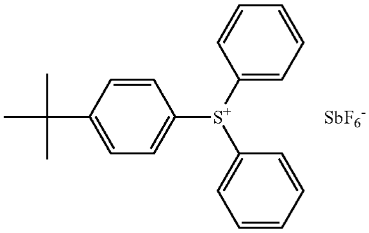
(b-16)
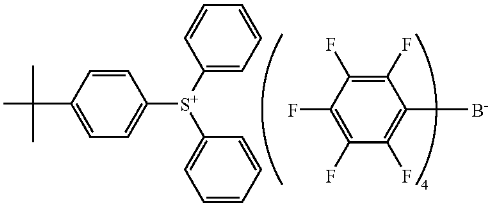
(b-17)
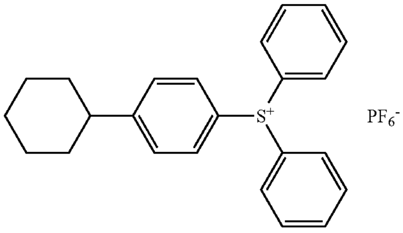
(b-18)
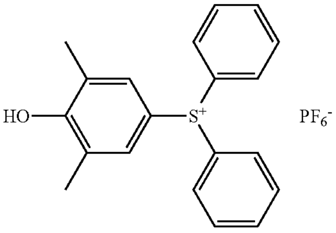
(b-19)
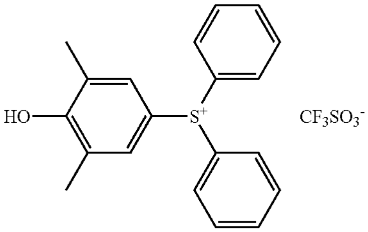
(b-20)
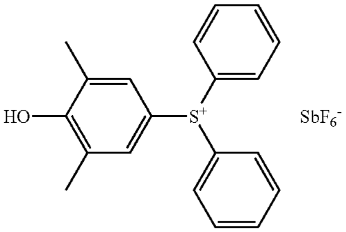

-continued
(b-21)
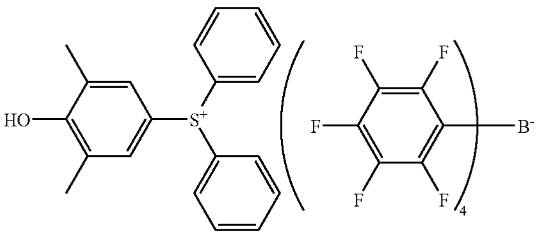
(b-22)
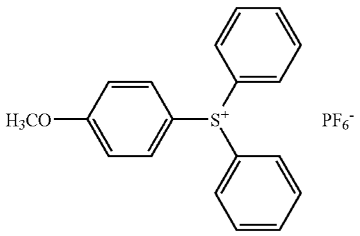
(b-23)
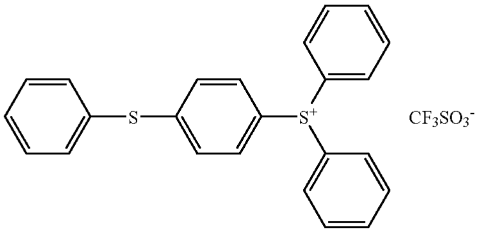
(b-24)
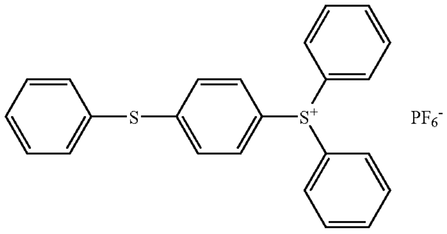
(b-25)
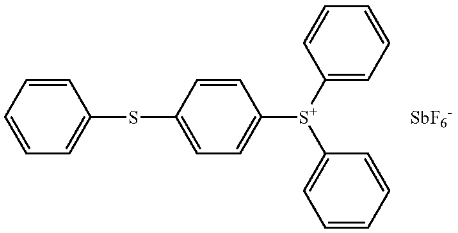
(b-26)
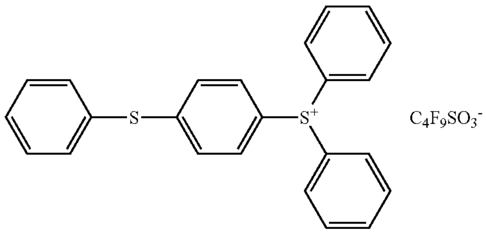
(b-27)
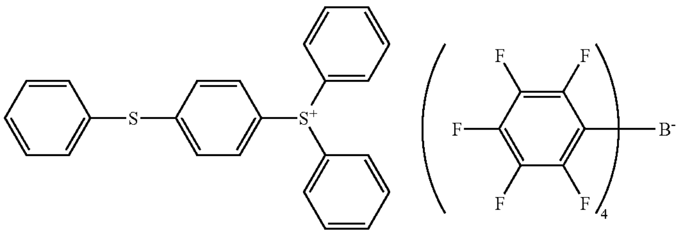
(b-28)
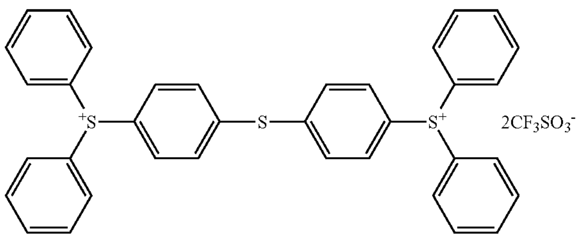
(b-29)
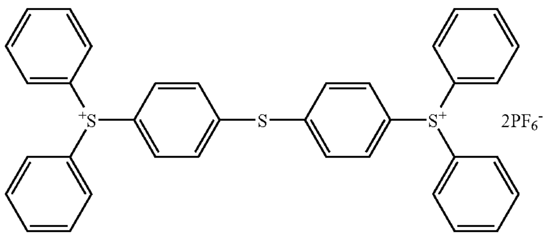

-continued
(b-30)
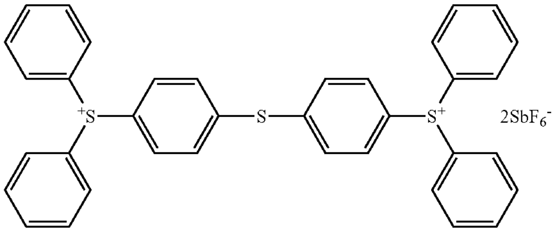
(b-31)
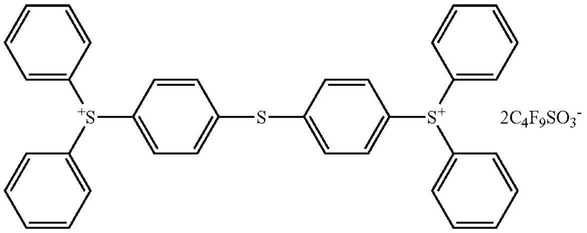
(b-32)
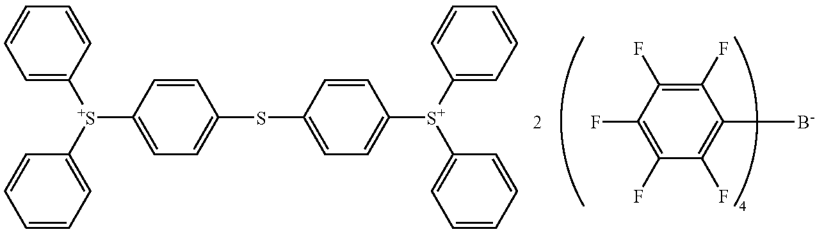
(b-33)
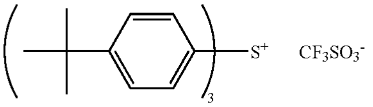
(b-34)
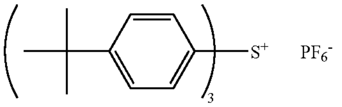
(b-35)
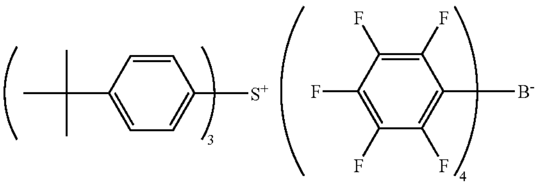
(b-36)
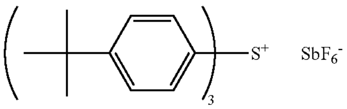
(b-37)
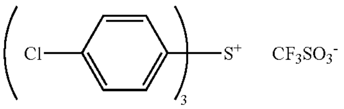
(b-38)
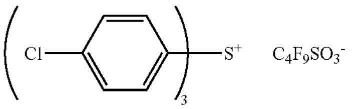
(b-39)
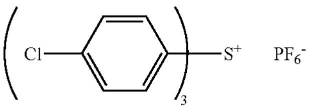
(b-40)
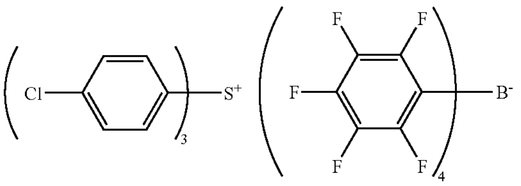
(b-41)
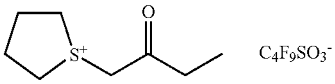
(b-42)
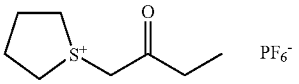

-continued
(b-43)
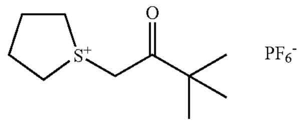
(b-44)
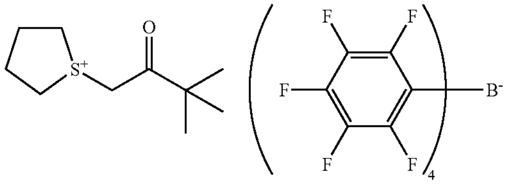
(b-45)
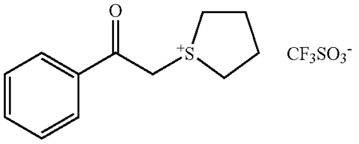
(b-46)
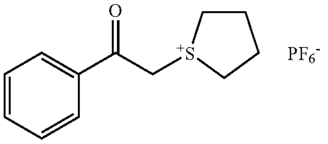
(b-47)
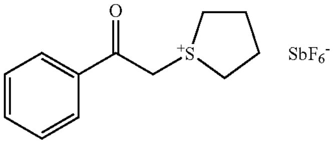
(b-48)
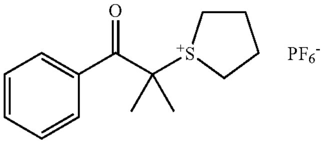
(b-49)
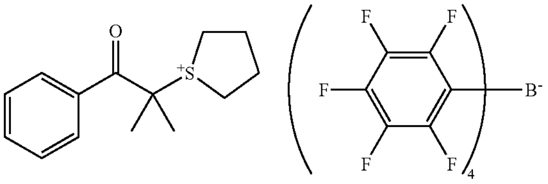
(b-50)
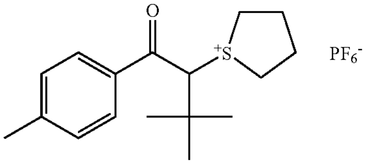
(b-51)
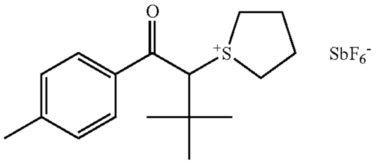
(b-52)
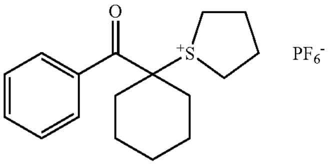
(b-53)
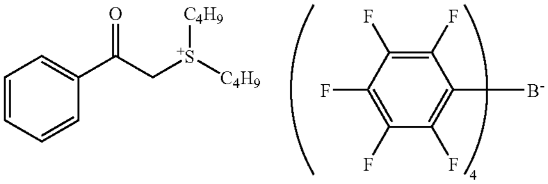
(b-54)
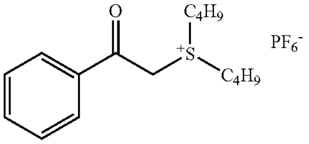
(b-55)
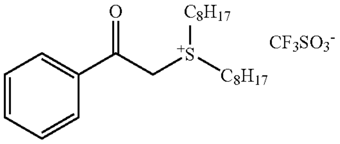
(b-56)
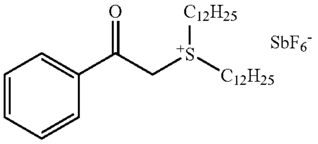
(b-57)
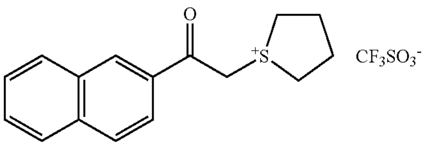
(b-58)
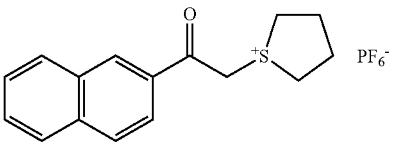
(b-59)
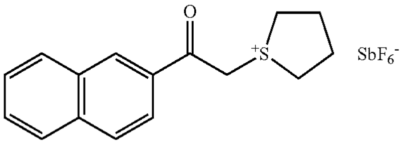

-continued
(b-60)
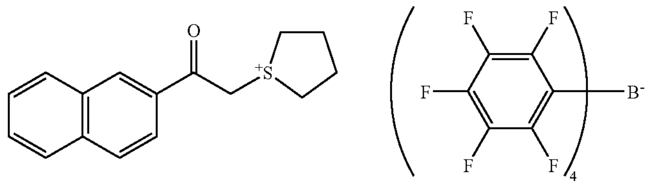
(b-61)
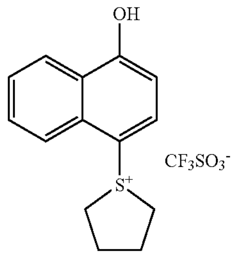
(b-62)
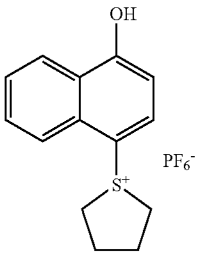
(b-63)
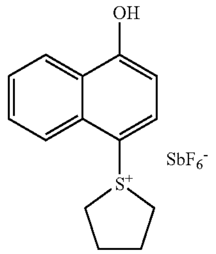
(b-64)
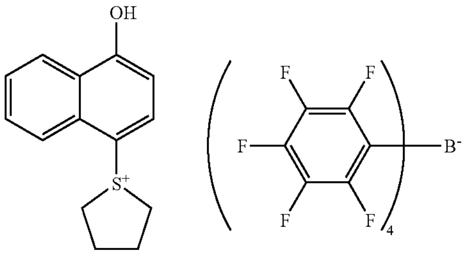
(b-65)
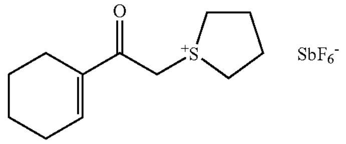
(b-66)
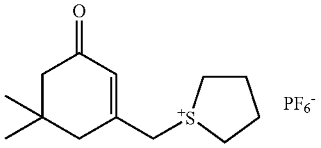
(b-67)
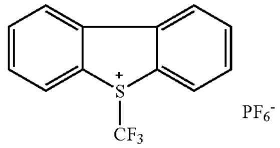
(b-68)
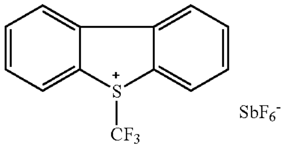
(b-69)
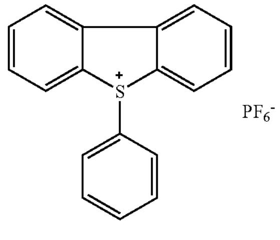
(b-70)
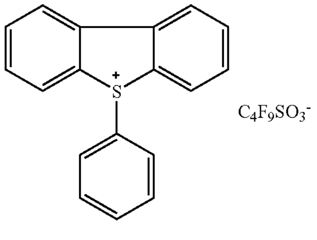
(b-71)
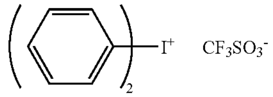
(b-72)
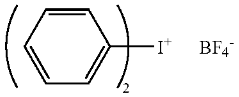
(b-73)
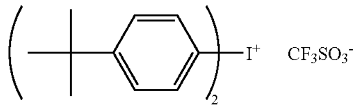
(b-74)
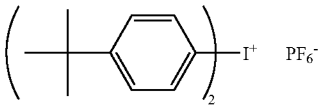

-continued
(b-75)
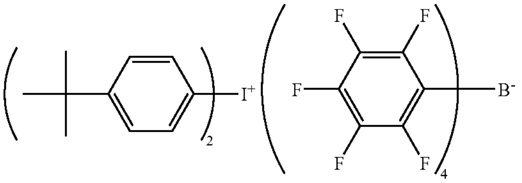
(b-76)
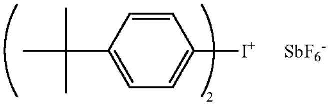
(b-77)
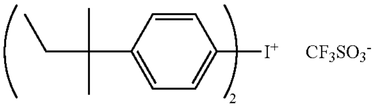
(b-78)
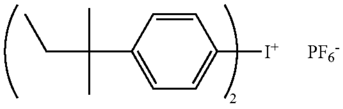
(b-79)
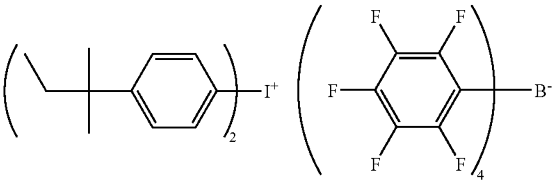
(b-80)
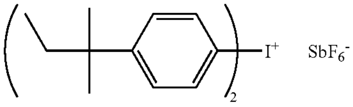
(b-81)
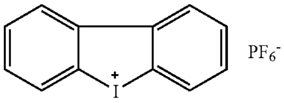
(b-82)
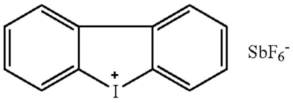
(b-83)
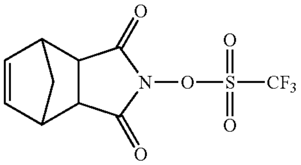
(b-84)
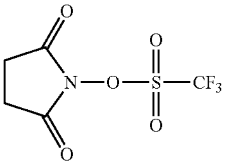
(b-85)
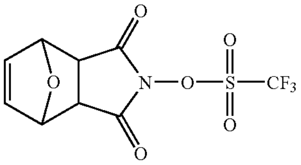
(b-86)
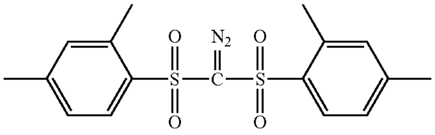
(b-87)
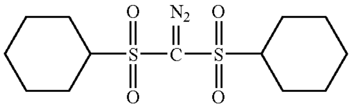
(b-88)
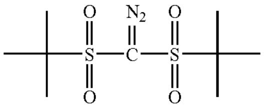
(b-89)
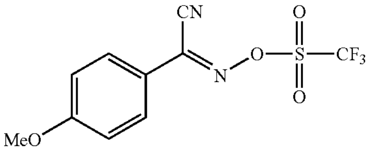
(b-90)
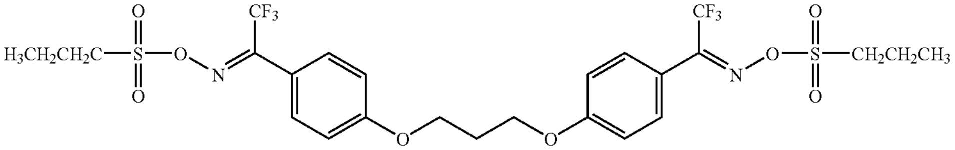
(b-91)
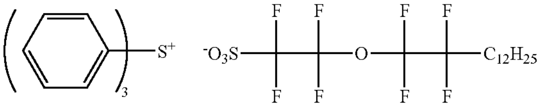

-continued (b-92)

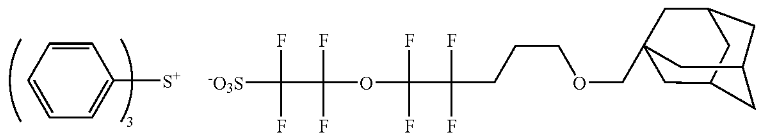

(b-93)

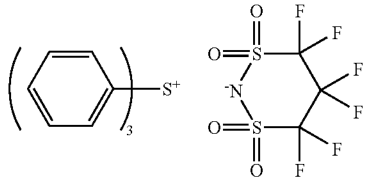

(b-94)

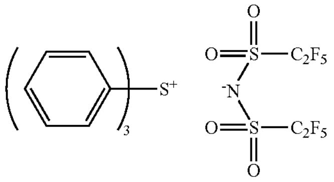

(b-95)

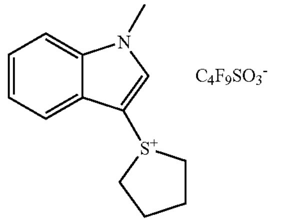

(b-96)

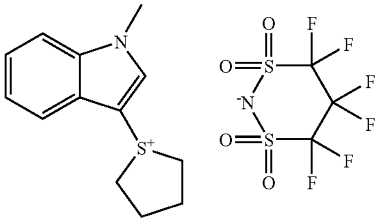

In addition, the oxazole derivatives, s-triazine derivatives and the like described in JP-A No. 2002-122994, paragraph Nos. [0029] to [0030], may also be used favorably.

Further, the onium salt and sulfonate compounds exemplified in JP-A No. 2002-122994, paragraph Nos. [0037] to [0063], may also be used favorably.

The photo acid generating agents (b) may be used alone or in combination of two or more.

The content of the photo acid generating agent (b) in the ink composition is preferably 0.1 to 20 mass %, more preferably 0.5 to 10 mass %, and still more preferably 1 to 7 mass %, based on a total solid content constituting the ink composition.

(Colorant)

The ink composition according to the invention may contain a colorant.

The colorant for use in the invention is not particularly limited; but pigments and oil soluble dyes superior in weather resistance and color reproducibility are preferable; and a known colorant such as soluble dye may be used as selected properly. Preferably, the colorant favorably used in the ink composition according to the invention does not function as a polymerization inhibitor in the polymerization reaction, i.e., in the curing reaction. It is for prevention of the decrease in sensitivity due to the curing reaction by active radiation ray.

<Pigment>

The pigment is not particularly limited, and any one of common commercially available pigments, including organic and inorganic pigments, dispersions of the pigment dispersed in an insoluble resin, and pigments surface-grafted with a resin, may be used. In addition, dyed resin particles may also be used.

Such pigments include the pigments described, for example, in Seijiro Itoh Ed., "Ganryo no Jiten (Dictionary of Pigments)" (2000), W. Herbst K. Hunger, Industrial Organic Pigments", and JP-A Nos. 2002-12607, 2002-188025, 2003-26978, and 2003-342503.

Specific Examples of the organic and inorganic pigments exhibiting yellow color employable in the invention include monoazo pigments such as C.I. Pigment Yellow 1 (Fast Yellow G, etc.) and C.I. Pigment Yellow 74, disazo pigments such as C.I. Pigment Yellow 12 (Disazo Yellow AAA, etc.) and C.I. Pigment Yellow 17, non-benzidine azo pigments such as C.I. Pigment Yellow 180, azolake pigments such as C.I. Pigment Yellow 100 (tartrazine yellow lake, etc.), condensation azo pigments such as C.I. Pigment Yellow 95 (condensation azo yellow GR, etc.), acidic dye lake pigments such as C.I. Pigment Yellow 115 (quinoline yellow lake, etc.), basic dye lake pigments such as C.I. Pigment Yellow 18 (thioflavin lake, etc.), anthraquinone pigments such as fravantrone yellow (Y-24), isoindolinone pigments such as isoindolinone yellow 3RLT (Y-110), quinophtharone pigments such as quinophtharone yellow (Y-138), isoindoline pigments such as isoindoline yellow (Y-139), nitroso pigments such as C.I. Pigment Yellow 153 (nickel nitroso yellow, etc.), metal complex salt azomethine pigments such as C.I. Pigment Yellow 117 (copper azomethine yellow, etc.), and the like.

Examples thereof exhibiting red or magenta color include monoazo pigments such as C.I. Pigment Red 3 (toluidine red, etc.), disazo pigments such as C.I. pigment red 38 (pyrazolone red B, etc.), azolake pigments such as C.I. Pigment Red 53:1 (lake red C, etc.) and C.I. Pigment Red 57:1 (Brilliant Carmine 6B), condensation azo pigments such as C.I. Pigment Red 144 (condensation azo red BR, etc.), acidic dye lake pigments such as C.I. Pigment Red 174 (phloxine B lake, etc.), basic dye lake pigments such as C.I. Pigment Red 81 (rhodamine 6G' lake, etc.), anthraquinone pigments such as C.I. Pigment Red 177 (dianthraquinonyl red, etc.), thioindigo pigments such as C.I. Pigment Red 88 (Thioindigo Bordeaux, etc.), perynone pigments such as C.I. Pigment Red 194 (perynone red, etc.), perylene pigments such as C.I. pigment red 149 (perylene scarlet, etc.), quinacridone pigments such as C.I. Pigment Violet 19 (unsubstituted quinacridone) and C.I. Pigment Red 122 (quinacridone magenta, etc.), isoindolinone pigments such as C.I. Pigment Red 180 (isoindolinone red 2BLT, etc.), alizarin lake pigments such as C.I. Pigment Red 83 (madder lake, etc.), and the like.

Examples thereof exhibiting blue or cyan color include disazo pigments such as C.I. Pigment Blue 25 (dianisidine blue, etc.), phthalocyanine pigments such as C.I. Pigment Blue 15 (phthalocyanine blue, etc.), acidic dye lake pigments such as C.I. Pigment Blue 24 (peacock blue lake, etc.), basic dye lake pigments such as C.I. Pigment Blue 1 (Victria Pure Blue BO lake, etc.), anthraquinone pigments such as C.I. Pigment Blue 60 (indanthron blue, etc.), alkali blue pigments such as C.I. Pigment Blue 18 (alkali Blue V-5:1), and the like.

Examples thereof exhibiting green color include phthalocyanine pigments such as C.I. Pigment green 7 (phthalocyanine green) and C.I. Pigment green 36 (phthalocyanine green), azo metal complex pigments such as C.I. Pigment green 8 (nitroso green), and the like.

Examples thereof exhibiting orange color include isoindoline pigments such as C.I. Pigment orange 66 (isoindoline orange) and anthraquinone pigments such as C.I. Pigment orange 51 (dichloropyranthron orange).

Examples thereof exhibiting black color include carbon black, titanium black, aniline black and the like.

Specific examples of the white pigments include basic lead carbonate ($2PbCO_3Pb(OH)_2$, so-called silver white), zinc oxide (ZnO, so-called zinc white), titanium oxide ($TiO_2$, so-called titanium white), strontium titanate ($SrTiO_3$, so-called titanium strontium white), and the like.

Titanium oxide has a lower density and a higher refractive index than other white pigments, is more stable chemically or physically, and thus, has a greater masking and coloring potentials as a pigment, and is excellent in resistance to acid or alkali and other environmental factors. Thus, use of titanium oxide as the white pigment is preferable. Other white pigments (including white pigments other than those described above) may be used as needed.

For dispersing the pigment, any one of dispersing machines, such as ball mill, sand mill, attriter, roll mill, jet mill, homogenizer, paint shaker, kneader, agitator, Henschel mixer, colloid mill, ultrasonic wave homogenizer, pearl mill, and wet jet mill, may be used.

It is also possible to add a dispersant during dispersion of the pigment. Examples of the dispersants include hydroxyl group-containing carboxylic acid esters, salts of a long-chain polyaminoamide with a high-molecular weight acid ester, high-molecular weight polycarboxylic acid salts, high-molecular weight unsaturated acid esters, high-molecular weight copolymers, modified polyacrylates, polyvalent aliphatic carboxylic acids, naphthalenesulfonic acid/formalin condensates, polyoxyethylene alkylphosphoric esters, pigment derivatives, and the like. Use of a commercially available polymer dispersant such as a Solsperse series product manufactured by Zeneca is also preferable.

A dispersion aid suitable for the pigment may be used as a dispersion aid. The dispersant and dispersion aid are preferably added in an amount of 1 to 50 parts by mass with respect to 100 parts by mass of the pigment.

A solvent may be added as the dispersion medium for various components such as pigment in the ink composition or alternatively, the cationic polymerizable compound above, which is a low-molecular weight component, may be used without solvent; but, the ink composition according to the invention preferably contains no solvent, because the composition is a radiation-curing ink that is hardened after application on a recording medium. It is because the solvent remaining in the hardened ink image leads to deterioration in solvent resistance and causes a problem of VOC (Volatile Organic Compound). From the viewpoints above, the cation polymerizable compound is preferably used as the dispersion medium, and selection of a cation polymerizable monomer lowest in viscosity among them is preferable for improvement in dispersibility and processability of the ink composition.

The average diameter of the pigment is preferably in the range of 0.02 to 0.4 μm, more preferably 0.02 to 0.1 μm, and still more preferably 0.02 to 0.07 μm.

The pigment, the dispersant, and dispersion medium are selected and the dispersion and filtration conditions are determined in such a manner that the average diameter of the pigment particles falls in the preferable range above. Control of particle diameter enables prevention of the clogging in head nozzles and preservation of the storage stability, transparency and curing efficiency of ink.

<Dye>

The dye for use in the invention is preferably an oil soluble dye. Specifically, the dye preferably has a solubility in water (mass of the colorant dissolved in 100 g of water) of 1 g or less at 25° C., preferably 0.5 g or less, and more preferably 0.1 g or less. Accordingly, so-called water-insoluble and oil soluble dyes are used favorably.

As for the dyes for use in the invention, it is preferable to introduce an oil-solubilizing group on the basic dye structure described above, to ensure that the dye is dissolved in the amount needed in the ink composition.

Examples of the oil-solubilizing groups include long-chain branched alkyl groups, long-chain branched alkoxy groups, long-chain branched alkylthio groups, long-chain branched alkylsulfonyl groups, long-chain branched acyloxy groups, long-chain branched alkoxycarbonyl groups, long-chain branched acyl groups, long-chain branched acylamino groups, branched alkylsulfonylamino groups, long-chain branched alkylaminosulfonyl groups, as well as aryl, aryloxy, aryloxycarbonyl, arylcarbonyloxy, arylaminocarbonyl, arylaminosulfonyl, and arylsulfonylamino groups containing these long-chain branched substituent groups, and the like.

Alternatively, it is also possible to introduce an oil-solubilizing group, such as alkoxycarbonyl, aryloxycarbonyl, alkylaminosulfonyl or arylaminosulfonyl, on water-soluble dyes containing carboxylic acid or sulfonic acid groups, by using a long-chain branched alcohol, amine, phenol, or aniline derivative.

The oil soluble dye preferably has a melting point of 200° C. or lower, more preferably 150° C. or lower, and still more preferably 100° C. or lower. Use of a low-melting point oil soluble dye enables restriction of crystal precipitation of the colorant in ink composition and improvement in storage stability of the ink composition. The dye preferably has a high oxidation potential, because it improves resistance to deterioration of color, in particular by oxidative substances such as ozone. Thus, the oil soluble dye for use in the invention preferably has an oxidation potential of 1.0 V or more (vs. SCE). The oxidation potential is preferably higher, and thus a dye having an oxidation potential of 1.1 V or more (vs. SCE) is more preferably, and that of 1.15 V or more (vs. SCE) particularly preferable.

The yellow dyes having the structure represented by the formula (Y-I) described in JP-A 2004-250483 are preferable.

Example of the dyes particularly preferable include the dyes represented by the formulae (Y-II) to (Y-IV) in JP-A No. 2004-250483, paragraph No. [0034], and typical examples thereof include the compounds described in JP-A No. 2004-250483, paragraph Nos. [0060] to [0071]. The oil soluble dyes represented by the formula (Y-I) described therein may be used not only in yellow ink, but also in inks in any other colors such as black and red.

The compounds having the structures represented by the formulae (3) and (4) in JP-A No. 2002-114930 are preferable as the magenta dyes; and typical examples thereof include the compounds described in JP-A No. 2002-114930, paragraph Nos. [0054] to [0073].

Particularly preferable dyes are the azo dyes represented by the formulae (M-1) to (M-2) in JP-A No. 2002-121414, paragraph Nos. [0084] to [0122], and typical examples thereof include the compounds described in JP-A No. 2002-121414, paragraph Nos. [0123] to [0132]. The oil soluble dyes represented by the formulae (3), (4), and (M-1) to (M-2) may be used not only in magenta ink, but also in inks in any other colors such as black and red inks.

Favorable as the cyan dyes are the dyes represented by the formulae (I) to (IV) in JP-A No. 2001-181547 and the dyes represented by the formulae (IV-3) to (IV-4) in JP-A No. 2002-121414, paragraph Nos. [0063] to [0078], and typical examples thereof include the compounds described in JP-A 2001-181547, paragraph Nos. [0052] to [0066] and in JP-A 2002-121414, paragraph Nos. [0079] to [0081].

Particularly preferable dyes are the phthalocyanine dyes represented by the formulae (C-I) and (C-II) described in JP-A No. 2002-121414, paragraph Nos. [0133] to [0196]; and still more preferable are the phthalocyanine dyes represented by the formula (C-II). Typical examples thereof include the compounds described in JP-A No. 2002-121414, paragraph Nos. [0198] to [0201]. The oil soluble dyes represented by the formulae (I) to (IV), (IV-D) to (IV-4), (C-I), and (C-II) may be used not only in cyan ink, but also in inks in any other colors such as black and green inks.

—Oxidation Potential—

The oxidation potential of the dye according to the invention (Eox) can be determined easily by those skilled in the art. These methods are described, for example, in P. Delahay, "New Instrumental Method in Electrochemistry" (1954, Interscience Publishers), A. J. Bard et al., "Electrochemical Methods" (1980, John Wiley & sons), and Akira Fujishima et al., "Electrochemical Measurement Methods" (1984, Gihodo Shuppan).

Specifically, the oxidation wave is obtained by dissolving a test sample at a concentration of $1\times10^{-2}$ to $1\times10^{-6}$ mole/liter in a solvent such as dimethylformamide or acetonitrile containing a supporting electrolyte such as sodium perchlorate or tetrapropylammonium perchlorate; and, assuming that the oxidation wave obtained by applying a voltage to the anodic side (higher side) by using carbon (GC) as the working electrode and a revolving platinum electrode as the counter electrode in a cyclic voltammetric or direct-current polarographic apparatus is a straight line, by determining the point of intersection between the straight line of oxidation wave and that of residual current-potential and the intersection between the straight line of oxidation wave and that of saturated current (or, the intersection thereof with the straight line in parallel with the vertical line passing through the peak electric potential) and determining the voltage vs. SCE (saturated calomel electrode) at the center of the line connecting the two intersections. The value may deviate to an extent approximately of several dozen millivolts under the influence of the difference in voltage between liquids and the resistivity of the sample solution, but it is possible to assure the reproducibility of the electric potential by using a standard sample (e.g., hydroquinone). The supporting electrolyte and the solvent for use may be selected properly according to the oxidation potential and solubility of the test sample. The supporting electrolyte and the solvent for use are described in Akira Fujishima et al., "Electrochemical Measurement Methods" (1984, Gihodo Shuppan) pp. 101 to 118.

Hereinafter, specific examples of the dyes for use in the invention will be listed, but are not limited to the typical examples.

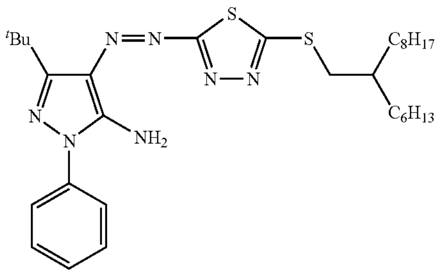

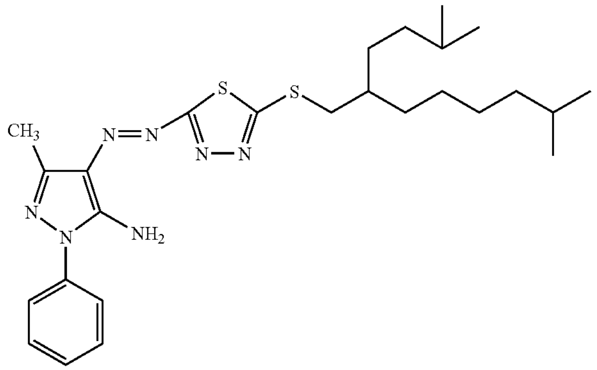

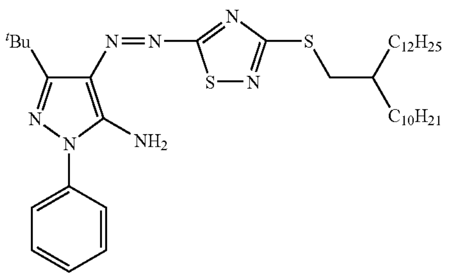

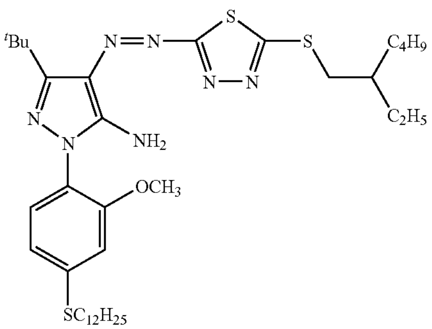

-continued
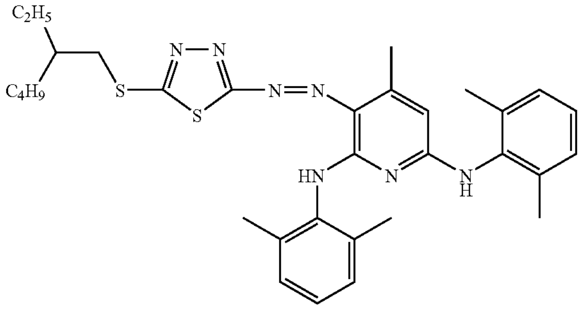
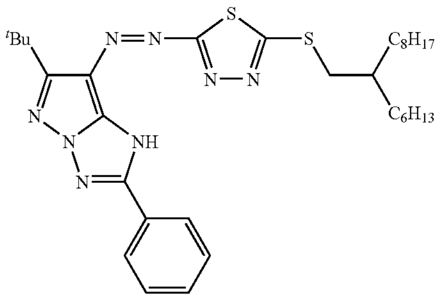
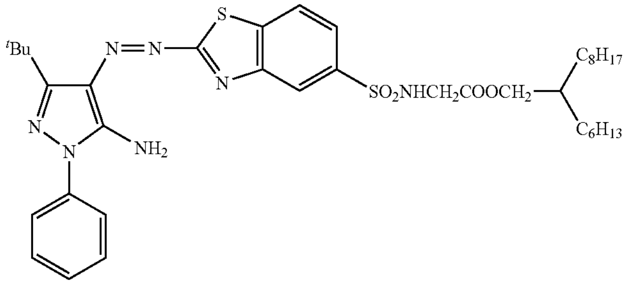
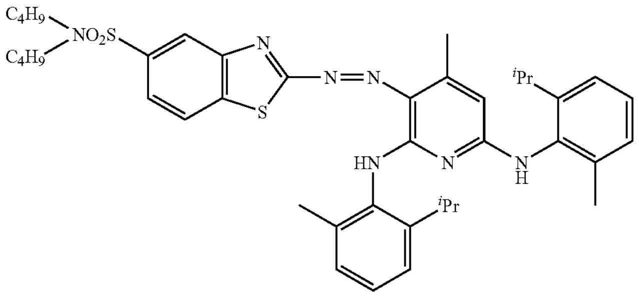
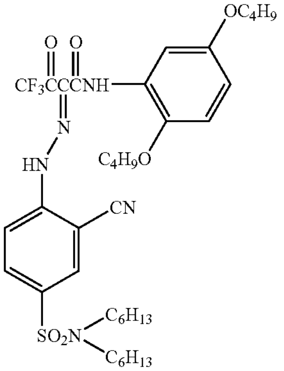
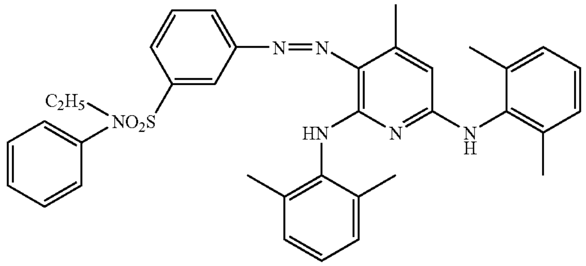
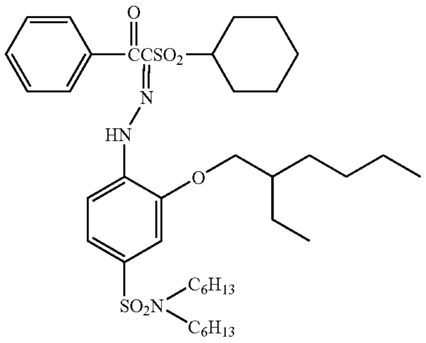
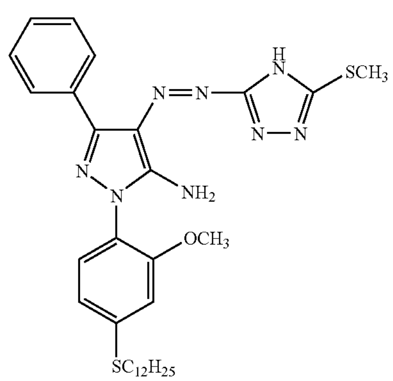

-continued
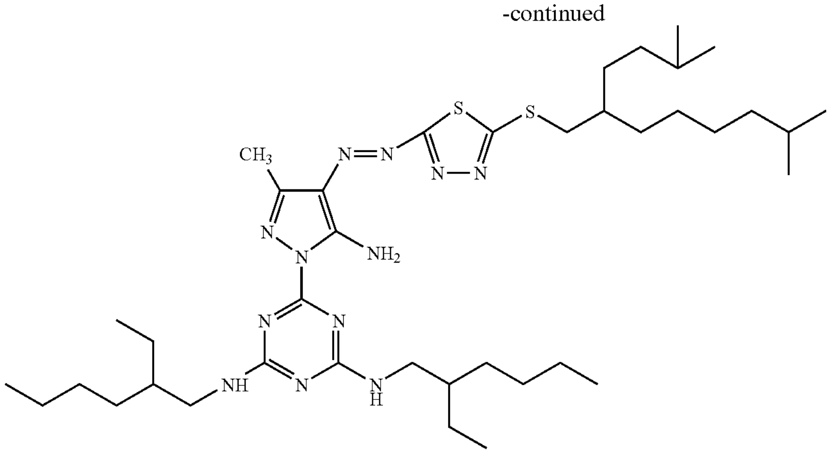
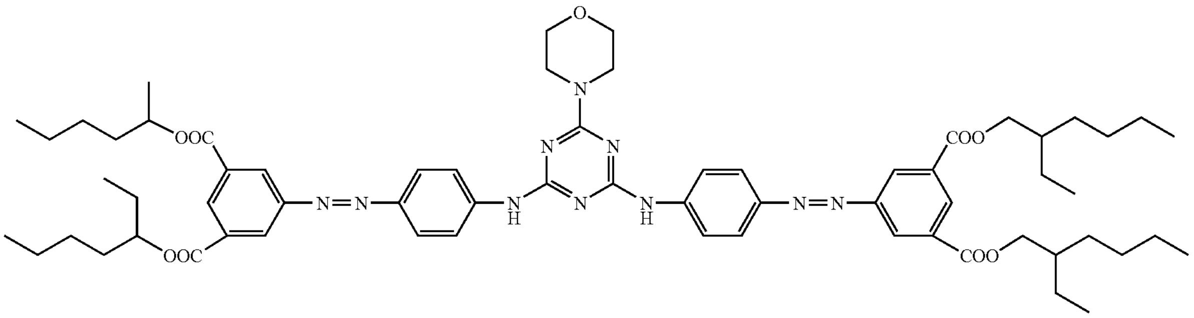
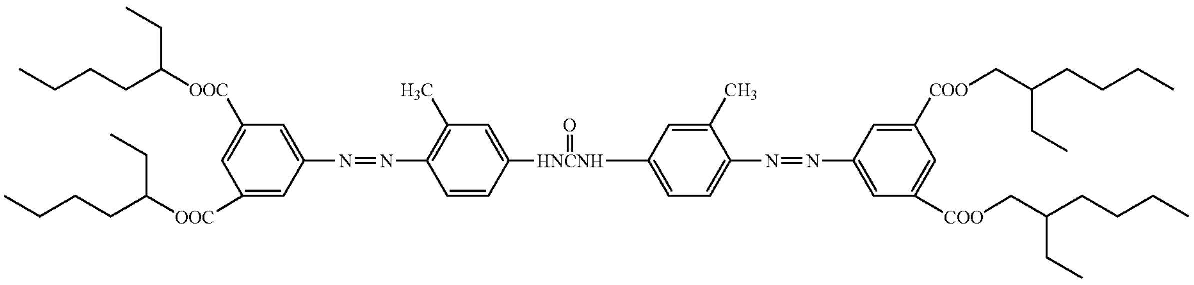
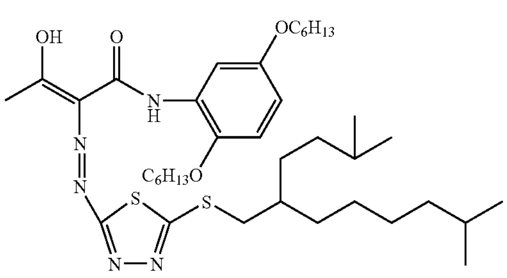
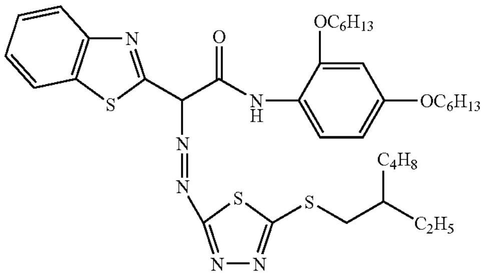
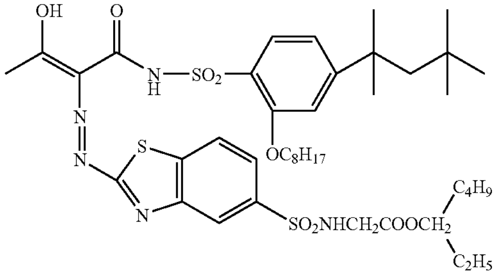
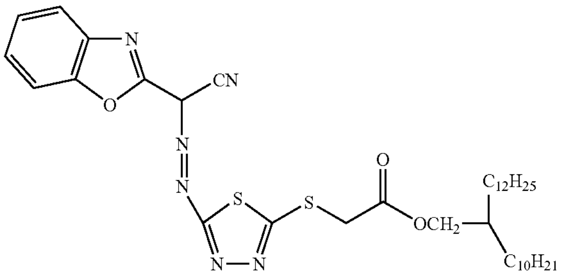

-continued
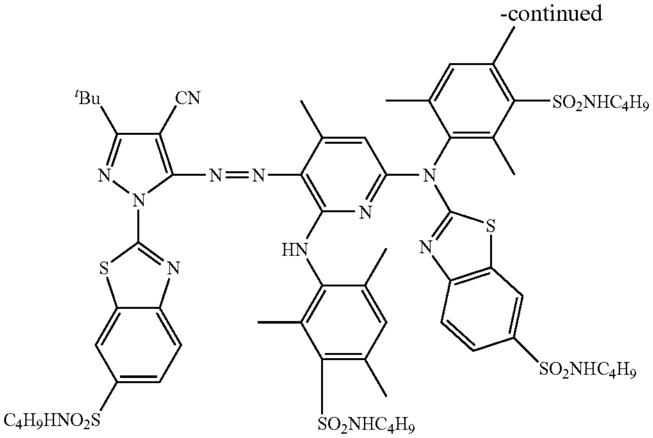
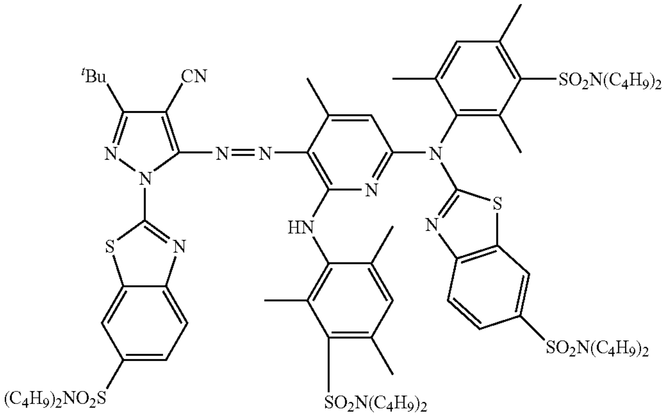
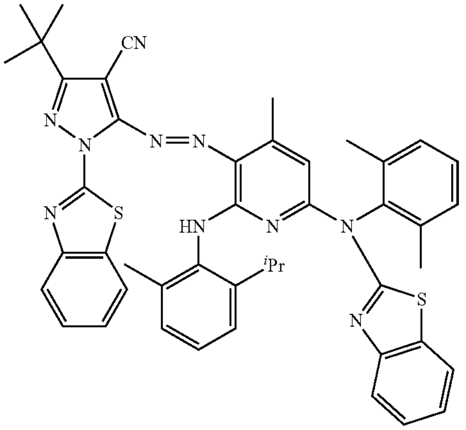
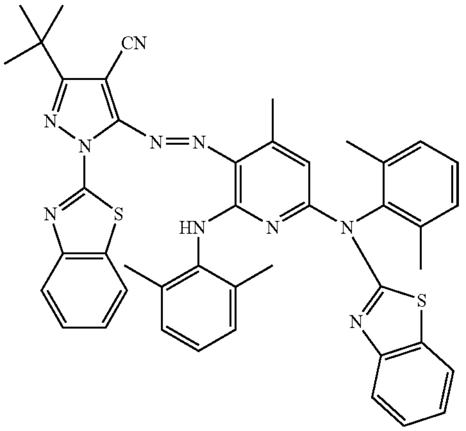

-continued
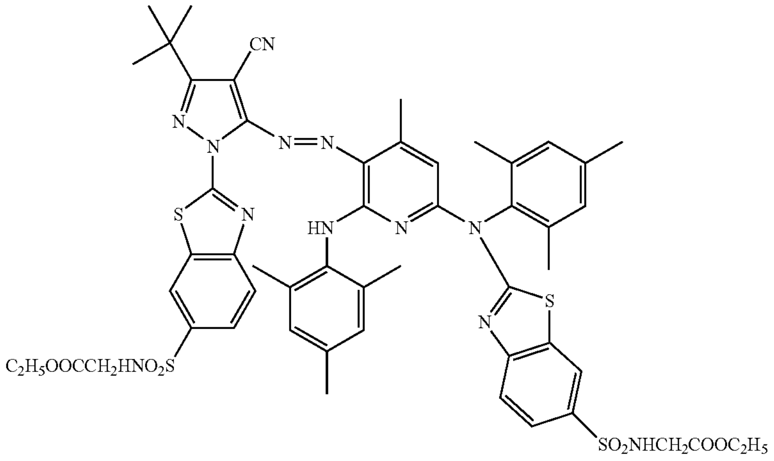
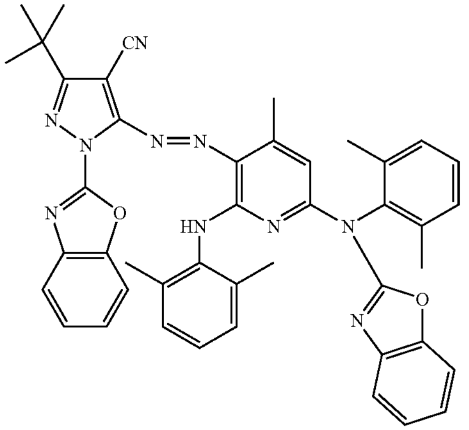
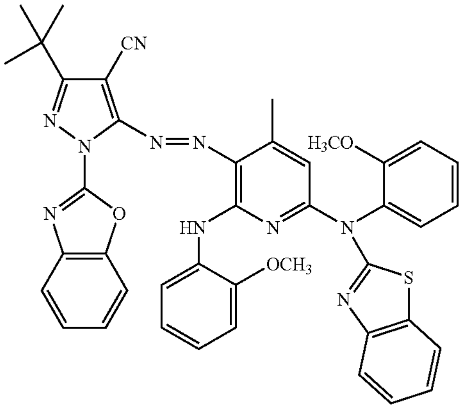
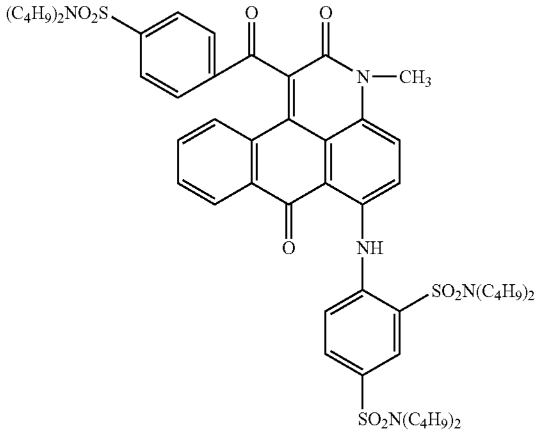
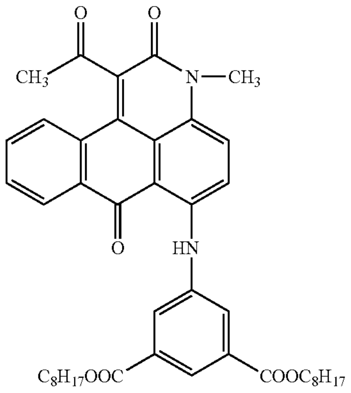
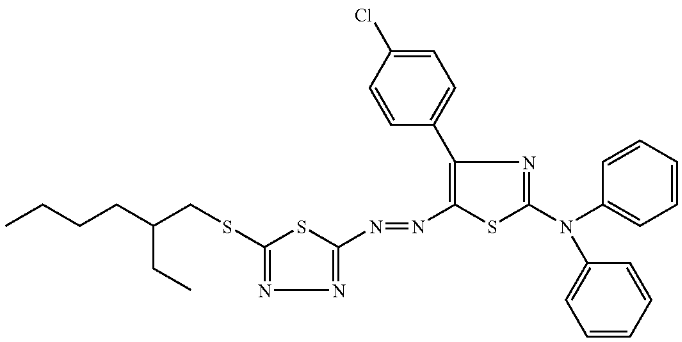

-continued
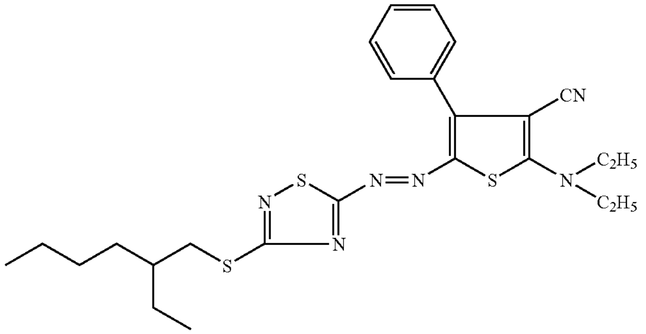
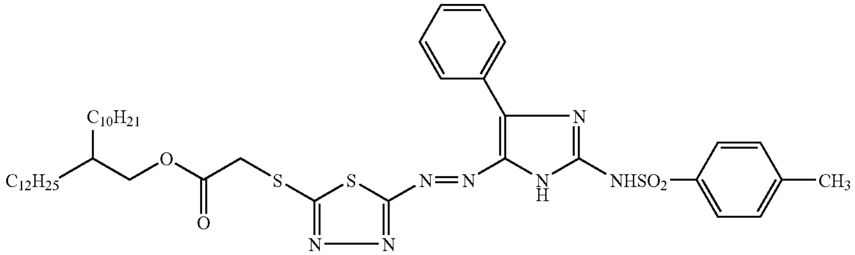
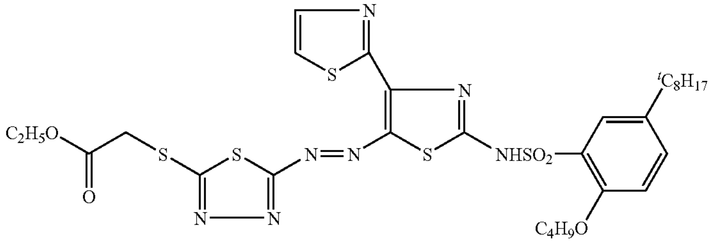
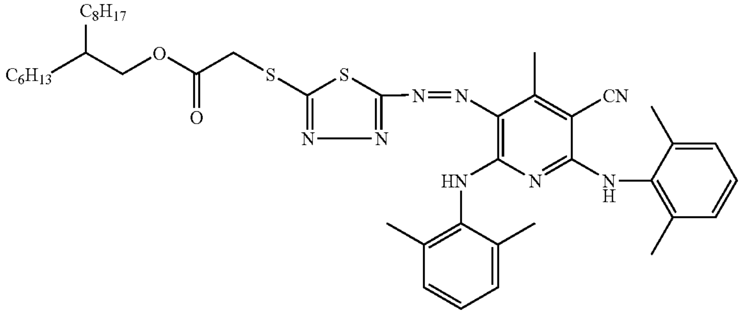
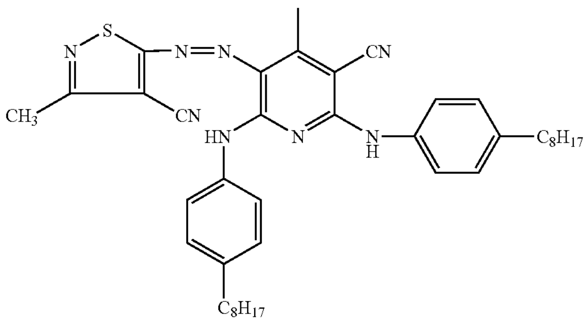

-continued
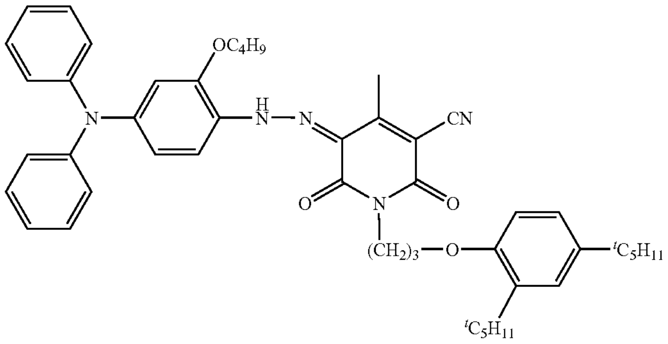
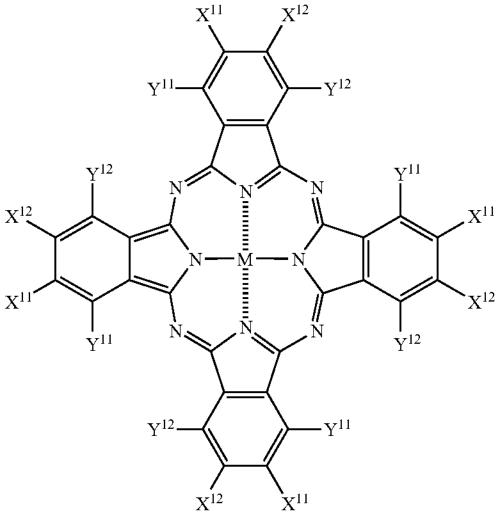
| No. | M | $X^{11}$ | $X^{12}$ | $Y^{11}$, $Y^{12}$ |
|---|---|---|---|---|
| e-1 | Cu | 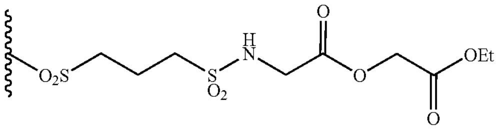 | H | H, H |
| e-2 | Cu | 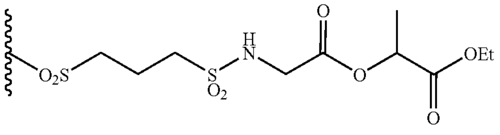 | H | H, H |
| e-3 | Cu | 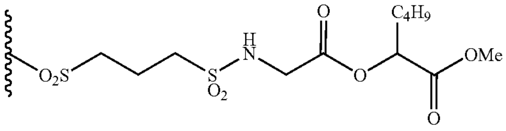 | H | H, H |

-continued
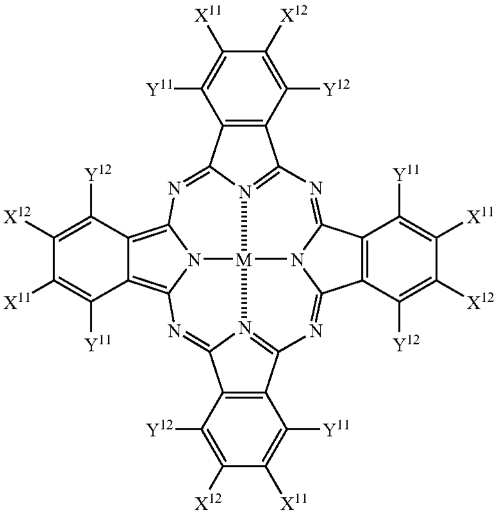
| No. | M | $X^{11}$ | $X^{12}$ | $Y^{11}$, $Y^{12}$ |
|---|---|---|---|---|
| e-4 | Cu | 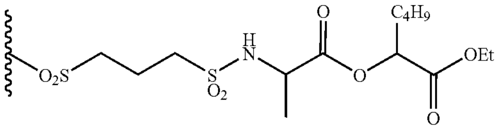 | H | H, H |
| e-5 | Cu | 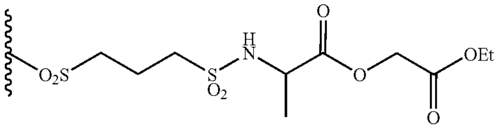 | H | H, H |
| e-6 | Cu | 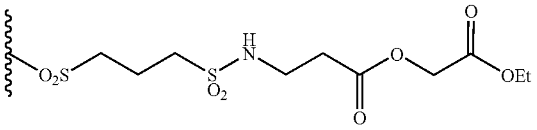 | H | H, H |
| e-7 | Cu | 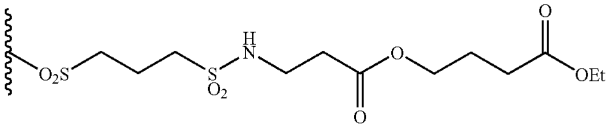 | H | H, H |
| e-8 | Cu | 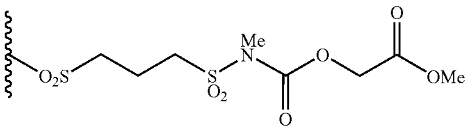 | H | H, H |

In the formula, specific examples of respective pairs ($X^{11}$, $X^{12}$) and ($Y^{11}$, $Y^{12}$) are may be in any order.
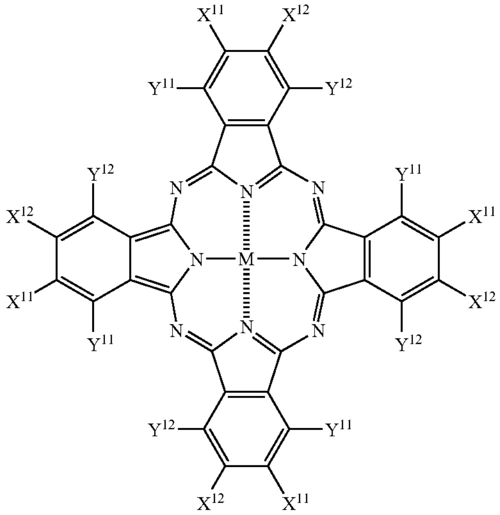
| No. | M | $X^{11}$ | $X^{12}$ | $Y^{11}$, $Y^{12}$ |
|---|---|---|---|---|
| e-9 | Cu | 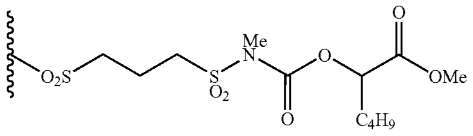 | H | H, H |
| e-10 | Cu | 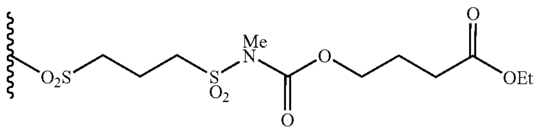 | H | H, H |
| e-11 | Cu | 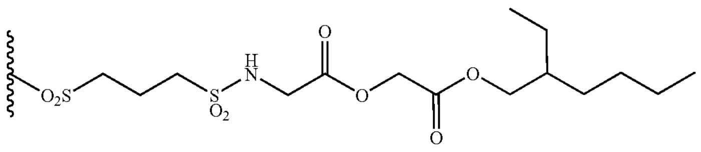 | H | H, H |
| e-12 | Cu | 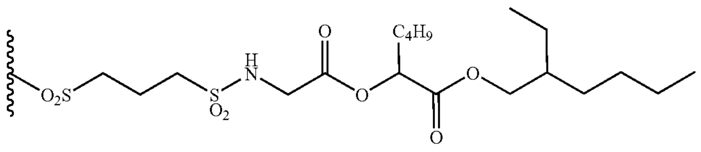 | H | H, H |

-continued
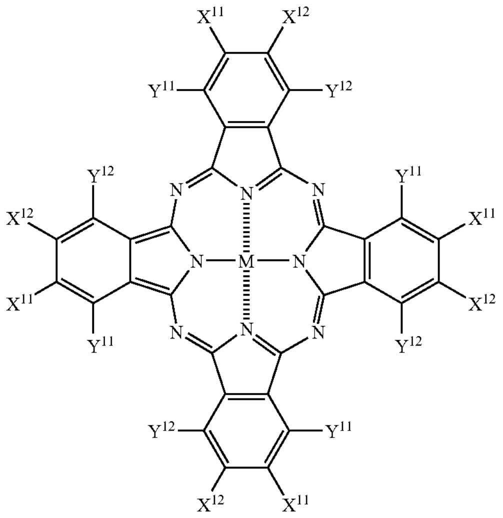
| No. | M | X11 | X12 | Y11, Y12 |
|---|---|---|---|---|
| e-13 | Cu | 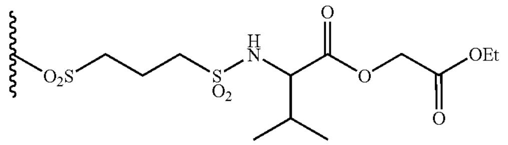 | H | H, H |
| e-14 | Cu | 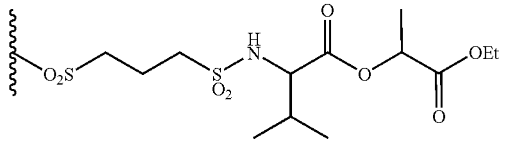 | H | H, H |
| e-15 | Cu | 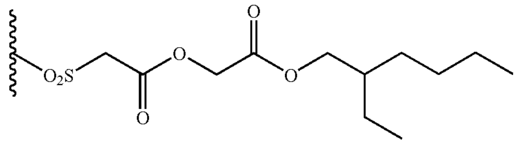 | H | H, H |
| e-16 | Cu | 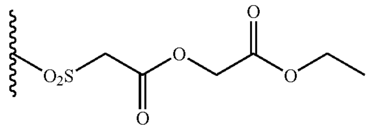 | H | H, H |

In the formula, specific examples of respective pairs ($X^{11}$, $X^{12}$) and ($Y^{11}$, $Y^{12}$) are may be in any order.
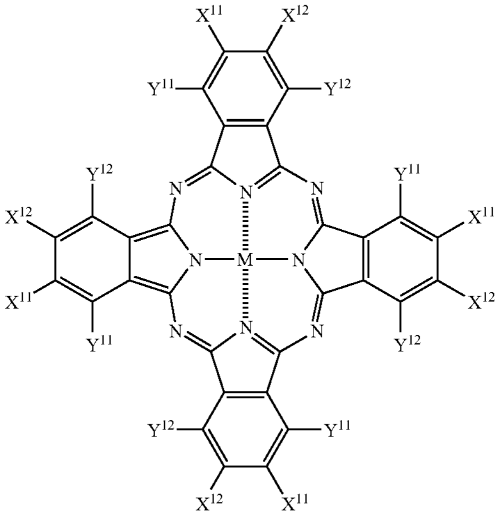
| No. | M | $X^{11}$ | $X^{12}$ | $Y^{11}$, $Y^{12}$ |
|---|---|---|---|---|
| e-17 | Cu | 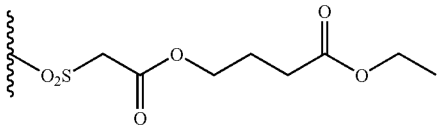 | H | H, H |
| e-18 | Cu | 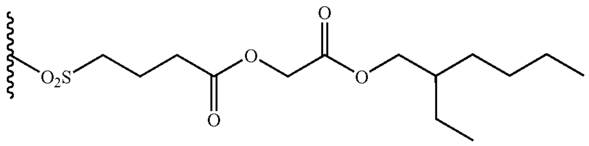 | H | H, H |
| e-19 | Cu | 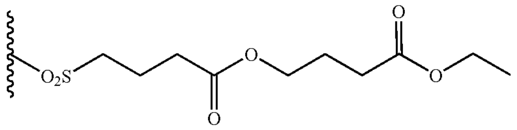 | H | H, H |
| e-20 | Cu | 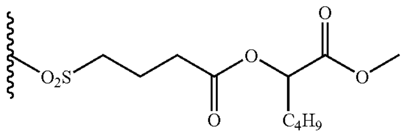 | H | H, H |
| e-21 | Cu | 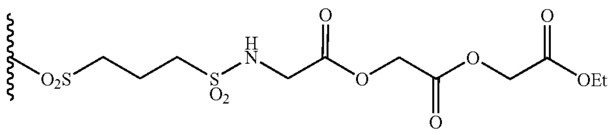 | H | H, H |
| e-22 | Cu | 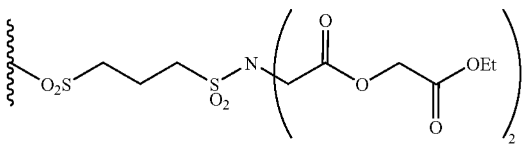 | H | H, H |

-continued
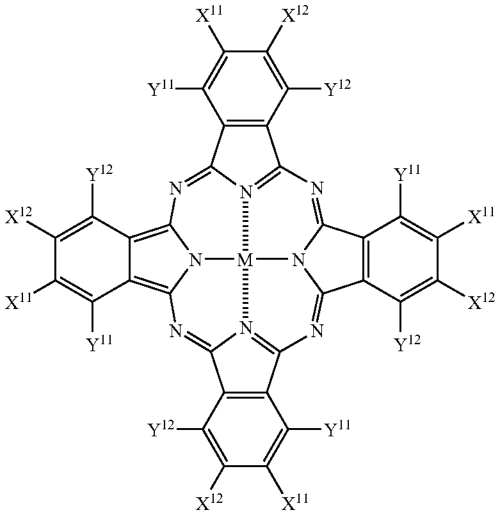
| No. | M | $X^{11}$ | $X^{12}$ | $Y^{11}$, $Y^{12}$ |
|---|---|---|---|---|
| e-23 | Cu | 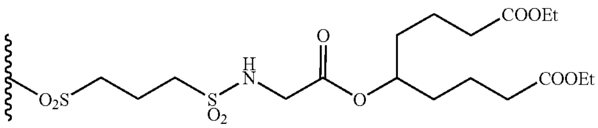 | H | H, H |
In the formula, specific examples of respective pairs ($X^{11}$, $X^{12}$) and ($Y^{11}$, $Y^{12}$) are may be in any order.
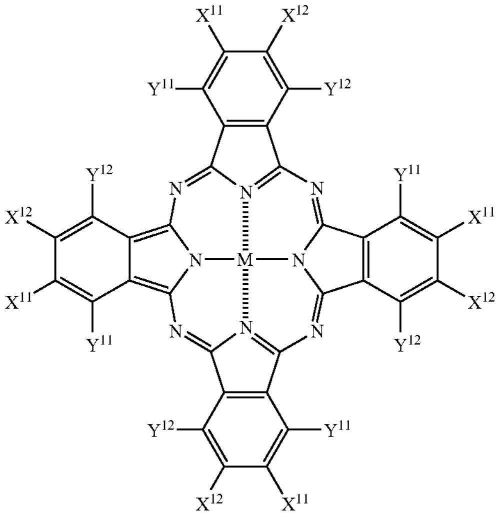
| No. | M | $X^{11}$ | $X^{12}$ | $Y^{11}$, $Y^{12}$ |
|---|---|---|---|---|
| e-24 | Cu | 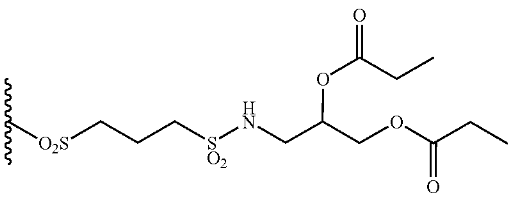 | H | H, H |

-continued
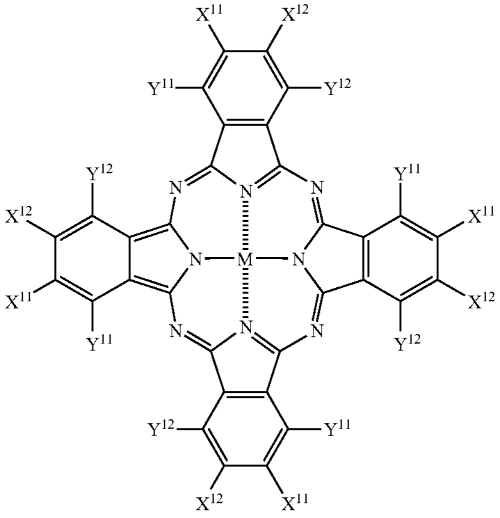
| No. | M | $X^{11}$ | $X^{12}$ | $Y^{11}, Y^{12}$ |
|---|---|---|---|---|
| e-25 | Cu | 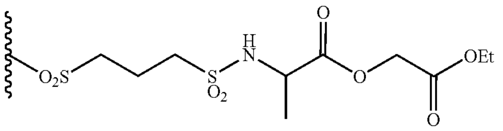 | H | H, Cl |
| e-26 | Cu | 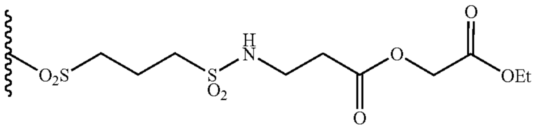 | H | H, Cl |
| e-27 | Cu | 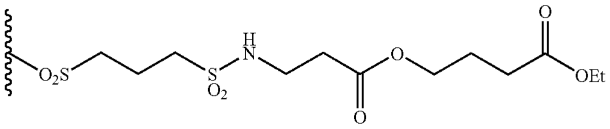 | H | H, Cl |
| e-28 | Cu | 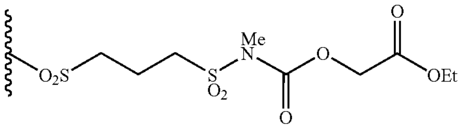 | H | H, Cl |
| e-29 | Cu | 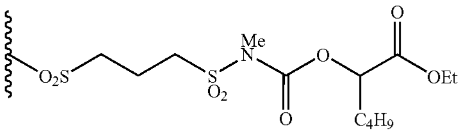 | H | H, Cl |
| e-30 | Cu | 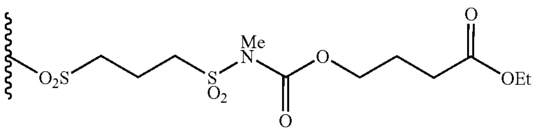 | H | H, Cl |

In t the formula, specific examples of the pairs ($X^{11}$, $X^{12}$) and ($Y^{11}$, $Y^{12}$) are may be in any order.
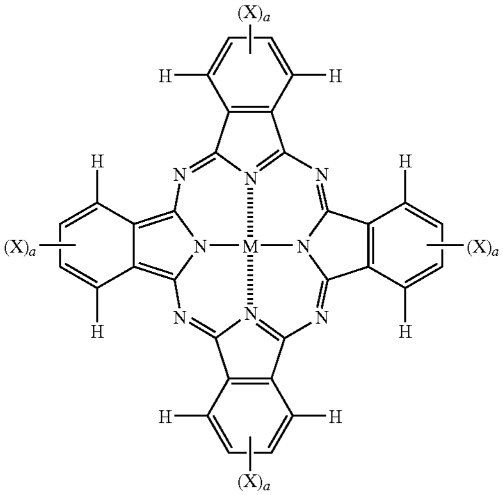
| No. | M | X | a |
|---|---|---|---|
| e-31 | Cu | 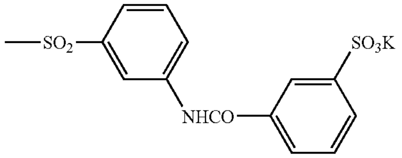 | 1 |
| e-32 | Cu | 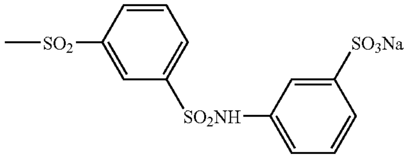 | 1 |
| e-33 | Cu | 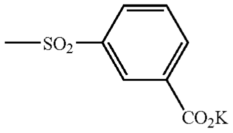 | 1 |
| e-34 | Ni | 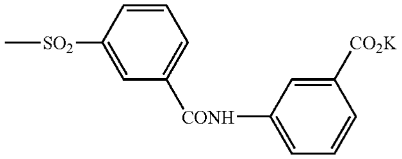 | 1 |
| e-35 | Cu | 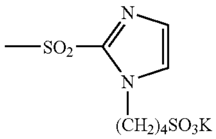 | 1 |
| e-36 | Cu | 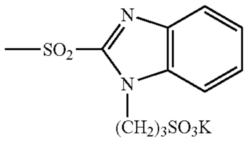 | 1 |
-continued
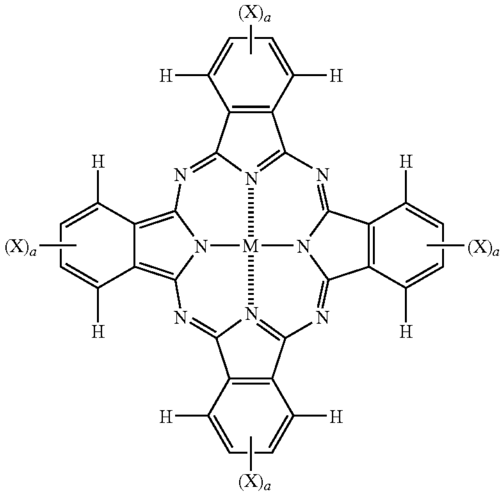
| No. | M | X | a |
|---|---|---|---|
| e-37 | Cu | 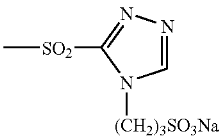 | 1 |
| e-38 | Cu | 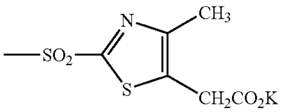 | 1 |
| e-39 | Cu | 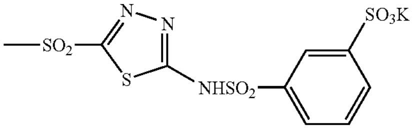 | 1 |
| e-40 | Cu | 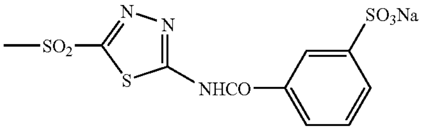 | 1 |
| e-41 | Cu | 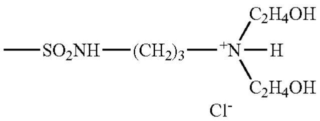 | 1 |
| e-42 | Cu | 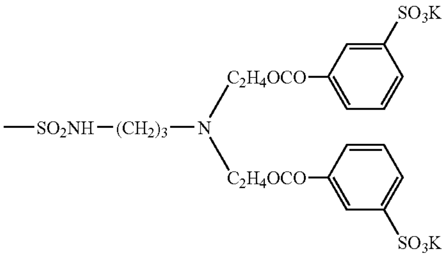 | 1 |

-continued

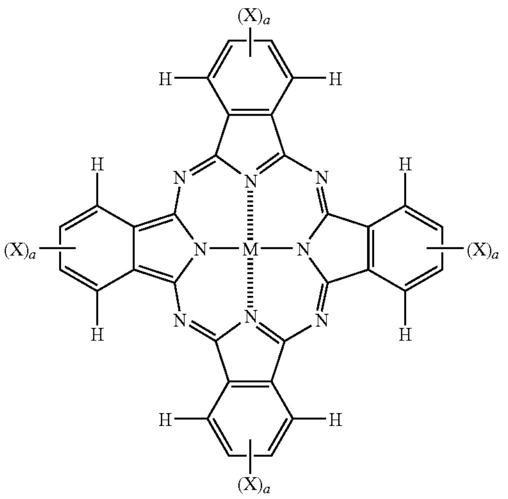

| No. | M | X | a |
|---|---|---|---|
| e-43 | Cu | 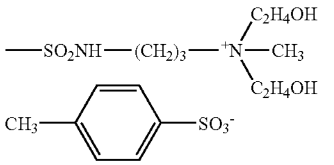 | 1 |
| e-44 | Cu | 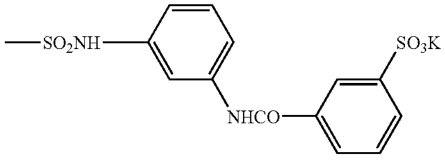 | 1 |
| e-45 | Cu | 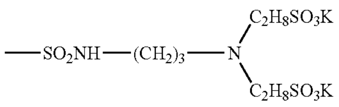 | 1 |
| e-46 | Ni | 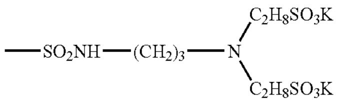 | 1 |
| e-47 | Zn | 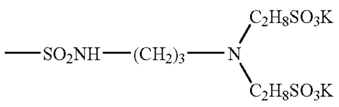 | 1 |
| e-48 | Cu | 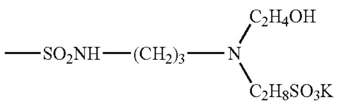 | 1 |
| e-49 | Cu | 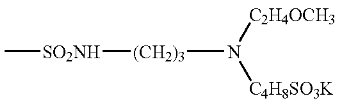 | 1 |
| e-50 | Cu | 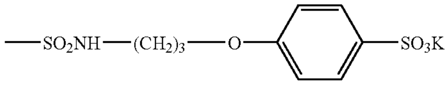 | 1 |

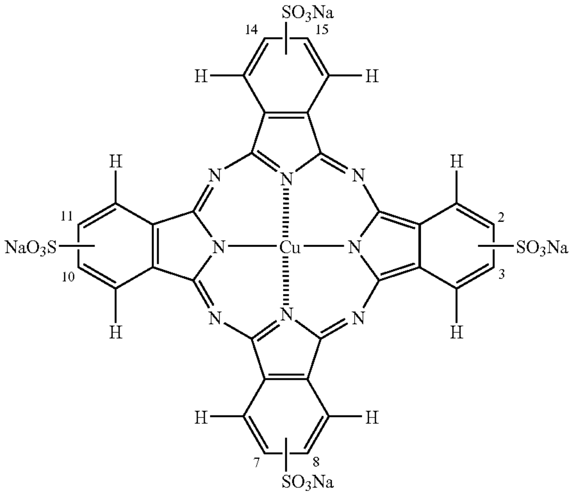

The colorant is preferably added to the composition in an amount of preferably 1 to 20 mass %, more preferably 2 to 10 mass %, as solid matter.

(Other Components)

Hereinafter, other additives added as needed to the invention will be described.

<Ultraviolet Absorbent>

An ultraviolet absorbent may be added to the ink composition according to the invention, for improvement in weather fastness and prevention of discoloration of the image obtained.

Examples of the ultraviolet absorbents include the benzotriazole compounds described in JP-A Nos. 58-185677, 61-190537, 2-782, 5-197075 and 9-34057 and others; the benzophenone compounds described in JP-A Nos. 46-2784 and 5-194483, U.S. Pat. No. 3,214,463, and others; the cinnamic acid compounds described in JP-B Nos. 48-30492 and 56-21141, JP-A No. 10-88106, and others; the triazine compounds described in JP-A Nos. 4-298503, 8-53427, 8-239368, 10-182621, and 8-501291, and others; the compounds described in Research Disclosure No. 24239; compounds emitting light by absorbing ultraviolet ray such as stilbene and benzoxazole compounds; so-called fluorescent brighteners; and the like.

The addition amount may be decided suitably according to applications, but is generally, approximately 0.5 to 15 mass % as solid matter.

<Sensitizer>

A sensitizer may be added as needed to the ink composition according to the invention, for improvement in acid-generating efficiency of the photo acid generating agent and for raising sensitization wavelength. The sensitizer is not particularly limited, if it sensitizes the photo acid generating agent in the electron- or energy-transfer mechanism. Favorable examples thereof include aromatic fused-ring compounds such as anthracene, 9,10-dialkoxyanthracene, pyrene, and perylene; aromatic ketone compounds such as acetophenone, benzophenone, thioxanthone, and Michler's ketone; and heterocyclic ring compounds such as phenothiazine and N-aryloxazolydinones. The addition amount is decided properly according to applications, but generally, preferably 0.01 to 1 mol %, more preferably 0.1 to 0.5 mol %, with respect to the photo acid generating agent.

<Antioxidant>

An antioxidant may be added, for improvement of stability of the ink composition. Examples of the antioxidants include those described in EP Laid-Open Nos. 223739, 309401, 309402, 310551, 310552, and 459416, German Patent Laid-Open No. 3435443, JP-A Nos. 54-48535, 62-262047, 63-113536, 63-163351, 2-262654, 2-71262, 3-121449, 5-61166, and 5-119449, U.S. Pat. Nos. 4,814,262 and 4,980, 275, and others.

The addition amount is decided properly according to applications, but generally, approximately 0.1 to 8 mass % as solid matter.

<Discoloration Inhibitor>

Any one of various organic and metal complex-based discoloration inhibitors may be used in the ink composition according to the invention. Examples of the organic discoloration inhibitor include hydroquinones, alkoxyphenols, dialkoxyphenols, phenols, anilines, amines, indanes, chromanes, alkoxyanilines, heterocyclic rings, and the like. Examples of the metal-complex discoloration inhibitors include nickel complexes, zinc complexes, and the like; and typical examples thereof include the compounds described in the patents cited in Research Disclosure No. 17643 (sections VII-I to J), ibid., No. 15162, ibid., No. 18716 (left column on p. 650), ibid., No. 36544 (p. 527), ibid., No. 307105 (p. 872), and ibid., No. 15162; and the compounds included in the formula of typical compounds and the exemplary compounds described in JP-A No. 62-215272, pp. 127 to 137. The addition amount is decided properly according to applications, but generally, approximately 0.1 to 8 mass % as solid matter.

<Conductive Salt>

A conductive salt such as potassium thiocyanate, lithium nitrate, ammonium thiocyanate, or dimethylamine hydrochloride may be added to the ink composition according to the invention, for control of the physical properties during ejection.

<Solvent>

Addition of an extremely trace amount of organic solvent to the ink composition according to the invention is effective for improvement in adhesiveness to the recording medium.

Examples of the solvents include ketone solvents such as acetone, methylethylketone, and diethylketone; alcohol solvents such as methanol, ethanol, 2-propanol, 1-propanol, 1-butanol, and tert-butanol; chlorine-based solvents such as chloroform, and methylene chloride; aromatic solvents such as benzene and toluene; ester solvents such as ethyl acetate, butyl acetate, and isopropyl acetate; ether solvents such as diethylether, tetrahydrofuran, and dioxane; glycol ether solvents such as ethylene glycol monomethyl ether and ethylene glycol dimethyl ether; and the like.

In such a case, the amount of the solvent added is in the range that does not cause problems of solvent resistance and VOC, and thus, preferably in the range of 0.1 to 5 mass %, more preferably 0.1 to 3 mass %, in the entire ink composition.

<Polymer Compound>

Various polymer compounds may be added to the ink composition, for adjustment of film physical properties. Examples of the polymer compounds include acrylic polymers, polyvinylbutyral resins, polyurethane resins, polyamide resins, polyester resins, epoxy resins, phenol resins, polycarbonate resins, polyvinylbutyral resins, polyvinylformal resins, shellac, vinyl resins, acrylic resins, rubber resin, waxes, other natural resins, and the like. These resins may be used in combination of two or more. Among them, vinyl copolymers obtained by copolymerization with an acrylic monomeric are preferable. In addition, copolymers containing a "carboxyl group-containing monomer", an "alkyl methacrylate ester", or an "alkyl acrylate ester" as the structural unit as a copolymerization component are also used favorably for the polymer binding material.

<Surfactant>

A surfactant may be added to the ink composition according to the invention.

The surfactants include those described in JP-A Nos. 62-173463 and 62-183457. Examples thereof include anionic surfactants such as dialkylsulfoscuccinic acid salts, alkylnaphthalenesulfonic acid salts, and fatty acid salts; nonionic surfactants such as polyoxyethylene alkylethers, polyoxyethylene alkylallylethers, acetylene glycol, and polyoxyethylene-polyoxypropylene block copolymers; cationic surfactants such as alkylamine salts and quaternary ammonium salts; and the like. An organic fluorocompound may be used instead of the surfactant. The organic fluorocompound is preferably hydrophobic. Examples of the organic fluorocompounds include fluorochemical surfactants, oily fluorochemical compounds (e.g., fluorine oil) and solid fluorochemical compound resins (e.g., tetraethylenefluoride resin); and typical examples thereof include those described in JP-B No. 57-9053 (Columns 8 to 17) and JP-A No. 62-135826.

In addition, a leveling additive, a matting agent, a wax for adjustment of film physical properties, or a tackifier for improvement of the adhesiveness to the recording medium such as of polyolefin and PET that does not inhibit polymerization may be added as needed to the ink composition according to the invention.

Typical examples of the tackifiers include the high-molecular weight adhesive polymers described in JP-A 2001-49200, pp. 5 to 6 (e.g., copolymers of a (meth)acrylic ester and an alcohol with an alkyl group having 1 to 20 carbons, of a (meth)acrylic ester and an alicyclic alcohol having 3 to 14 carbons, and of a (meth)acrylic ester and an aromatic alcohol having 6 to 14 carbons), and low-molecular weight adhesive resin containing a polymerizable unsaturated bond, and the like.

—Favorable Embodiment of Ink Composition—

As described above, the ink composition to which the curable composition according to the invention is applied (ink composition according to the invention) contains a specific polymerizable compound, a compound that generates acid by irradiation of a radiation ray, and as needed other additives such as other polymerizable compound and colorant. The content of the colorant is preferably 1 to 10 mass %, more preferably 2 to 8 mass %, and the content of the total polymerizable compounds including the specific polymerizable compound is preferably 1 to 97 mass %, more preferably, 30 to 95 mass %, with respect to the total mass of the ink composition. The compound that generates acid by irradiation of a radiation ray is contained in an amount of preferably 0.01 to 20 mass %, more preferably, 0.1 to 20 mass %, with respect to the total polymerizable compounds including the specific polymerizable compound.

When the ink composition according to the invention is used as inkjet recording ink, the viscosity of the inkjet recording ink is preferably 7 to 30 cm Pa·s, more preferably 7 to 20 mPa·s, at the ejection temperature (for example, 40 to 80° C., preferably 25 to 30° C.), from the point of ejection efficiency. The viscosity of the ink composition according to the invention at room temperature (25 to 30° C.) is preferably, for example, 35 to 500 mPa·s, more preferably 35 to 200 mPa·s. It is preferably to adjust the composition suitably so as to make the ink composition according to the invention have a viscosity in the range above. By increasing the viscosity at room temperature, it becomes possible to prevent penetration of the ink into a recording medium even when a porous recording medium is used, and reduce the amounts of unhardened monomer and odor. Favorably, it is also possible to suppress ink bleeding when the ink droplet is ejected and consequently improve the image quality.

The surface tension of the ink composition according to the invention is preferably 20 to 30 mN/m and more preferably 23 to 28 mN/m. When the ink composition according to the invention is used on various recording media such as polyolefin, PET, coated paper, and non-coated paper, the surface tension thereof is preferably 20 mN/m or more for prevention of ink bleeding and penetration, and 30 mN/m or less for improvement in compatibility therewith.

The ink composition according to the invention is used favorably as an inkjet recording ink. When used as an inkjet recording ink, the ink composition is ejected on a recording medium in an inkjet printer and then, the ejected ink composition is hardened by irradiation of a radiation ray for recording.

The print thus obtained with the ink is superior in the strength of the image area which is hardened by irradiation of an active radiation ray such as ultraviolet ray, and thus, the composition can be used not only for image forming but also in various applications, for example, in formation of an ink-receiving layer (image region) of planographic printing plate.

[Inkjet Recording Method]

The inkjet recording method (inkjet recording method according to the invention) to which the ink composition according to the invention is favorably applied will be described below.

The inkjet recording method comprising ejecting the ink composition according to the invention onto a recording medium by an inkjet recording apparatus; and then curing the ejected ink composition by irradiation of an active radiation ray.

The recording medium to which the ink composition according to the invention is applicable is not particularly limited, and examples thereof include papers such as common coated and non-coated papers and various non-absorptive resin materials for use in so-called soft packaging and resin films thereof in the film shape; and typical examples of the various plastic films include PET film, OPS film, OPP film, ONy film, PVC film, PE film, TAC film, and the like. Examples of the other plastics for use as the recording medium material include polycarbonate, acrylic resins, ABS, polyacetal, PVA, rubbers, and the like. In addition, metal and glass are also usable as the recording media.

The ink composition according to the invention, which is resistant to heat shrinkage during curing and superior in adhesiveness to the base material (recording medium), has an advantage of allowing formation of an high-definition image even on films easily curled or deformed, for example by curing and shrinkage of ink or the heat during curing reaction, such as thermally shrinkable PET film, OPS film, OPP film, ONy film, and PVC film.

Other examples of the recording materials for use in the invention include the supports for planographic printing plate described below.

Examples of the active radiation rays applied to the inkjet recording method according to the invention include a ray, y ray, X ray, ultraviolet ray, visible ray, infrared ray, electron beam, and the like. The peak wavelength of the active radiation ray is preferably 200 to 600 nm, more preferably 300 to 450 nm, and still more preferably 350 to 420 nm. In addition, the output of the active radiation ray is preferably 2,000 $mJ/cm^2$ or less, more preferably 10 to 2,000 $mJ/cm^2$, still more preferably 20 to 1,000 $mJ/cm^2$, and particularly preferably, 50 to 800 $mJ/cm^2$.

In particular in the inkjet recording method according to the invention, the ink composition is preferably irradiated with a light-emitting diode emitting an ultraviolet ray having an emission wavelength peak of 350 to 420 nm and having a maximum illumination on the recording medium surface at 10 to 1,000 $mW/cm^2$.

Other conditions applicable to the inkjet recording method according to the invention and details about the inkjet recording apparatus and others will be described below in description of the planographic printing plate according to the invention, a favorable application of the inkjet recording method according to the invention and, the method of preparing the same.

By using the inkjet recording method according to the invention, it is possible to make the dot diameter of ejected ink composition constant and obtain an image improved in quality even on various recording media different in surface wettability. For obtaining a color image in the invention, it is preferable to form images one by one from a color image lower in lightness. If inks are superimposed from the ink lower in lightness, the radiation ray does not easily reach to the lower ink, often leading to deterioration in curing efficiency, increase in the amount of residual monomer, generation of odor, and deterioration in adhesiveness. Although it is possible to irradiate an active radiation ray on a full-color image simultaneously, it is preferable to irradiate on each color image formed in sequence for acceleration of curing.

[Planographic Printing Plate and Method of Producing Planographic Printing Plate]

The method of producing a planographic printing plate according to the invention is a method of producing a planographic printing plate comprising: ejecting the ink composition according to the invention onto a support, and then curing the ejected ink composition by irradiation of an active radiation ray so as to form a hydrophobic image.

The planographic printing plate according to the invention is also a planographic printing plate prepared according to the method of producing a planographic printing plate according to the invention, which has a support and a hydrophobic image formed on the support.

So-called PS plates having an oleophilic photosensitive resin layer formed on a hydrophilic support have been used commonly as planographic printing plates. The PS plates have been produced normally by mask exposure (surface exposure) through a lith film and subsequent removal of non-image regions by solubilization. In recent years, digital technology, in which image information is processed, stored, and outputted electronically by computer, is becoming more and more popular, and there is a need for a newer image-output method compatible with the digital technology. As a result, under development is “computer-to-plate (CTP) technology” in which printing plates are produced, directly without lith film, by scanning with a high-directivity ray such as laser beam according to digitalized image information.

In the invention, a method of preparing a planographic printing plate directly by using an ink composition or an inkjet recording ink composition is used as the method of obtaining a planographic printing plate allowing such scanning exposure. In the method, a desirable printing plate having an image (preferably a hydrophobic image) is formed by ejecting an ink on a support (preferably hydrophilic support)

in the inkjet or other process and exposing the region of the ejected ink composition or inkjet recording ink to active radiation ray. The ink composition or the inkjet recording ink according to the invention is an ink composition or an inkjet recording ink suitable for such a process.

<Support>

The support (recording medium) for the planographic printing plate according to the invention is not particularly limited, if it is a dimensionally rigid plate-shaped support. The support is preferably a hydrophilic support. Examples thereof include papers, papers laminated with a plastic material (e.g., polyethylene, polypropylene, or polystyrene), metal plates (e.g., plates of aluminum, zinc, and copper), plastic films (e.g., films of cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, and polyvinylacetal), papers or plastic films having a laminated or vapor-deposited layer of the metal described above, and the like. Preferable supports are, for example, polyester films and aluminum plates. Among them, aluminum plates, which are dimensionally stable and relatively cheaper, are preferable.

Favorable aluminum plates are pure aluminum plates and alloy plates containing aluminum as the main component and small amounts of foreign elements, or may be plastic films laminated or deposited with aluminum. The foreign elements in the aluminum alloys include silicon, iron, manganese, copper, magnesium, chromium, zinc, bismuth, nickel, and titanium. The content of the foreign elements in the alloy is preferably 10 mass % or less. Although pure aluminum is most preferable in the invention, the aluminum plate may contain a small amount of foreign elements, because it is difficult to prepare completely pure aluminum due to the problems in the refining process. The composition of the aluminum plate is not particularly limited, and any one of known raw materials commonly used may be used.

The thickness of the support is preferably 0.1 to 0.6 mm and more preferably 0.15 to 0.4 mm.

The aluminum plate is preferably subjected to a surface finishing treatment such as surface-roughening treatment or anodizing treatment before use. Hydrophilicity of the support and adhesion between the image-recording layer and the support are improved by the surface finishing. Before the surface-roughening treatment, the aluminum plate is subjected to a degreasing treatment, for example, with a surfactant, organic solvent, aqueous alkaline solution, or the like for removal of the rolling oil on surface.

Various methods may be used for surface roughening of aluminum plate, and examples thereof include mechanical surface-roughening treatment, electrochemical surface-roughening treatment (surface-roughening by dissolving the surface electrochemically), and chemical surface-roughening treatment (surface-roughening by dissolving the surface chemically).

Any one of the methods known in the art such as ball polishing, brushing, blast polishing, and buffing may be used as the method of mechanical surface-roughening. Alternatively, a transfer method of transferring surface irregularity with a surface-irregular roll during hot rolling of aluminum may be used.

The electrochemical surface-roughening may be performed, for example, by applying an alternate or direct current to the support in an electrolyte solution containing an acid such as hydrochloric acid or nitric acid. Yet alternatively, the method of using a mixed acid described in JP-A No. 54-63902 may also be used.

The aluminum plate after surface-roughening treatment may be etched as needed by using an aqueous solution, for example, of potassium hydroxide or sodium hydroxide, and further after neutralization, treated as needed in an anodizing process for improvement in abrasion resistance.

Various electrolytes forming a porous oxide film may be used as the electrolytes for use in the process of anodizing aluminum plate. Sulfuric acid, hydrochloric acid, oxalic acid, chromic acid, or a mixed acid thereof is used commonly. The concentration of the electrolyte is determined properly according to the kind of electrolyte.

The condition of the anodizing process varies according to the electrolyte used, and thus is not specified particularly; but generally, the electrolyte concentration is 1 to 80 mass %; liquid temperature, 5 to 70° C.; electric current density, 5 to 60 A/dm$^2$; voltage, 1 to 100 V; and electrolysis period, 10 seconds to 5 minutes. The amount of the anodic oxide film formed is preferably 1.0 to 5,0 g/m$^2$ and more preferably 1.5 to 4.0 g/m$^2$. Favorably in the range above, it is possible to obtain a planographic printing plate favorable in printing durability and scuff resistance in the nonimage area.

The surface-finished support having an anodic oxide film described above may be used as the support for use in the invention, but may be subjected to another treatment as needed, for example, the treatment for expanding or sealing the micropores in the anodic oxide film described in JP-A Nos. 2001-253181 and 2001-322365 or a surface hydrophilizing treatment of immersing it in an aqueous solution containing a hydrophilic compound, for further improvement in adhesion to the upper layer, hydrophilicity, staining resistance, heat insulation efficiency, and others. The expanding and sealing treatments are not limited to the methods described above, and any one of known methods may be used.

<Micropore Sealing>

The micropore sealing may be performed by vapor sealing, treatment only with fluorozirconic acid, treatment with sodium fluoride sealing with an aqueous solution containing an inorganic fluorine compound, vapor sealing in the presence of lithium chloride, or sealing with hot water.

Among the methods above, micropore sealing with an aqueous solution containing an inorganic fluorine compound, steam sealing, or hot-water sealing is preferable. Each of the methods will be described below.

—Micropore Sealing in an Aqueous Solution Containing an Inorganic Fluorine Compound—

The inorganic fluorine compound used in micropore sealing in an aqueous solution containing an inorganic fluorine compound is preferably a metal fluoride.

Examples thereof include sodium fluoride, potassium fluoride, calcium fluoride, magnesium fluoride, sodium fluorozirconate, potassium fluorozirconate, sodium fluorotitanate, potassium fluorotitanate, ammonium fluorozirconate, ammonium fluorotitanate, potassium fluorotitanate, fluorozirconic acid, fluorotitanic acid, hexafluorosilicic acid, nickel fluoride, iron fluoride, fluorophosphoric acid, and ammonium fluorophosphate. Among them, sodium fluorozirconate, sodium fluorotitanate, fluorozirconic acid, and fluorotitanic acid are preferable.

The concentration of the inorganic fluorine compound in the aqueous solution is preferably 0.01 mass % or more, more preferably 0.05 mass % or more, for sufficient sealing of the micropores in the anodic oxide film, and preferably 1 mass % or less, more preferably 0.5 mass % or less, from the point of staining resistance.

The aqueous solution containing an inorganic fluorine compound preferably contains a phosphate salt compound additionally. Presence of the phosphate salt compound is favorable, because it is effective in increasing the hydrophilicity of the anodic oxide film surface and the printing efficiency and staining resistance during printing.

Favorable examples of the phosphate salt compounds include phosphate salts of a metal such as alkali metal and alkali-earth metal.

Typical examples thereof include zinc phosphate, aluminum phosphate, ammonium phosphate, diammonium hydrogen phosphate, ammonium dihydrogen phosphate, monoammonium phosphate, monopotassium phosphate, monosodium phosphate, potassium dihydrogen phosphate, dipotassium hydrogen phosphate, calcium phosphate, ammonium sodium hydrogen phosphate, magnesium hydrogen phosphate, magnesium phosphate, ferrous phosphate, ferric phosphate, sodium dihydrogen phosphate, sodium phosphate, disodium hydrogen phosphate, lead phosphate, diammonium phosphate, calcium dihydrogen phosphate, lithium phosphate, phosphotungstic acid, ammonium phosphotungstate, sodium phosphotungstate, ammonium phosphomolybdate, sodium phosphomolybdate, sodium phosphite, sodium tripolyphosphate, and sodium pyrophosphate. Among them, sodium dihydrogen phosphate, disodium hydrogen phosphate, potassium dihydrogen phosphate, and dipotassium hydrogen phosphate are preferable.

The combination of the inorganic fluorine compound and the phosphate salt compound is not particularly limited, but the aqueous solution preferably contains at least sodium fluorozirconate as the inorganic fluorine compound and at least sodium dihydrogen phosphate as the phosphate salt compound.

The concentration of the phosphate salt compounds in the aqueous solution is preferably 0.01 mass % or more, more preferably, 0.1 mass % or more, for improvement in the printing efficiency and staining resistance during printing, and preferably 20 mass % or less, more preferably 5 mass % or less, from the point of solubility.

The ratio of the compounds in the aqueous solution is not particularly limited, but the mass ratio of the inorganic fluorine compounds to the phosphate salt compounds is preferably 1/200 to 10/1 and more preferably 1/30 to 2/1.

In addition, the temperature of the aqueous solution is preferably 20° C. or higher, more preferably 40° C. or higher, and preferably 100° C. or lower, more preferably 80° C. or lower. The pH of the aqueous solution is preferably 1 or more, more preferably 2 or more, and preferably 11 or less, more preferably 5 or less.

The method of micropore sealing in the aqueous solution containing an inorganic fluorine compound is not particularly limited, and examples thereof include immersion method and spraying method. The methods may be performed only once or multiple times, and two or more of them may be used in combination.

Among them, an immersion method is preferable. When the immersion method is used for treatment, the treatment time is preferably 1 second or more, more preferably 3 seconds or more, and preferably 100 seconds or less, more preferably 20 seconds or less.

—Micropore Sealing in Steam—

The micropore sealing in steam can be performed, for example, by bringing steam under elevated or normal pressure into contact with the anodic oxide film continuously or uncontinuously.

The temperature of the steam is preferably 80° C. or higher, more preferably 95° C. or higher, and preferably 105° C. or lower.

The pressure of the steam is preferably in the range of (atmospheric pressure −50 mm Aq) to (atmospheric pressure +300 mm Aq), or ($1.008\times10^5$ to $1.043\times10^5$ Pa).

The contact time of the steam is preferably 1 second or more, more preferably 3 seconds or more and preferably 100 seconds or less, more preferably 20 seconds or less.

—Micropore Sealing in Hot Water—

The micropore sealing in steam is performed, for example, by immersing an aluminum plate carrying a formed anodic oxide film in hot water.

The hot water may contain an inorganic salt (e.g., phosphate salt) or an organic salt.

The temperature of the hot water is preferably 80° C. or higher, more preferably 95° C. or higher, and preferably 100° C. or lower.

The period of immersion in hot water is preferably 1 second or more, more preferably 3 seconds or more, and preferably 100 seconds or less, more preferably 20 seconds or less.

The hydrophilizing treatments for use in the invention include the alkali metal silicate methods described in U.S. Patent Nos. 2,714,066, 3,181,461, 3,280,734 and 3,902,734. In the method, the support is immersed and electrolyzed, for example, in an aqueous solution of sodium silicate. Also included are the method of treating the support with potassium fluorozirconate described in JP-B No. 36-22063 and the methods of treating it with polyvinylphosphonic acid described in U.S. Pat. Nos. 3,276,868, 4,153,461 and 4,689,272.

The support preferably has an average center-line roughness of 0.10 to 1.2 μm. Favorably in the range above, it is possible to obtain desirable adhesiveness to the image-recording layer, favorable printing durability, and favorable staining resistance.

In ejecting the ink composition or the inkjet recording ink composition according to the invention on the surface of the hydrophilic support above, it is preferably to heat the ink composition or the inkjet recording ink composition to a temperature of preferably 40 to 80° C., more preferably 25 to 30° C. and thus lower the viscosity of the ink composition to preferably 7 to 30 m Pa·s, more preferably 7 to 20 m Pa·s. In particular, use of an ink composition having an ink viscosity of 35 to 500 mP·s at 25° C. is preferable as it give a better effect. Use of the method provides high ejection stability.

Commonly, radiation-curing ink compositions including the ink composition according to the invention have higher viscosity than aqueous inks normally used ink compositions or inkjet recording inks, and the viscosity thereof varies significantly according to the fluctuation of temperature during ejection. The fluctuation of the ink viscosity has great influences on the change of droplet size and droplet ejection speed, consequently leading to deterioration in image quality. Thus, it is necessary to keep the temperature during ink ejection as constant as possible. Thus, the control width of the temperature in the invention is preferably temperature setting ±5° C., more preferably temperature setting ±2° C., and still more preferably temperature setting ±1° C.

(Inkjet Recording Apparatus)

The inkjet recording apparatus used in the invention is not particularly limited, and any one of commercially available inkjet recording apparatuses may be used. That is, in the invention, an image may be recorded on a recording medium by using a commercially available inkjet recording apparatus.

The inkjet recording apparatus used in the invention has, for example, an ink-supplying system, a temperature sensor, and a radiation ray source.

The ink-supplying system further has, for example, a stock tank storing an inkjet composition, a supply pipe, an inkjet composition-supplying tank immediately before the inkjet head, a filter, and a piezoelectric inkjet head. The piezoelectric inkjet head allows ejection of multi-sized dots in amounts of 1 to 100 pl, preferably, 8 to 30 pl, at a definition, for example, of 320×320 to 4,000×4,000 dpi, preferably 400×400 to 1,600×1,600 dpi, and more preferably 720×720 dpi. The "dpi" in the invention means the dot number per 2.54 cm.

As described above, the radiation-curing ink ejected is preferably heated to a particular constant temperature, and thus, the region from the ink-supplying tank to the inkjet head is preferably insulated and heated. The method of controlling temperature is not particularly limited, and, for example, the piping units are preferably heated for control of the temperature properly according to the flow of ink and environment temperature while monitored by respective temperature sensors. The temperature sensors may be placed close to the ink-supplying tank and the inkjet head nozzle. In addition, the heating head unit is preferably thermally insulated or protected, for prevention of the environmental influence on the apparatus. It is preferable to insulate it from other units and reduce the heat capacity of the entire heating unit, for shortening the start-up time needed for heating or for reducing the loss in heat energy.

The ink composition ejected onto the surface of a hydrophilic support cures by irradiation of active radiation ray. If a Sensitizing dye is then present together with a polymerization initiator (photoinitiator) in the ink composition, the Sensitizing dye in the system is activated into the excited state by absorption of the active radiation ray, accelerates decomposition of the polymerization initiator upon contact with the polymerization initiator, and allows more sensitive progress of the curing reaction.

Examples of the active radiation rays include α ray, γ ray, electron beam, X ray, ultraviolet ray, visible or infrared light, and the like. The peak wavelength of the active radiation ray may vary according to the absorption property of the sensitizing colorant in ink composition, but is, for example, 200 to 600 nm, preferably 300 to 450 nm, and more preferably 350 to 420 nm. The polymerization initiation system in the invention is sufficiently sensitive to a radiation ray at low output. Thus, the favorable output of the radiation ray is, for example, a irradiation energy of 2,000 $mJ/cm^2$ or less, preferably 10 to 2,000 $mJ/cm^2$, more preferably, 20 to 1,000 $mJ/cm^2$, and still more preferably, 50 to 800 $mJ/cm^2$. The active radiation ray is irradiated at an exposure plane illuminance of, for example, 10 to 2,000 $mW/cm^2$ and preferably, 20 to 1,000 $mW/cm^2$.

Mercury lamps, gas or solid state lasers and the like have been widely used as active radiation ray sources, and mercury lamps and metal halide lamps are widely used in ultraviolet-curing inkjet printers. However, under the current urgent need for mercury-free devices from the viewpoint of environmental protection, substitution thereof with a GaN semiconductor ultraviolet ray-emitting device is very useful industrially or environmentally. In addition, LED's (UV-LEDs) and LD's (UV-LDs) are smaller in size, longer in lifetime, higher in efficiency and lower in cost, and thus, attracting attention as a light source for radiation-curing inkjet printers.

In the invention, a light-emitting diode (LED) or a laser diode (LD) may be used as the active radiation ray source. In particular, an ultraviolet LED or an ultraviolet LD may be used if an ultraviolet ray source is desirable. For example, a purple LED emitting a light having the main emission spectrum in the wavelength region of 365 to 420 nm is available from Nichia Corporation. If a light having a further shorter wavelength is desirable, U.S. Pat. No. 6,084,250 discloses an LED emitting a radiation ray mainly in the wavelength region of 300 to 370 nm. Alternatively, other ultraviolet LED's are also commercially available, and thus, it is possible to irradiate radiation rays different in the ultraviolet ray band. The radiation ray sources most preferable in the invention are UV-LED's, and particularly preferable are UV-LED's having a peak wavelength in the range of 350 to 420 nm.

In addition, the maximum illuminance of LED on the recording medium is preferably 10 to 2,000 $mW/cm^2$, more preferably 20 to 1,000 $mW/cm^2$, and particularly preferably 50 to 800 $mJ/cm^2$.

In the invention, the ink composition is preferably exposed to the active radiation ray, for example, for 0.01 to 120 seconds, preferably, 0.1 to 90 seconds.

The irradiation condition and the basic irradiation method of the active radiation ray are disclosed in JP-A No. 60-132767. Specifically, the exposure is performed in a so-called shuttle process, i.e., by moving a head unit and light sources that are placed at both sides of the head unit in the ink-ejecting device. The active radiation ray is irradiated after a certain period (e.g., 0.01 to 0.5 second, preferably 0.01 to 0.3 second, and more preferably, 0.01 to 0.15 second) from ink ejection. It is possible to prevent bleeding of the ink ejected on the recording medium before curing by controlling the period from ink ejection as short as possible. In this manner, it becomes possible to irradiate the ink before penetration into the depth to which no light is penetrable even on a porous recording medium, suppress the amount of unreacted residual monomer, and consequently reduce odor.

Alternatively, the ink may be hardened with a light from another fixed light source. WO 99/54415 Pamphlet discloses, as the irradiation method, a method of using optical fiber and a method of irradiating the recorded area with a collimated UV ray, i.e., a collimated light reflected from a mirror placed on the side face of head unit.

Thus according to the method of producing a planographic printing plate according to the invention, it is possible to form a hydrophobic image on the surface of a support by using the ink composition according to the invention and curing the ejected ink composition by irradiation of active radiation ray.

EXAMPLES

Hereinafter, the present invention will be described specifically with reference to Examples and Comparative Examples, but it should be understood that the invention is not restricted by these Examples.

Example 1-1

Preparation of Inks

| <Yellow ink 1> | |
|---|---|
| C.I. Pigmeent Yellow 13 | 5 parts by mass |
| Photocationic polymerization initiator: triphenylsulfonium salt (UV1-6992, manufactured by Dow Chemical Company) | 6 parts by mass |
| Senzitizing dye: 9,10-dibutoxyanthracene | 3 parts by mass |
| Polymerizable compound | |
| Monomer: 3,4-epoxycyclohexylmethyl-3',4'-epoxycyclohexanecarboxylate (Celoxide 2021A: manufactured by Daicel UCB) | 35 parts by mass |

-continued

| <Yellow ink 1> | |
|---|---|
| Monomer: 3,7-bis(3-oxetanyl)-5-oxanonane (OXT-221: manufactured by Toagosei Co., Ltd.) | 40 parts by mass |
| Monomer: following compound (a-1) | 11 parts by mass |

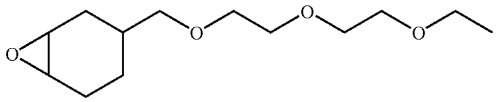

Compound (a-1)

| <Magenta ink 1> | |
|---|---|
| C.I. Pigment Red 57:1 | 5 parts by mass |
| Photocationic polymerization initiator: triphenylsulfonium salt (UVI-6992, manufactured by Dow Chemical Company) | 6 parts by mass |
| Sensitizing dye: 9,10-dibutoxyanthracene | 3 parts by mass |
| Polymerizable compound | |
| Monomer: 3,4-epoxycyclohexylmethyl-3',4'-epoxycyclohexanecarboxylate (Celoxide 2021A: manufactured by Daicel UCB) | 35 parts by mass |
| Monomer: 3,7-bis(3-oxetanyl)-5-oxanonane (OXT-2:21: manufactured by Toagosei Co., Ltd.) | 40 parts by mass |
| Monomer: the compound (a-1) | 11 parts by mass |

| <Cyan ink 1> | |
|---|---|
| C.I. Pigment Blue 15:3 | 5 parts by mass |
| Photocationic polymerization initiator: triphenylsulfonium salt (UVI-6992, manufactured by Dow Chemical Company) | 6 parts by mass |
| Sensitizing dye: 9,10-dibutoxyanthracene | 3 parts by mass |
| Polymerizable compound | |
| Monomer: 3,4-epoxycyclohexylmethyl-3',4'-epoxycyclohexanecarboxylate (Celoxide 2021A: manufactured by Daicel UCB) | 35 parts by mass |
| Monomer: 3,7-bis(3-oxetanyl)-5-oxanonane (OXT-221: manufactured by Toagosei Co., Ltd.) | 40 parts by mass |
| Monomer: compound (a-1) | 11 parts by mass |

| <Black ink 1> | |
|---|---|
| C.I. Pigment black | 75 parts by mass |
| Photocationic polymerization initiator: triphenylsulfonium salt (UVI-6992, manufactured by Dow Chemical Company) | 6 parts by mass |
| Sensitizing dye: 9,10-dibutoxyanthracene | 3 parts by mass |
| Polymerizable compound | |
| Monomer: 3,4-epoxycyclohexylmethyl-3',4'-epoxycyclohexanecarboxylate (Celoxide 2021A: manufactured by Daicel UCB) | 35 parts by mass |
| Monomer: 3,7-bis(3-oxetanyl)-5-oxanonane (OXT-221: manufactured by Toagosei Co., Ltd.) | 40 parts by mass |
| Monomer: the compound (a-1) | 11 parts by mass |

Various crude color inks 1 thus prepared were filtered through a filter having a filtration accuracy of 2 μm of filter, to give inks 1 in various colors.

Inkjet Image Recording and Evaluation of Multicolor Image

Then, an image was recorded on a recording medium by using a commercially available inkjet recording apparatus equipped with a piezoelectric inkjet nozzle. The ink-supplying system consists of an ink stock tank, a supply pipe, an ink-supplying tank immediately before inkjet head, a filter, and a piezoelectric inkjet head, and the region from the ink-supplying tank to the inkjet head was insulated and heated. The temperature sensors were placed close to the ink-supplying tank and inkjet head nozzle, and the nozzle area is controlled always to a temperature of 70° C.±2° C. The piezoelectric inkjet head was driven to eject multi-sized dots in amounts of 8 to 30 pl at a definition of 720×720 dpi. The exposure system, main scanning speed, and injection frequency were adjusted in such a manner that a UV-A beam was first irradiated at an exposure-face illuminance of 100 $mW/cm^2$ after 0.1 second from ejection of ink on the recording medium. Exposure energy was irradiated while the exposure period was made variable. The "dpi" in the invention means a dot number per 2.54 cm.

Each of the inks in various colors thus prepared was ejected at an environment temperature of 25° C. repeatedly one by one in the order of black, cyan, magenta, and yellow, and irradiated with ultraviolet light after each ejection by using a metal halide lamp Vzero085 manufactured by Integration Technology. Each image was exposed to light at a constant total exposure energy per color of 100 $mJ/cm^2$ for complete curing until it became non-tacky by examination by hand. The image was recorded on recording media: a surface-roughened aluminum support, a surface-finished transparent biaxially stretched polypropylene film suitable for printing, a soft vinyl chloride sheet, and a cast-coated paper, and a commercially available recycled paper; and the inks gave a favorable image without dot blurring on all of the media. Even when the inks were used in forming an image on woodfree paper, the inks hardened sufficiently before penetration thereof to the rear face and did not generate the odor derived from unreacted monomer. In addition, the inks recorded on a film were sufficiently flexible, and there was no crack of the ink when the film was bent or no problem in the adhesiveness as determined in a cellophane-tape peeling test.

Example 1-2

<Magenta Ink 2>

A magenta ink 2 was prepared in a similar manner to the magenta ink 1, except that, among the monomers used as polymerizable compounds in magenta ink 1 prepared in Example 1-1, the 11 parts by mass of compound (a-1) was replaced with 11 parts by mass of the following compound (a-2).

Compound (a-2)

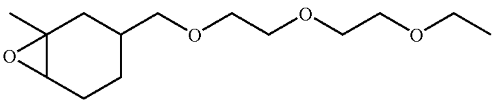

Example 1-3

<Magenta Ink 3>

A magenta ink 3 was prepared in a similar manner to the magenta ink 1, except that, among the monomers used as polymerizable compounds in magenta ink 1 prepared in Example 1-1, the 11 parts by mass of compound (a-1) was replaced with 11 parts by mass of the following compound (a-3).

Compound (a-3)

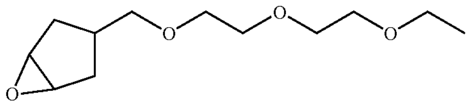

Example 1-4

<Magenta Ink 4>

A magenta ink 4 was prepared in a similar manner to the magenta ink 1, except that, among the monomers used as polymerizable compounds in magenta ink 1 prepared in Example 1-1, 11 parts by mass of compound (a-1) was replaced with 11 parts by mass of the following compound (a-4).

Compound (a-4)

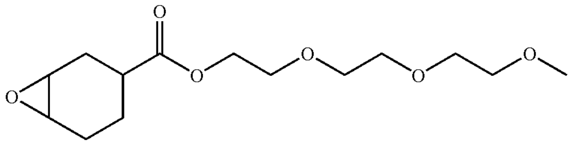

Example 1-5

<Magenta Ink 5>

A magenta ink 5 was prepared in a similar manner to the magenta ink 1, except that the 3 parts by mass of "9,10-dibutoxyanthracene" used as a Sensitizing dye in magenta ink 1 prepared in Example 1-1 was replaced with 3 parts by mass of "Darocur ITX (manufactured by Ciba Specialty Chemicals)".

Example 1-6

<Magenta Ink 6>

A magenta ink 6 was prepared in a similar manner to the magenta ink 1, except that the 5 parts by mass of "C.I. Pigment Red 57:1" used in the magenta ink 1 prepared in Example 1-1 was replaced with 5 parts by mass of the following "oil soluble dye M-1 having an oxidation potential of +1.37 V".

M-1

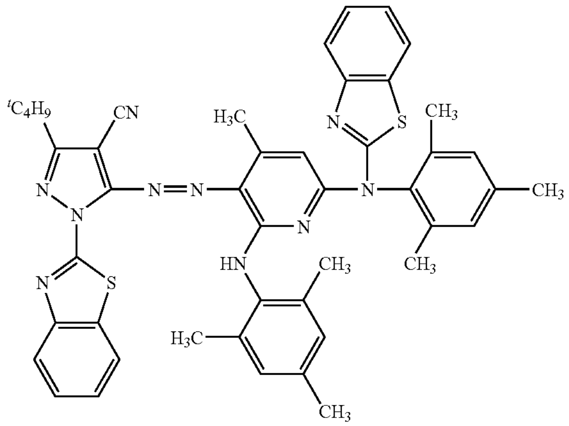

Example 1-7

<Magenta Ink 7>

A magenta ink 7 was prepared in a similar manner to the magenta ink 1, except that the 5 parts by mass of the "C.I. Pigment Red 57:1" used in the magenta ink 1 prepared in Example 1-1 was replaced with 5 parts by mass of the following "oil soluble dye M-2 (oxidation potential: +0.94 V)".

M-2

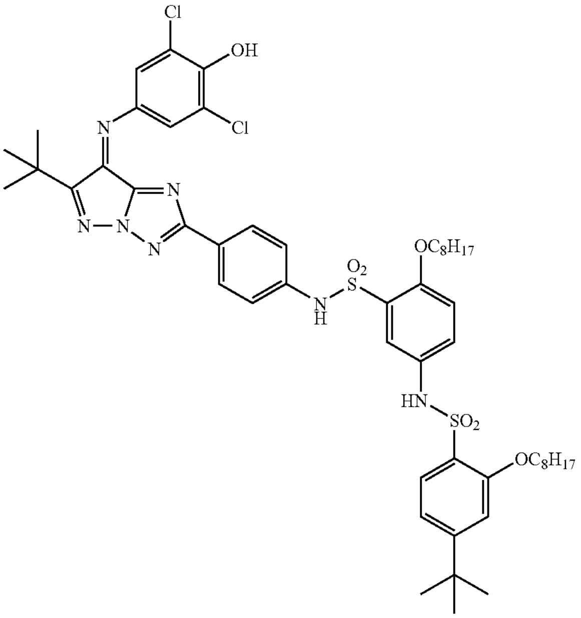

Comparative Example 1-1

<Magenta Ink 8>

A magenta ink 8 was prepared in a similar manner to the magenta ink 1, except that, among the monomers used as polymerizable compounds in magenta ink 1 prepared in Example 1-1, the 40 parts by mass of 3,7-bis(3-oxetanyl)-5-oxanonane (OXT-221: manufactured by Toagosei Co., Ltd.) and the 11 parts by mass of compound (a-1) were replaced with 51 parts by mass of 3,7-bis(3-oxetanyl)-5-oxanonane (OXT-221: manufactured by Toagosei Co., Ltd.).

Comparative Example 1-2

<Magenta Ink 9>

A magenta ink 9 was prepared in a similar manner to the magenta ink 1, except that, among the monomers used as polymerizable compounds in magenta ink 1 prepared in Example 1-1, the 11 parts by mass of the compound (a-1) was replaced with 11 parts by mass of the following comparative compound.

Comparative compound

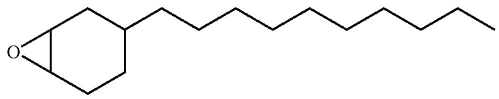

Each of the crude magenta inks 2 to 9 prepared in Examples 1-2 to 1-7 and Comparative Examples 1-1 and 1-2 was filtered through a filter having an absolute filtration accuracy of 2 μm, to give each of magenta inks 2 to 9.

The ink viscosity of each of the ink compositions prepared in the Examples and Comparative Examples was in the range of 7 to 20 mPa·s at the ink ejection temperature.

(Inkjet Image Recording)

A magenta image was formed according to a method similar to Example 1 above, by using each of the magenta inks 2 to 9 thus prepared in Examples 1-2 to 1-7 and Comparative Examples 1-1 and 1-2, and the magenta ink 1 prepared in Example 1.

(Evaluation of Inkjet Image)

The curing sensitivity, adhesiveness, and heat resistance of each image formed on a commercially available recycled paper were evaluated according to the methods described below. Evaluation results are summarized in the following Table 1.

1. Measurement of Curing Sensitivity

The amount of exposure energy ($mJ/cm^2$) needed to make an image surface non-tacky after UV irradiation was defined as the curing sensitivity. A smaller value indicates a higher sensitivity.

2. Adhesiveness

The hardened film was cut vertically and horizontally multiple times, and an adhesive tape was bonded to the surface and then peeled off. The hardened film remaining on the base material was observed visually.

The hardened film without exfoliation was ranked A; with partial exfoliation, B; with significant exfoliation, C; and unevaluated because of insufficient curing, D.

3. Heat Resistance

Each of the magenta inks 1 to 9 obtained in Examples and Comparative Examples was placed in an oven at 60° C. for 4 weeks, and the viscosity (m Pa·s) of the ink before and after storage at 25° C. was determined by using RE80 viscometer (manufactured by Toki Sangyo Co., Ltd.).

As shown in Table 1, the magenta inks obtained in Examples (ink compositions from the curable compositions according to the invention) were inks superior in curing sensitivity and also in adhesiveness and heat resistance.

Example 1-8]

Image Formation by Light-Emitting Diode (LED)

Inkjet image recording was performed in a similar manner to Example 1, except that the magenta ink 1 prepared in Example 1-1 was used and the metal halide lamp Vzero085 manufactured by Integration Technology was replaced with an ultraviolet light-emitting diode (UV-LED). The UV-LED used in the present Example was NCCU033 manufactured by Nichia Corporation. The LED emits an UV ray having a wavelength of 365 nm from a tip, and a ray at an intensity of approximately 100 mW per tip when an current of approximately 500 mA was applied. It is possible to give a power of 0.3 $W/cm^2$ on the surface of the recording medium (hereinafter, referred to also as medium) by using multiple tips placed at an interval of 7 mm. The period from ejection to exposure and the exposure period were variable according to the traveling speed of the medium and the distance between the head and the LED. In the present Example, the image was exposed to light approximately 0.5 second after ejection.

It is possible to adjust the exposure energy on medium in the range of 0.01 to 15 $J/cm^2$ according to the settings for the distance to medium and traveling speed.

Comparative Example 1-3

Image Formation by Light-Emitting Diode (LED)

Inkjet image recording was performed in a similar manner to Example 1-8, except that the magenta ink 1 used in Example 1-8 was replaced with the magenta ink 8 prepared in Comparative Example 1-1

Evaluation of Inkjet Image

Each image formed was evaluated in a similar manner to Examples 1-1 to 1-7 and Comparative Examples 1-1 and 1-2. Evaluation results are summarized in Table 2.

TABLE 1

| | Magenta ink number | Curing speed ($mJ/cm^2$) | Adhesiveness | Heat resistance (before storage) (m · Pa) | Heat resistance (after storage) (m · Pa) |
|---|---|---|---|---|---|
| Example 1-1 | 1 | 100 | A | 33 | 34 |
| Example 1-2 | 2 | 120 | A | 36 | 36 |
| Example 1-3 | 3 | 100 | A | 35 | 35 |
| Example 1-4 | 4 | 110 | A | 35 | 35 |
| Example 1-5 | 5 | 120 | A | 36 | 36 |
| Example 1-6 | 6 | 120 | A | 35 | 36 |
| Example 1-7 | 7 | 80 | A | 35 | 36 |
| Comparative Example 1-1 | 8 | 300 | C | 35 | 750 |
| Comparative Example 1-2 | 9 | 500 | D | 35 | Solidified |

TABLE 2

| | Magenta ink number | Curing speed (mJ/cm$^2$) | Adhesiveness | Heat resistance (before storage) (m · Pa) | Heat resistance (after storage) (m · Pa) |
|---|---|---|---|---|---|
| 1-8 | 1 | 70 | A | 35 | 36 |
| 1-3 | 8 | 500 | C | 35 | solid |

Comparison of the results shown in Table 1 where an ultraviolet ray lamp was used and those in Table 2 where a ultraviolet light-emitting diode was used reveals that the inks were more sensitive to the radiation ray from the ultraviolet light-emitting diode.

Examples 2-9 to 2-16 And Comparative Examples 2-1 to 2-3

Preparation of Support

Molten aluminum was prepared by using an aluminum alloy in a composition (consisting of Al, Si: 0.06 mass %, Fe: 0.30 mass %, Cu: 0.025 mass %, Mn: 0.001 mass Mg: 0.001 mass %, Zn: 0.001 mass %, Ti: 0.03 mass %, and unavoidable impurities); and the molten aluminum was filtered and molded into ingots having a thickness of 500 mm and a width of 1,200 mm by DC casting. The surface of the ingot was scraped to an average depth of 10 mm by a surface grinder, and the ingot was heated consistently at 550° C. for approximately 5 hours, and hot-rolled into a rolled plate having a thickness of 2.7 mm after it is cooled to a temperature of 400° C. The plate was heat-treated additionally at 500° C. in a continuous annealing machine, and cold-rolled into a JIS1050 aluminum plate having a thickness of 0.24 mm. The width and the length of the average crystal grain in the aluminum plate obtained were respectively 50 μm and 300 μm. After the aluminum plate was cut to a width of 1,030 mm, it was subjected to the following surface treatment.

<Surface Treatment>

The following various treatments (a) to (j) were performed continuously. The processing solution remaining on the aluminum plate was removed by nip roller, after each treatment and washing with water.

(a) Mechanical Surface-Roughening Treatment

The aluminum plate was surface-roughened mechanically with a revolving roller-shaped nylon brush, while an aberrational slurry suspension of an abrasive having a specific gravity of 1.12 (pumice) in water is supplied to the surface of the aluminum plate. The average diameter of the abrasive particles was 30 μm, and the maximum diameter 100 μm. The nylon brush is made of 6·10 nylon, and the length and the diameter of the bristles were respectively 45 mm and 0.3 mm. The nylon brush was planted on a ϕ300 mm stainless steel tube as it is embedded in the holes therein. Three rotating brushes were used. The distance between the two supporting rollers ϕ200 mm) at the bottom of the brush was 300 mm. The brush roller was pressed hard onto the aluminum plate, until the load of the drive motor rotating the brush reaches 7 kW or more larger than the load before the roller is pressed thereon. The rotation direction of the brush was the same as the traveling direction of the aluminum plate. The rotation frequency of the brush was 200 rpm.

(b) Alkaline Etching Treatment

The aluminum plate thus obtained was etched by spraying it with an aqueous solution containing caustic soda and aluminum ion at concentrations respectively of 2.6 mass % and 6.5 mass % at a temperature of 70° C. and dissolving the aluminum plate in an amount of 10 g/m$^2$. The aluminum plate was then washed with water by spraying.

(c) Desmutting Treatment

The aluminum plate was desmutted by spraying it with an aqueous solution at a temperature of 30° C. containing nitric acid at a concentration of 1 mass % (also containing aluminum ion at 0.5 mass %) and then washed with water by spraying. The aqueous solution nitrate used in desmutting used was the wastewater discharged from the step of electrochemical surface-roughening treatment in an aqueous nitric acid solution by using AC current.

(d) Electrochemical Surface-Roughening Treatment

The aluminum plate was then surface-roughened electrochemically, continuously by applying a 60-Hz AC voltage. The electrolyte solution used then was an aqueous solution containing 10.5 g/L nitric acid (also containing aluminum ion at 5 g/L and ammonium ion at 0.007 mass %), and the liquid temperature was 50° C. The electrochemical surface-roughening treatment was performed by using a trapezoidal alternate current at an electric-current transition period from zero to the peak TP of 0.8 msec and a duty ratio of 1:1, and also using a carbon electrode as the counter electrode. The auxiliary anode used was ferrite. The electric current density was 30 A/dm$^2$ at the maximum, and when an aluminum plate is used as the anode, the total amount of electric current applied was 220 C/dm$^2$. Part (5%) of the current from power source was divided and sent to the auxiliary electrode.

Subsequently, the aluminum plate was washed with water by spraying.

(e) Alkaline Etching Treatment

The aluminum plate was etched by spraying it with an aqueous solution containing caustic soda and aluminum ion at concentrations respectively of 26 mass % and 6.5 mass % at 32° C. and dissolving the aluminum plate in an amount of 0.50 g/m$^2$; and the smuts mainly of aluminum hydroxide generated in the electrochemical surface-roughening treatment was removed and the edge region of the bit was dissolved, smoothening the edge region, by using the AC current in the stage above. Subsequently, the aluminum plate was washed with water by spraying.

(f) Desmutting Treatment

The aluminum plate was desmutted by spraying it with an aqueous 15 mass % sulfuric acid solution (also containing aluminum ion at 4.5 mass %) at a temperature of 30° C., and then, washed with water by spraying. The aqueous nitric acid solution used in the desmutting treatment was the wastewater from the step of electrochemical surface-roughening treatment in an aqueous nitric acid solution by using AC current.

(g) Electrochemical Surface-Roughening Treatment

The aluminum plate was surface-roughened electrochemically, continuously by using a 60-Hz AC voltage. The electrolyte solution used then was an aqueous 5.0 g/L hydrochloric acid solution (also containing aluminum ion at 5 g/L) at a temperature of 35° C. The electrochemical surface-roughening treatment was performed by using a trapezoidal alternate current at an electric-current transition period of from zero to the peak TP of 0.8 msec and a duty ratio of 1: 1 and also using a carbon electrode as the counter electrode. The auxiliary anode used was ferrite. The electric current density was 25

A/dm$^2$ at the maximum, and when an aluminum plate is used as the anode, the total amount of electric current applied was 50 C/dm$^2$. Subsequently, the aluminum plate was washed with water by spraying.

(h) Alkaline Etching Treatment

The aluminum plate was etched by spraying it with an aqueous solution containing caustic soda and aluminum ion at concentrations respectively of 26 mass % and 6.5 mass % at 32° C. and dissolving the aluminum plate in an amount of 0.12 g/m$^2$; and the smuts mainly of aluminum hydroxide generated in the electrochemical surface-roughening treatment was removed and the edge region of the bit was dissolved, smoothening the edge region, by using the AC current in the stage above. Subsequently, the aluminum plate was washed with water by spraying.

(i) Desmutting Treatment

The aluminum plate was desmutted by spraying it with an aqueous 25 mass % sulfuric acid solution (also containing aluminum ion at 0.5 mass %) at a temperature of 60° C., and then, washed with water by spraying.

(j) Anodizing Treatment

The aluminum plate was anodized in an anodic oxidation apparatus (the length of the first and second electrolysis units: 6 m, the length of the first and second power supply units: 3 m, and the length of the first and second power-supply electrode unit: 2.4 m). The electrolyte solution supplied to the first and second electrolysis units was sulfuric acid. The electrolyte solution was an aqueous 50 g/L sulfuric acid solution (also containing aluminum ion at 0.5 mass %) at a temperature of 20° C. The aluminum plate was then washed with water by spraying. The final amount of the oxide layer thus prepared was 2.7 g/m$^2$.

Preparation and Evaluation of Planographic Printing Plate

An image was formed and hardened on the aluminum support thus prepared by using each of the magenta inks, in a similar manner to Examples 1-1 to 1-8 and Comparative Examples 1-1 to 1-3. The inkjet image for printing thus obtained was evaluated by using it as the planographic printing plate.

Evaluation of Inkjet Image

The ink bleeding, adhesiveness, and printing durability of each of the images formed on a surface-roughened aluminum support were evaluated according to the methods described below.

1. Evaluation of Ink Bleeding on Surface-Roughened Aluminum Support

An image printed on a surface-roughened aluminum support was evaluated according to the following criteria:

A: No ink bleeding between neighboring dots

B: Slight ink bleeding of dots

C: Distinct ink bleeding of dots and blurring of image

2. Evaluation of Adhesiveness to Surface-Roughened Aluminum Support

Two support samples carrying the printed image obtained above, a sample without flaw and a sample carrying 100 square partial images that are formed by cutting the printed face at an interval of 1 mm with 11 lines both vertically and horizontally according to JIS K5400, were prepared; a Cellotape® was adhered on each of the printed faces and peeled rapidly at an angle of 90 degrees; and the appearance of the printed image or the square partial images remaining without exfoliation was evaluated according to the following criteria:

A: No exfoliation of the printed image in tape-peeling test

B: Slight ink separation in tape-peeling test, but almost no separation when the ink face was not cut.

C: Image separated easily with a Cellotape® tape under both conditions

3. Evaluation of Printing Durability

An image was formed continuously by using the surface-roughened aluminum support carrying an image prepared above as the printing plate in Heidel KOR-D printing machine, and the relative number of papers printable was determined (relative to 150 of the number with the magenta ink 1 obtained in Example 2-1). A greater value indicates a higher printing durability.

TABLE 3

| | Magenta ink number | Ink blurring | Adhesiveness | Printing durability |
|---|---|---|---|---|
| Example 2-1 | 1 | A | A | 150 |
| Example 2-2 | 2 | A | A | 130 |
| Example 2-3 | 3 | A | A | 140 |
| Example 2-4 | 4 | A | A | 140 |
| Example 2-5 | 5 | A | A | 150 |
| Example 2-6 | 6 | A | A | 140 |
| Example 2-7 | 7 | A | A | 130 |
| Example 2-8 | 1 | A | A | 130 |
| Comparative Example 2-1 | 8 | C | C | 60 |
| Comparative Example 2-2 | 9 | C | C | 70 |
| Comparative Example 2-3 | 8 | C | C | 60 |

As shown in Table 3, the magenta inks obtained in Examples 2-1 to 2-8 were superior all in ink-blurring resistance, adhesiveness, and printing durability.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

All publications, patent applications, and technical standards mentioned in this specification are herein incorporated by reference to the same extent as if each individual publication, patent application, or technical standard was specifically and individually indicated to be incorporated by reference.

What is claimed is:

1. A curable composition comprising a polymerizable compound represented by one of the following compounds of (1) to (7), (9) to (13) and (17):

(1)

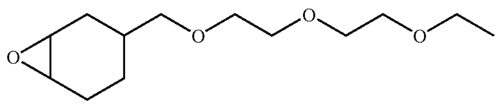

-continued (2)

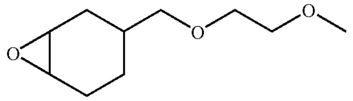

(3)

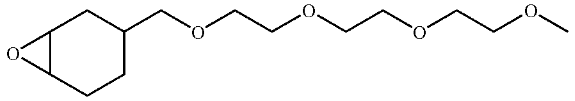

(4)

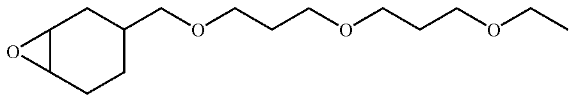

(5)

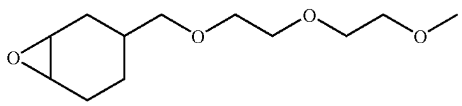

(6)

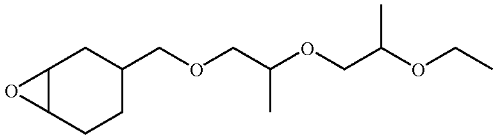

(7)

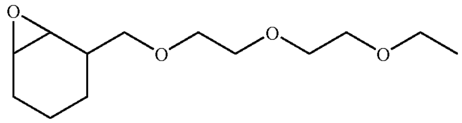

(9)

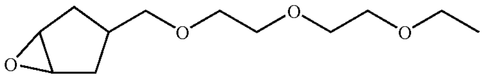

(10)

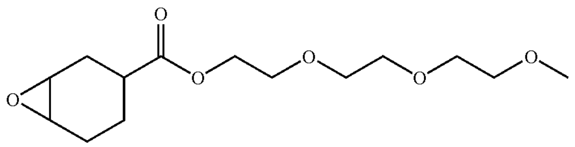

(11)

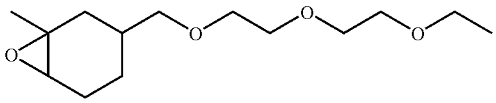

(12)

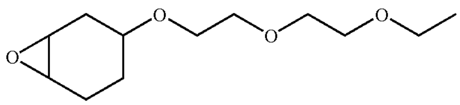

(13)

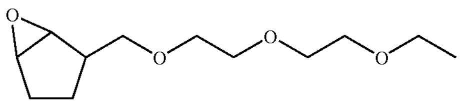

(17)

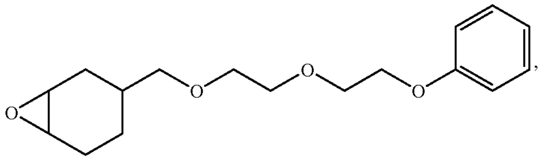, and further comprising a compound that generates acid by irradiation of a radiation ray, wherein the compound that generates acid by irradiation of a radiation ray is at least one compound selected from the compounds represented by the following formulas (b1), (b2) and (b3):

(b1)

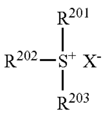

(b2)

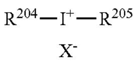

(b3)

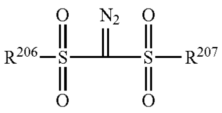

in formula (1), $R^{201}$, $R^{202}$ and $R^{203}$ each independently represents an organic group; and $X^-$represents a non-nucleophilic anion;

in formulas (b2) and (b3), $R^{204}$ to $R^{207}$ each independently represents an aryl, alkyl or cycloalkyl group; and $X^-$represents a non-nucleophilic anion.

2. The curable composition according to claim 1, further comprising a compound selected from an epoxy compound, a vinylether compound, and an oxetane compound which is not included in said polymerizable compounds.

3. An ink composition comprising the curable composition according to claim 1.

4. The ink composition according to claim 3, further comprising a colorant.

5. The ink composition according to claim 4, wherein the colorant is a pigment or an oil soluble dye.

6. The ink composition according to claim 5, wherein the oxidation potential of the oil soluble dye is 1.0 V (vs. SCE) or more.

7. The ink composition according to claim 3, wherein the ink composition is used for inkjet recording.

8. An inkjet recording method comprising: ejecting the ink composition of claim 3 onto a recording medium by an inkjet recording apparatus; and then curing the ejected ink composition by irradiation of an active radiation ray.

9. The inkjet recording method according to claim 8, wherein the active radiation ray is an ultraviolet ray irradiated from a light-emitting diode that emits an ultraviolet ray having an emission peak wavelength in the range of 350 to 420 nm and a maximum illuminance of 10 to 2,000 $mW/cm^2$ on the recording medium surface.

10. A printed material which is recorded by the inkjet recording method according to claim 8.

* * * * *